(12) United States Patent
Baghdadi et al.

(10) Patent No.: US 10,531,705 B2
(45) Date of Patent: *Jan. 14, 2020

(54) HYDROGEL TIE LAYER

(71) Applicant: NIKE, inc., Beaverton, OR (US)

(72) Inventors: Hossein A. Baghdadi, Portland, OR (US); Jay Constantinou, Portland, OR (US); Caleb W. Dyer, Beaverton, OR (US); Myron Maurer, West Linn, OR (US); Denis Schiller, Vancouver, WA (US); Jeremy D. Walker, Portland, OR (US); Richard Watkins, Portland, OR (US); Zachary C. Wright, Beaverton, OR (US)

(73) Assignee: Nike, Inc., Beaverton, OR (US)

( * ) Notice: Subject to any disclaimer, the term of this patent is extended or adjusted under 35 U.S.C. 154(b) by 209 days.

This patent is subject to a terminal disclaimer.

(21) Appl. No.: 15/441,571

(22) Filed: Feb. 24, 2017

(65) Prior Publication Data

US 2017/0251751 A1 Sep. 7, 2017

Related U.S. Application Data

(60) Provisional application No. 62/302,359, filed on Mar. 2, 2016.

(51) Int. Cl.
*A43B 13/12* (2006.01)
*A43B 13/04* (2006.01)
(Continued)

(52) U.S. Cl.
CPC ............ *A43B 13/122* (2013.01); *A43B 5/001* (2013.01); *A43B 5/02* (2013.01); *A43B 5/06* (2013.01);
(Continued)

(58) Field of Classification Search
CPC ..... A43B 13/02; A43B 13/122; A43C 15/161; A43C 15/162
See application file for complete search history.

(56) References Cited

U.S. PATENT DOCUMENTS

| | | | |
|---|---|---|---|
| 2,920,983 A | 1/1960 | Bugosh | |
| 3,463,662 A | 8/1969 | Hodes | |

(Continued)

FOREIGN PATENT DOCUMENTS

| | | |
|---|---|---|
| CN | 1890097 | 1/2007 |
| CN | 201157028 | 12/2008 |

(Continued)

OTHER PUBLICATIONS

Alf et al., Chemical vapor deposition of conformal, functional, and responsive polymer films, Adv. Mater., 22 (18):1993-2027 (2010).

(Continued)

*Primary Examiner* — Gerard Higgins
(74) *Attorney, Agent, or Firm* — Thomas | Horstemeyer, LLP

(57) ABSTRACT

The disclosure relates to articles and components thereof, including outsoles, which can be used in conditions normally conducive to the accumulation of soil. In particular, the articles have substrate body, a tie layer secured to the substrate body, and a material including a hydrogel secured to the tie layer. The material can prevent or reduce the accumulation of soil during use. The presence of the tie layer can minimize or prevent delamination of the hydrogel containing material during normal use.

12 Claims, 24 Drawing Sheets

(51) Int. Cl.
*A43B 5/02* (2006.01)
*A43B 5/06* (2006.01)
*A43B 5/14* (2006.01)
*A43B 5/00* (2006.01)
*A43B 5/10* (2006.01)
*A43C 15/16* (2006.01)
*A43B 13/22* (2006.01)
*B29D 35/14* (2010.01)
*A43B 13/02* (2006.01)
*B29K 105/00* (2006.01)
*B29K 75/00* (2006.01)
*B29K 77/00* (2006.01)

(52) U.S. Cl.
CPC .................. *A43B 5/10* (2013.01); *A43B 5/14* (2013.01); *A43B 13/02* (2013.01); *A43B 13/04* (2013.01); *A43B 13/223* (2013.01); *A43C 15/16* (2013.01); *A43C 15/161* (2013.01); *A43C 15/162* (2013.01); *A43C 15/165* (2013.01); *A43C 15/167* (2013.01); *B29D 35/142* (2013.01); *B29K 2075/00* (2013.01); *B29K 2077/00* (2013.01); *B29K 2105/0061* (2013.01); *B29K 2105/0085* (2013.01)

(56) References Cited

U.S. PATENT DOCUMENTS

| | | |
|---|---|---|
| 3,637,001 A | 1/1972 | Roberts et al. |
| 4,118,354 A | 10/1978 | Harada et al. |
| 4,271,608 A | 6/1981 | Tomuro |
| 4,501,591 A | 2/1985 | Ucci et al. |
| 4,520,138 A | 5/1985 | Himes |
| 4,523,005 A | 6/1985 | Szycher |
| 4,924,608 A | 5/1990 | Mogonye |
| 4,990,357 A | 2/1991 | Karakelle et al. |
| 5,120,816 A | 6/1992 | Gould et al. |
| 5,160,790 A | 11/1992 | Elton |
| 5,480,377 A | 1/1996 | Cartmell et al. |
| 5,576,072 A | 11/1996 | Hostettler et al. |
| 5,591,779 A | 1/1997 | Bleys et al. |
| 5,763,335 A | 6/1998 | Hermann |
| 5,832,636 A | 11/1998 | Lyden et al. |
| 5,943,792 A | 8/1999 | Powell |
| 5,969,076 A | 10/1999 | Lai et al. |
| 6,003,191 A | 12/1999 | Sherry et al. |
| 6,011,104 A | 1/2000 | Udy |
| 6,046,295 A | 4/2000 | Frisch, Jr. et al. |
| 6,076,283 A | 6/2000 | Boie |
| 6,112,380 A | 9/2000 | Dolan et al. |
| 6,162,369 A | 12/2000 | Allewaert et al. |
| 6,203,812 B1 | 3/2001 | Ehrhard et al. |
| 6,335,392 B1 | 1/2002 | Umezawa et al. |
| 6,367,167 B1 | 4/2002 | Krstic et al. |
| 6,698,110 B1 | 3/2004 | Robbins |
| 6,782,642 B2 | 8/2004 | Knoche et al. |
| 6,855,743 B1 | 2/2005 | Gvozdic |
| 6,874,251 B2 | 4/2005 | Moretti |
| 6,922,918 B2 | 8/2005 | Issler |
| 6,948,264 B1 | 9/2005 | Lyden |
| 6,949,271 B2 | 9/2005 | Shannon et al. |
| 7,020,988 B1 | 4/2006 | Holden et al. |
| 7,169,720 B2 | 1/2007 | Etchells et al. |
| 7,373,739 B2 | 5/2008 | Doerer et al. |
| 7,451,511 B2 | 11/2008 | Ellis et al. |
| 7,451,557 B2 | 11/2008 | McDonald et al. |
| 7,594,345 B2 | 9/2009 | Fusco |
| 7,752,775 B2 | 7/2010 | Lyden |
| 7,785,521 B1 | 8/2010 | Chen |
| 7,814,687 B2 | 10/2010 | Cook et al. |
| 7,832,120 B2 | 11/2010 | Jung |
| 7,845,096 B2 | 12/2010 | Ellis et al. |
| 7,854,076 B2 | 12/2010 | Keppler et al. |
| 8,110,242 B2 | 2/2012 | Hawkins et al. |
| 8,291,617 B2 | 10/2012 | Halberstadt et al. |
| 8,303,977 B2 | 11/2012 | Kuzma et al. |
| 8,609,766 B2 | 12/2013 | Bette |
| 8,791,200 B2 | 7/2014 | Köcher et al. |
| 8,796,394 B2 | 8/2014 | Messersmith et al. |
| 8,853,289 B2 | 10/2014 | Smith et al. |
| 8,906,497 B2 | 12/2014 | Marchgraber et al. |
| 9,139,684 B2 | 9/2015 | Coneski et al. |
| 9,206,114 B1 | 12/2015 | Coneski et al. |
| 9,392,841 B2 | 7/2016 | Walker et al. |
| 9,456,654 B2 | 10/2016 | Dyer et al. |
| 10,051,913 B2 | 8/2018 | Dyer et al. |
| 10,064,447 B2 | 9/2018 | Wright et al. |
| 10,070,685 B2 | 9/2018 | Walker et al. |
| 10,076,154 B2 | 9/2018 | Walker et al. |
| 10,076,155 B2 | 9/2018 | Dyer et al. |
| 10,076,156 B2 | 9/2018 | Dyer et al. |
| 10,076,157 B2 | 9/2018 | Wright et al. |
| 10,076,158 B2 | 9/2018 | Wright et al. |
| 10,085,513 B2 | 10/2018 | Dyer et al. |
| 10,092,062 B2 | 10/2018 | Wright et al. |
| 10,130,140 B2 | 11/2018 | Dyer et al. |
| 2001/0053897 A1 | 12/2001 | Frate et al. |
| 2002/0116843 A1 | 8/2002 | Harrison |
| 2002/0188057 A1 | 12/2002 | Chen |
| 2003/0074718 A1 | 4/2003 | English |
| 2003/0213148 A1 | 11/2003 | Knowles |
| 2003/0226283 A1 | 12/2003 | Braunschweiler |
| 2004/0020080 A1 | 2/2004 | Cox et al. |
| 2004/0147188 A1 | 7/2004 | Johnson et al. |
| 2004/0255362 A1 | 12/2004 | Soerens et al. |
| 2005/0288440 A1 | 12/2005 | Chou et al. |
| 2006/0035030 A1 | 2/2006 | Fan |
| 2006/0141186 A1 | 6/2006 | Janssen et al. |
| 2007/0017124 A1 | 1/2007 | Koo et al. |
| 2007/0124960 A1 | 6/2007 | Friedman |
| 2007/0141306 A1 | 6/2007 | Kasai et al. |
| 2008/0120869 A1 | 5/2008 | Roy et al. |
| 2008/0155857 A1 | 7/2008 | Rosen |
| 2008/0241371 A1 | 10/2008 | Havelka et al. |
| 2008/0314287 A1 | 12/2008 | Clark et al. |
| 2009/0061744 A1 | 3/2009 | Bajaj |
| 2009/0084477 A1 | 4/2009 | Sandstrom et al. |
| 2009/0090031 A1 | 4/2009 | Jung |
| 2009/0234039 A1 | 9/2009 | Schuette et al. |
| 2009/0313855 A1 | 12/2009 | Yoshida et al. |
| 2010/0048752 A1 | 2/2010 | Vignola et al. |
| 2010/0083534 A1 | 4/2010 | Howlett |
| 2010/0109200 A1 | 5/2010 | Cox et al. |
| 2010/0113733 A1 | 5/2010 | Cox et al. |
| 2010/0146824 A1 | 6/2010 | Sensini |
| 2010/0154253 A1 | 6/2010 | Imazato et al. |
| 2010/0215707 A1 | 8/2010 | McDonald et al. |
| 2010/0323573 A1 | 12/2010 | Chu et al. |
| 2011/0008612 A1 | 1/2011 | Lee |
| 2011/0112236 A1 | 5/2011 | Ding |
| 2011/0287929 A1 | 11/2011 | Smith et al. |
| 2012/0088602 A1 | 4/2012 | Morken |
| 2012/0148778 A1 | 6/2012 | Dawkins |
| 2012/0151805 A1 | 6/2012 | Polegato |
| 2012/0210608 A1 | 8/2012 | Baker et al. |
| 2012/0216423 A1 | 8/2012 | Lyden |
| 2012/0216424 A1 | 8/2012 | Lyden |
| 2012/0260535 A1 | 10/2012 | Tsang |
| 2012/0312192 A1 | 12/2012 | Detty et al. |
| 2013/0109804 A1 | 5/2013 | Kusaka et al. |
| 2013/0255103 A1 | 10/2013 | Dua et al. |
| 2013/0260104 A1 | 10/2013 | Dua et al. |
| 2013/0260629 A1 | 10/2013 | Dua et al. |
| 2013/0340295 A1 | 12/2013 | Adami et al. |
| 2014/0024768 A1 | 1/2014 | Coneski et al. |
| 2014/0075791 A1 | 3/2014 | Smith et al. |
| 2014/0217636 A1 | 8/2014 | Skaja et al. |
| 2015/0141539 A1 | 5/2015 | Lee |
| 2015/0307745 A1 | 10/2015 | Popa et al. |
| 2015/0353474 A1 | 12/2015 | Coneski et al. |
| 2015/0353741 A1 | 12/2015 | Liao |
| 2016/0058107 A1 | 3/2016 | Walker et al. |

(56) References Cited

U.S. PATENT DOCUMENTS

| | | |
|---|---|---|
| 2016/0136912 A1 | 5/2016 | Le et al. |
| 2016/0286905 A1 | 10/2016 | Schiller |
| 2016/0295959 A1 | 10/2016 | Dyer et al. |

FOREIGN PATENT DOCUMENTS

| | | |
|---|---|---|
| CN | 201360601 | 12/2009 |
| CN | 201445011 | 5/2010 |
| CN | 101873812 | 10/2010 |
| CN | 101953525 | 1/2011 |
| CN | 101953534 | 1/2011 |
| CN | 102038315 A | 5/2011 |
| CN | 102250407 A | 11/2011 |
| CN | 102595949 A | 7/2012 |
| CN | 203952576 U | 11/2014 |
| CN | 104549961 | 4/2015 |
| DE | 4138941 | 6/1993 |
| DE | 29602823 | 4/1996 |
| DE | 102013221204 | 4/2015 |
| EP | 1894482 | 4/2008 |
| EP | 2030517 | 3/2009 |
| EP | 2462908 | 6/2012 |
| EP | 2292113 | 12/2012 |
| GB | 2313537 | 12/1997 |
| JP | H06253905 | 9/1994 |
| JP | H08258511 | 10/1996 |
| JP | H105005 | 1/1998 |
| JP | 2000166609 | 6/2000 |
| JP | 2000308501 | 11/2000 |
| JP | 2002325601 | 11/2002 |
| JP | 2005111691 | 4/2005 |
| JP | 2008260889 | 10/2008 |
| JP | 2010099332 | 5/2010 |
| JP | 4864227 | 2/2012 |
| KR | 100750324 | 8/2007 |
| KR | 20090124313 A | 12/2009 |
| KR | 101232846 | 6/2012 |
| KR | 20120124616 | 11/2012 |
| TW | 377281 B | 12/1999 |
| TW | 201002788 A | 1/2010 |
| WO | 0043449 | 7/2000 |
| WO | 2005000061 | 1/2005 |
| WO | 2006015325 | 2/2006 |
| WO | 2007090245 | 8/2007 |
| WO | 2007135069 | 11/2007 |
| WO | 2013106658 | 7/2013 |
| WO | 2014025161 A1 | 2/2014 |
| WO | 2014126643 A1 | 8/2014 |

OTHER PUBLICATIONS

Arkema, Pebax® Polyether Block Am ides brochure, applicant's internal files Jun. 22, 2015.

Chen et al., An new avenue to nonfouling materials, Adv. Mater., 20(2):335-8 (2008).

European Patent Application GB1515179.8, European Search Report dated Mar. 22, 2016.

Garcia, M.A., "Patent Picks: Marine Coating Technologies," Chemical & Engineering News, 94(4):34 (Jan. 25, 2016).

Jiang et al.,Ultralow-fouling, functionalizable, and hydrolyzable zwitterionic materials and their derivatives for biological applications, Adv. Mater., 22(9):920-32 (2010).

Lee et al., Mechanical properties of amphiphilic urethane acrylate ionomer hydrogels having heterophasic gel structure, Coli. Polymer Sci., 277(2-3):265-9 (1999).

Lubrizol Corporation, "Medical Device Solutions," Brochure (2014).

Lubrizol Corporation, "Tecophilic Extrusion Grade," Technical Data Sheet(2013).

Lubrizol Corporation, "Tecophilic Hydrogel," Technical Data Sheet (2013).

Lubrizol Corporation, "Tecophilic Solution Grade," Technical Data Sheet(2013).

Lubrizol Corporation, Your Link to: Advanced Wound Care Brochure (Sep. 2013).

PCT Patent Application PCT/US2015/047081 filed on Aug. 27, 2015, International Search Report and Written Opinion dated Mar. 22, 2016.

PCT Patent Application PCT/US2015/047082 filed on Aug. 27, 2015, International Search Report and Written Opinion dated Nov. 26, 2015.

PCT Patent Application PCT/US2015/047083 filed on Aug. 27, 2015, International Search Report and Written Opinion dated Nov. 26, 2015.

PCT Patent Application PCT/US2015/047084 filed on Aug. 27, 2015, International Search Report and Written Opinion dated Nov. 27, 2015.

PCT Patent Application PCT/US2015/047086 filed on Aug. 27, 2015, International Search Report and Written Opinion dated Nov. 26, 2015.

PCT Patent Application PCT/US2015/047087 filed on Aug. 27, 2015, International Search Report and Written Opinion dated Dec. 8, 2015.

Salerno-Kochan et al., "Materials Used in Functional Outerwear—Characteristics and Customer Preferences," in Science in Research and Practice, pp. 159-167 (Eds. Choch6f Andrzej, Sep. 2014).

Shao et al., "Difference in hydration between carboxybetaine and sulfobetained", J. Phys. Chem. B, 114(49):16625-31 (2010).

U.S. Appl. No. 14/814,214, filed Jul. 30, 2015, Notice of Allowance dated Aug. 10, 2016.

U.S. Appl. No. 14/814,219, filed Jul. 30, 2015, Notice of Allowance dated Mar. 31, 2016.

Wikipedia: "Glass transition," XP002751026, retrieved on Dec. 4, 2015, from https://en.wikipedia.org/wiki/Giass_transition, modified Oct. 3, 2015 (11 pages).

Yang et al., The effect of lightly crosslinked poly(carboxybetained) hydrogel coating on the performance of sensors in whole blood, Biomaterials, 33:7945-51 (2012).

Zwitter Technology: a new technology platform for biofouling control, Seattle,Washington, Jan. 10, 2014.

Paleos, "What are Hydrogels?", 2012, p. 1-4, acquired from http://pittsburghplastics.com/assets/files/What%20Are%v 20Hydrogels.pdf.

Dyson, R.W. "Specialty Polymers" Blackie & Son Ltd. (1987).

Retrieved from the Internet: URL:https://en.wikipedia.org/wiki/Gel#Hydrogels [retrieved on Aug. 24, 2016].

Traubel, H. "New Materials Permeable to Water Vapor" Springer; DOI: 10.1007/978-3-642-59978-1.

Lubrizol Estane® MVT 70AT3 Thermoplastic Polyurethane, Moisture Vapor Transmission.

Invitation to Pay Additional Fees and Communication Relating to the Results of the Partial International Search for International Application No. PCT/US2015/047081, dated Nov. 26, 2015 (5 pages).

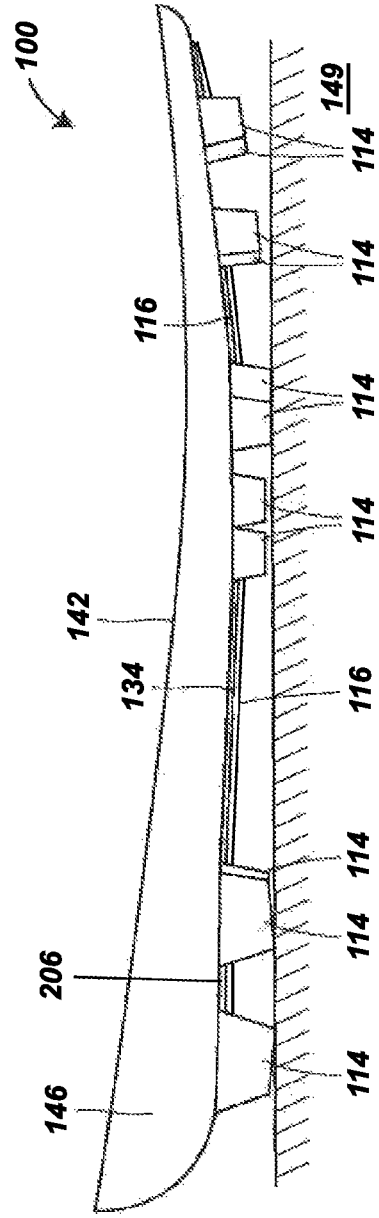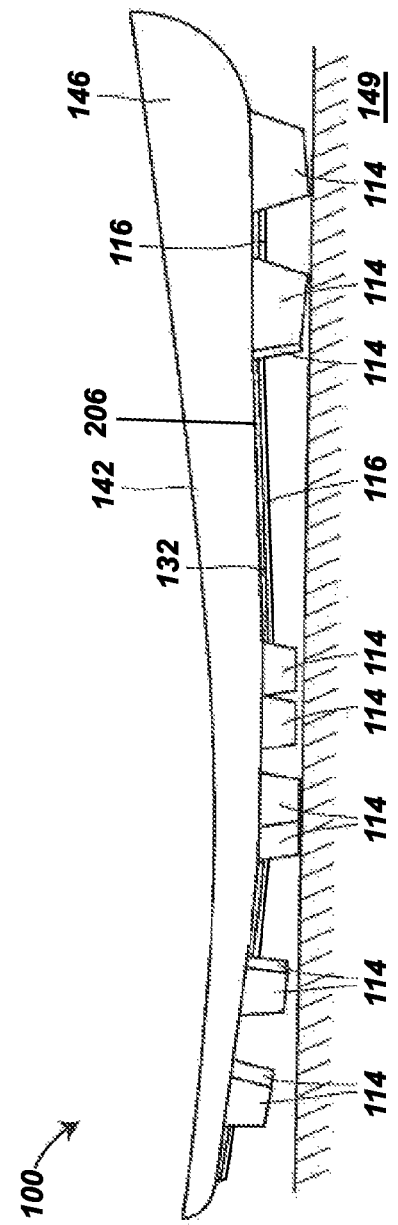

HYDROGEL TIE LAYER

CROSS-REFERENCE TO RELATED APPLICATIONS

This application claims the benefit of and priority to U.S. Provisional Application Ser. No. 62/302,359, having the title "HYDROGEL TIE LAYER", filed on Mar. 2, 2016, the disclosure of which is incorporated herein by reference in its entirety.

FIELD

The present disclosure is directed to articles and components thereof, including outsoles, which are used in conditions conducive to the accumulation of soil on the articles or components.

BACKGROUND

Articles of various types are frequently used for a variety of activities including outdoor activities, military use, and competitive sports. The articles frequently are exposed to soil during use and thus often accumulate soil (e.g., wet or moist inorganic materials such as mud, dirt, and gravel, wet or moist organic material such as grass, turf, and excrement, and wet or moist combinations of inorganic and organic materials) when the articles are used under conditions where soil is present. For example, components of a vehicle can accumulate soil due to splattering from a roadway or surface being traveled over. Likewise, objects used in playgrounds, in construction areas, or the garden can be subject to exposure to soil in the area of use by splattering or direct contact with unpaved surfaces.

In some cases, these articles are footwear. The outsoles of these types of footwear often are designed to provide traction on soft and slippery surfaces, such as unpaved surfaces including grass and dirt. For example, exaggerated tread patterns, lugs, cleats or spikes (both integral and removable), and rubber formulations which provide improved traction under wet conditions, have been used to improve the level of traction provided by the outsoles.

While these conventional means generally help give footwear improved traction, the outsoles often accumulate soil. In some instances, the soil can accumulate in the tread pattern (when a tread pattern is present), around and between lugs (when lugs are present), or on shafts of the cleats, in the spaces surrounding the cleats, and in the interstitial regions between the cleats (when cleats are present). The accumulations of soil can weigh down these types of articles and interfere with their normal use.

BRIEF DESCRIPTION OF THE DRAWINGS

For a more complete understanding of the disclosure, reference should be made to the following detailed description and accompanying drawings wherein:

FIG. 3 is a lateral side view of the outsole shown in FIG. 2;

FIG. 4 is a medial side view of the outsole shown in FIG. 2;

Figure 1A:
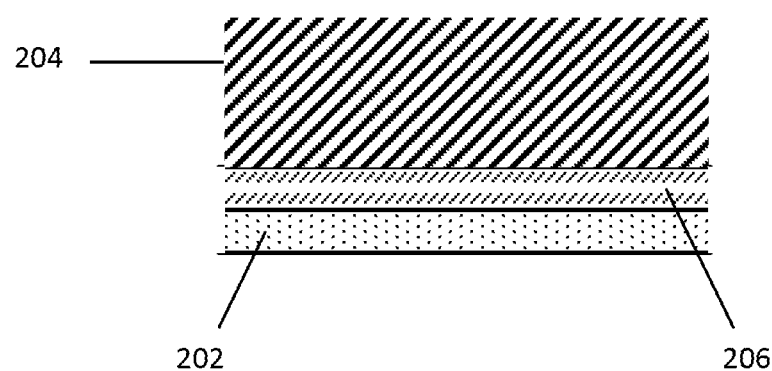
FIG. 1A is a view of a portion of a hydrogel-containing material adjacent to a tie layer on a substrate body.

The articles of footwear shown in the figures are illustrated for use with a user's right foot. However, it is understood that the following discussion applies correspondingly to left-footed articles of footwear as well.

DESCRIPTION

The present disclosure is directed to an article of manufacture, or components thereof having surface-defining materials that are capable of taking up water. It has been discovered that particular materials comprising a polymeric hydrogel when disposed on an externally-facing surface of an article can be effective at preventing or reducing the accumulation of soil on externally-facing surfaces of the article. Additionally, it has been found that the selection of certain polymeric hydrogel materials, in terms of their physical characteristics as measured using the test methods described herein, is useful to achieve specific performance benefits for the articles as disclosed herein. This application is related to the U.S. Provisional Application (Nike Ref. No. 150747US01, 62/199,083), filed Jul. 30, 2015, incorporated herein by reference in its entirety.

Additionally, it has been discovered that it is advantageous to include a tie layer with or in the article. A "tie layer" is a layer of a multi-layer polymeric structure. As used herein, a tie layer is understood to be formed of a composition comprising at least one polymeric material. When present in a finished article, a tie layer joins together polymeric materials which differ from each other. Typically, the structure of the finished article has a first polymeric material at least partially secured to one surface of the tie layer, and a second polymeric material at least partially secured to a second surface of the tie layer opposing the first surface. A tie layer can be formed by extrusion, co-extrusion, solvent casting, pelletization, injection molding, lamination, spray coating, and the like. The polymers of the first polymeric material and the second polymeric material can differ from each other based on the respective chemical structure of the polymers, the respective concentrations of the polymers, the respective number average molecular weights of the polymers, the respective average degrees of crosslinking of the polymers, the respective melting points of the polymers, and the like, including any combination thereof. The tie layer can comprise a polymer present in the first polymeric material, a polymer present in the second polymeric material, or both.

When swollen with water, polymeric hydrogel-containing materials can delaminate from a substrate which does not swell to the same extent. The presence of the tie layer has been found to significantly reduce swelling-induced delamination of polymeric hydrogel-containing materials from the substrate. The tie layer can be a layer of the article that assists in securing or binding the hydrogel-containing material to the rest of the article. In order to assist in this, the tie layer can be of a similar composition to hydrogel-containing material, as discussed herein.

Accordingly, the present disclosure describes articles, components of articles, use of these polymeric hydrogel materials in articles and components of articles, as well as methods of manufacturing and using the articles and components of articles. The material which includes the polymeric hydrogel (i.e. hydrogel-containing material) defines at least a portion of a surface of the articles, and is attached to a substrate via a tie layer. In other words, the hydrogel-containing material defines at least a portion of an exterior surface of the component or article that is externally-facing.

As the hydrogel-containing material defines an externally-facing surface of the article, the tie layer bonds to the hydrogel-containing material such that the tie layer forms an intermediate or middle layer of the article. Opposite the hydrogel-containing material, the tie layer bonds with or is secured to a substrate body. The substrate body can be a further layer of the article that assists in securing the tie layer. These three layers form a layered structure to reduce or eliminate delamination, which, in turn improves the soil-shedding capabilities of the hydrogel-containing material. Further aspects, geometries, and features of this layered structure will be discussed herein.

As can be appreciated, preventing or reducing soil accumulation on articles can provide many benefits. Preventing or reducing soil accumulation on articles during use on unpaved, muddy, or wet surfaces can significantly affect the weight of accumulated soil adhered to the article during use. Preventing or reducing soil accumulation on an article can help improve safety. Further, preventing or reducing soil accumulation on the article can make it easier to clean the article following use.

In a first aspect, the present disclosure is directed to an article of manufacture having a substrate body, a tie layer, and a material compositionally comprises a polymeric hydrogel (e.g. hydrogel-containing material). The first side of the substrate body is formed of a polymeric material with low water uptake capacity. Specifically, the first side of the substrate body compositionally comprises a polymeric material having a water uptake capacity of less than about 10% by weight, as characterized by the Water Uptake Capacity Test with the Sampling Procedure. The tie layer is secured to the first side of the substrate body. The material is secured to the tie layer opposite the first side of the substrate body. The material defines at least a portion of a first external surface of the article.

In accordance with the present disclosure, the hydrogel-containing material can be a material which can be characterized based on its ability to take up water. The hydrogel-containing material can be a material which has a water uptake capacity at 24 hours of greater than 40% by weight, as characterized by the Water Uptake Capacity Test with the Article Sampling Procedure, the Co-extruded Film Sampling Procedure, the Neat Film Sampling Procedure, or the Neat Material Sampling Procedure as described below. Additionally or alternatively, the material can have a water uptake capacity at 1 hour of greater than 100% by weight. The hydrogel-containing material can have a water uptake rate of greater than 20 g/(m$^2$×min$^{0.5}$), as characterized by the Water Uptake Rate Test with the Article Sampling Procedure, the Co-extruded Film Sampling Procedure, the Neat Film Sampling Procedure, or the Neat Material Sampling Procedure. The hydrogel-containing material can have a water uptake rate of greater than 100 g/(m$^2$×min$^{0.5}$). The hydrogel-containing material can be a material which has both a water uptake capacity at 24 hours of greater than 40% by weight, and a water uptake rate of greater than 20 g/(m$^2$×min$^{0.5}$). The hydrogel-containing material can have a swell thickness increase at 1 hour greater than 20%, as characterize by the Swelling Capacity Test with the Article Sampling Procedure, the Co-extruded Film Sampling Procedure, or the Neat Film Sampling Procedure. The hydrogel-containing material can be a material which has both a water uptake capacity at 24 hours of greater than 40% by weight, and a swell thickness increase at 1 hour greater than 20%.

Additionally, the hydrogel-containing material of the present disclosure can be characterized based on its surface properties. The hydrogel-containing material can be a material wherein the at least a portion of the first surface defined by the material has a wet-state contact angle less than 80°, as characterized by the Contact Angle Test with the Article Sampling Procedure, the Co-extruded Film Sampling Procedure, or the Neat Film Sampling Procedure; and wherein the material which has a water uptake capacity at 24 hours of greater than 40% by weight, as characterized by the Water Uptake Capacity Test with the Article Sampling Procedure, the Co-extruded Film Sampling Procedure, the Neat Film Sampling Procedure, or the Neat Material Sampling Procedure. The material can be a material wherein the at least a portion of the first surface defined by the material has a wet-state coefficient of friction less than 0.8, as characterized by the Coefficient of Friction Test with the Article Sampling Procedure, the Co-extruded Film Sampling Procedure, or the Neat Film Sampling Procedure; and wherein the material has a water uptake capacity at 24 hours of greater than 40% by weight, as characterized by the Water Uptake Capacity Test with the Article Sampling Procedure, the Co-extruded Film Sampling Procedure, the Neat Film Sampling Procedure, or the Neat Material Sampling Procedure.

The hydrogel-containing material can be a material wherein the at least a portion of the first surface defined by the material has a wet-state contact angle less than 80°, as characterized by the Contact Angle Test with the Article Sampling Procedure, the Co-extruded Film Sampling Procedure, or the Neat Film Sampling Procedure; and wherein the material which has a water uptake capacity at 1 hour of greater than 100% by weight, as characterized by the Water Uptake Capacity Test with the Article Sampling Procedure, the Co-extruded Film Sampling Procedure, the Neat Film Sampling Procedure, or the Neat Material Sampling Procedure. The hydrogel-containing material can be a material wherein the at least a portion of the first surface defined by the material has a wet-state coefficient of friction less than 0.8, as characterized by the Coefficient of Friction Test with the Article Sampling Procedure, the Co-extruded Film Sampling Procedure, or the Neat Film Sampling Procedure; and wherein the material has a water uptake capacity at 1 hour of greater than 100% by weight, as characterized by the Water Uptake Capacity Test with the Article Sampling Procedure, the Co-extruded Film Sampling Procedure, the Neat Film Sampling Procedure, or the Neat Material Sampling Procedure.

Further, the hydrogel-containing material of the present disclosure can be characterized based on changes in properties between its dry state and its wet state. The material can be a material which has a wet-state glass transition temperature when equilibrated at 90% relative humidity and a dry-state glass transition temperature when equilibrated at 0% relative humidity, each as characterized by the Glass Transition Temperature Test with the Neat Material Sampling Process, wherein the wet-state glass transition temperature is more than 6° C. less than the dry-state glass transition temperature; and wherein the material preferably also has a water uptake capacity at 24 hours of greater than 40% by weight, as characterized by the Water Uptake Capacity Test with the Article Sampling Procedure, the Co-extruded Film Sampling Procedure, the Neat Film Sampling Procedure, or the Neat Material Sampling Procedure. The hydrogel-containing material can have a wet-state storage modulus when equilibrated at 90% relative humidity and a dry-state storage modulus when equilibrated at 0% relative humidity, each as characterized by the Storage Modulus Test with the Neat Material Sampling Procedure, wherein the wet-state storage modulus is less than the dry-state storage modulus of the material; and wherein the material preferably also has a water uptake capacity at 24 hours of greater than 40% by weight, as characterized by the Water Uptake Capacity Test with the Article Sampling Procedure, the Co-extruded Film Sampling Procedure, the Neat Film Sampling Procedure, or the Neat Material Sampling Procedure.

The hydrogel-containing material can be a material which has a wet-state glass transition temperature when equilibrated at 90% relative humidity and a dry-state glass transition temperature when equilibrated at 0% relative humidity, each as characterized by the Glass Transition Temperature Test with the Neat Material Sampling Process, wherein the wet-state glass transition temperature is more than 6° C. less than the dry-state glass transition temperature; and wherein the material preferably also has a water uptake capacity at 1 hour of greater than 100% by weight, as characterized by the Water Uptake Capacity Test with the Article Sampling Procedure, the Co-extruded Film Sampling Procedure, the Neat Film Sampling Procedure, or the Neat Material Sampling Procedure. The hydrogel-containing material can have a wet-state storage modulus when equilibrated at 90% relative humidity and a dry-state storage modulus when equilibrated at 0% relative humidity, each as characterized by the Storage Modulus Test with the Neat Material Sampling Procedure, wherein the wet-state storage modulus is less than the dry-state storage modulus of the material; and wherein the material preferably also has a water uptake capacity at 1 hour of greater than 100% by weight, as characterized by the Water Uptake Capacity Test with the Article Sampling Procedure, the Co-extruded Film Sampling Procedure, the Neat Film Sampling Procedure, or the Neat Material Sampling Procedure.

The hydrogel-containing material of the present disclosure can also or alternatively be characterized based on the type of hydrogel which it includes. In some examples, the hydrogel of the material can comprise or consist essentially of a thermoplastic hydrogel. The hydrogel of the material can comprise or consist essentially of one or more polymers selected from the group consisting of a polyurethane, a polyamide homopolymer, a polyamide copolymer, and combinations thereof. For example, the polyamide copolymer can comprise or consist essentially of a polyamide block copolymer.

The articles of the present disclosure can also or alternatively be characterized based on their structure such as, for example, the thickness of the hydrogel-containing material (e.g. on the ground-facing article surface), how the hydrogel-containing material is arranged (e.g. on an outsole), whether or not traction elements are present, whether or not the hydrogel-containing material is affixed to another layer (e.g. a backing plate or substrate body), and the like.

In one example, the hydrogel-containing material can be present in an article of footwear. The hydrogel-containing material can be present as part of or adhering to an outsole for footwear (e.g. a ground-facing surface). Preventing or reducing soil accumulation on outsoles during wear on unpaved surfaces can significantly affect the weight of accumulated soil adhered to the outsole during wear, reducing fatigue to the wearer caused by the adhered soil. Preventing or reducing soil accumulation on the outsole can help preserve traction during wear. For example, preventing or reducing soil accumulation on the outsole can improve or preserve the performance of traction elements present on the outsole during wear on unpaved surfaces. When worn while playing sports, preventing or reducing soil accumulation on outsoles can improve or preserve the ability of the wearer to manipulate sporting equipment such as a ball with the outsole of the article of footwear.

When the article is an outsole, the outsole can be an outsole having the material present on at least 80% of the ground-facing surface of the outsole. The hydrogel-containing material of the outsole can have a dry-state thickness ranging from 0.1 millimeters to 2 millimeters. The outsole can comprises one or more traction elements present on the first surface of the outsole. The outsole can further comprise an outsole backing member. The outsole backing member can form at least a portion of or be secured to the outsole, wherein the material is secured to the outsole backing member such that the material defines the at least a portion of the first surface of the outsole.

In a second aspect, the present disclosure is directed to an article of footwear comprising an outsole as disclosed herein. The article of footwear can be an article comprising an outsole and an upper, wherein the outsole has a first, external, ground-facing surface and a second surface opposing the first external surface, wherein the upper is secured to the second surface of the outsole, wherein a hydrogel-containing material defines at least a portion of the ground-facing first surface of the outsole. The material can be a material as described above, e.g. with respect to the first aspect of the disclosure. The article of footwear can be an article which prevents or reduces soil accumulation such that the article retains at least 10% less soil by weight as compared to a second article of footwear which is identical to the article except that an outsole of the second article is substantially free of the material comprising a hydrogel.

In a third aspect, the present disclosure is directed to a method of manufacturing an article with a tie layer. The method comprises the steps of forming a substrate body having a first side compositionally comprising a polymeric material having a water uptake capacity of less than about 10% by weight, as characterized by the Water Uptake Capacity Test with the Article Sampling Procedure; securing a tie layer to the first side; and securing a material to the tie layer opposite the first side of the substrate body, the material compositionally comprising a polymeric hydrogel, defining a layered structure.

In some examples, the method can further include thermoforming the layered structure or injection molding material on to the layered structure, or both, or to form an article using a pre-formed layered structure. For example, when the article is an article of footwear, the method further can include thermoforming the layered structure to form a component of an outsole, and injection molding the thermoformed layered structure to produce an outsole. The method can additionally include receiving an upper for an article of footwear; and securing the outsole and the upper to each other such that the material defines a ground-facing surface of an article of footwear.

In another method, the present disclosure is directed to another method of manufacturing an article with a tie layer. The method includes receiving an upper for an article of footwear; receiving an outsole for the article of footwear having a layered structure comprising a substrate body, a tie layer, and material comprising a polymeric hydrogel; and securing the layered structure and the upper to each other such that the material defines a ground-facing surface of the article of footwear. In this method, the layered structure may have any or all of the aspects discussed herein.

In a fourth aspect, the present disclosure is directed to use of a material compositionally comprising a hydrogel to prevent or reduce soil accumulation on a first external surface of a first article. The use involves use of the hydrogel-containing material to prevent or reduce soil accumulation on the first external surface, wherein the first article retains at least 10% less soil by weight as compared to a second article which is identical except that a first external surface of the second article is substantially free of the hydrogel-containing material (i.e. comprising a hydrogel). The use can be a use of a material compositionally comprising a hydrogel to prevent or reduce soil accumulation on a first surface of outsole, which first surface comprises the material, by providing the material on at least a portion of the first surface of the outsole, wherein the outsole retains at least 10% less soil by weight as compared to a second outsole which is identical except that the first surface of the second outsole is substantially free of the material comprising a hydrogel. The material can be a material as described above, e.g. with respect to the first aspect of the disclosure.

In a fifth aspect, the present disclosure is directed to an article of manufacture produced by the process or method as described in the third aspect. Specifically, the article proceeds by the process of forming a substrate body compositionally comprising a polymeric material having a water uptake capacity of less than about 10% by weight, as characterized by the Water Uptake Capacity Test with the Article Sampling Procedure, and the substrate body having a first side; securing a tie layer to the first side; and securing a material to the tie layer opposite the first side of the substrate body, the material compositionally comprising a polymeric hydrogel, defining a layered structure.

The method steps discussed herein can occur in varying orders. For example in the third or fifth aspects, the material compositionally comprising a polymeric hydrogel can be formed first, followed by securing the tie layer to the material, followed by securing the substrate body to the tie layer to form the layered composition. Several of these methods can create a multi-layer (e.g., dual-layer) intermediate including a cap layer being a precursor to the tie layer, and will be discussed further herein. The steps may also occur simultaneously (e.g. through co-extrusion). Additional aspects and description of the materials, outsoles, articles, uses and methods of the present disclosure can be found below.

As used herein, the term "outsole" is understood to refer to an outer portion of the sole of an article of footwear. This outer portion of an article having the outsole makes up at least a portion of the article which can contact ground during conventional use. In addition to the outsole, additional sole-type structures such as a midsole, a rigid plate, cushioning, etc., may or may not be present in the article of footwear. As used herein, the terms "article of footwear" and "footwear" are intended to be used interchangeably to refer to the same article. Typically, the term "article of footwear" will be used in a first instance, and the term "footwear" may be subsequently used to refer to the same article for ease of readability.

As used herein, the term "hydrogel-containing material" is understood to refer to a material which compositionally comprises a polymeric hydrogel. This type of material can be referred to by other like statements, such as a "material comprising a hydrogel," a "material which includes a polymeric hydrogel," and the like. When present in an outsole of the present disclosure, the material defines at least a portion of a surface or side of the outsole. In other words, the hydrogel-containing material forms at least part of an outer or external surface or side of the article. The material can be present as one or more layers disposed on the surface of the article, where the layer(s) can be provided as a single continuous segment on the surface or in multiple discontinuous segments on the surface. The hydrogel-containing material is not intended to be limited by any application process (e.g., co-extrusion, pelletization, injection molding, lamination, solvent casting, spray coating, etc.).

The term "ground-facing" refers to the position the element is intended to be in when the element is present in an article during normal use. If the article is footwear, the element is positioned toward the ground during normal use by a wearer when in a standing position, and thus can contact the ground including unpaved surfaces when the footwear is used in a conventional manner, such as standing, walking or running on an unpaved surface. In other words, even though the element may not necessarily be facing the ground during various steps of manufacturing or shipping, if the element is intended to face the ground during normal use by a wearer, the element is understood to be ground-facing. In some circumstances, due to the presence of elements such as traction elements, the ground-facing surface can be positioned toward the ground during conventional use but may not necessarily come into contact the ground. For example, on hard ground or paved surfaces, the terminal ends of traction elements on the outsole may directly contact the ground, while portions of the outsole located between the traction elements do not. As described in this example, the portions of the outsole located between the traction elements are considered to be ground-facing even though they may not directly contact the ground in all circumstances.

As discussed below, it has been found these articles can prevent or reduce the accumulation of soil during wear on unpaved surfaces. As used herein, the term "soil" can include any of a variety of substances commonly present on a ground which might otherwise adhere to an article. Soil can include inorganic substances such as mud, sand, dirt, and gravel; organic matter such as grass, turf, leaves, other vegetation, and excrement; and combinations of inorganic and organic substances such as clay. Additionally, soil can include other substances such as pulverized rubber which may be present on or in an unpaved surface.

While not wishing to be bound by theory, it is believed that the material comprising a hydrogel in accordance with the present disclosure, when sufficiently wet with water (including water containing dissolved, dispersed or otherwise suspended materials) can provide compressive compliance and/or expulsion of uptaken water. In particular, it is believed that the compressive compliance of the wet material, the expulsion of liquid from the wet material, or both in combination, can disrupt the adhesion of soil on or at the article, or the cohesion of the particles to each other, or can disrupt both the adhesion and cohesion. This disruption in the adhesion and/or cohesion of soil is believed to be a responsible mechanism for preventing (or otherwise reducing) the soil from accumulating on the article (due to the presence of the wet material).

This disruption in the adhesion and/or cohesion of soil is believed to be a responsible mechanism for preventing (or otherwise reducing) the soil from accumulating on the article (due to the presence of the wet material). As can be appreciated with footwear, preventing soil from accumulating on the bottom of footwear can improve the performance of traction elements present on the outsole during wear on unpaved surfaces, can prevent the footwear from gaining weight due to accumulated soil during wear, can preserve ball handling performance of the footwear, and thus can provide significant benefits to wearer as compared to an article of footwear without the material present on the outsole.

As used herein, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all water uptake capacities between 40% by weight and 60% by weight (e.g., 40.1%, 41%, 45%, 50%, 52.5%, 55%, 59%, etc. . . . ).

As used herein, the term "providing", when recited in the claims, is not intended to require any particular delivery or receipt of the provided item. Rather, the term "providing" is merely used to recite items that will be referred to in subsequent elements of the claim(s), for purposes of clarity and ease of readability.

As used herein, the terms "about" and "substantially" are used herein with respect to measurable values and ranges due to expected variations known to those skilled in the art (e.g., limitations and variability in measurements).

As used herein, the terms "at least one" and "one or more of" an element are used interchangeably, and have the same meaning that includes a single element and a plurality of the elements, and may also be represented by the suffix "(s)" at the end of the element. For example, "at least one polyurethane", "one or more polyurethanes", and "polyurethane(s)" may be used interchangeably and have the same meaning.

It will be understood that the article having the tie layer and the hydrogel-containing material may be a variety of articles or components of articles, including footwear, a component of footwear, sporting equipment, a component of sporting equipment, apparel, a component of apparel, a plumbing article, a component of a plumbing article, a component of a vehicle, a transportation container, a component of a transportation container, a refuse container, a component of a refuse container, an article of construction equipment, a component of an article of construction equipment, an article of play equipment, a component of an article of play equipment, an article of landscaping equipment, a component of an article of landscaping equipment, an article of furniture, and/or a component of an article of furniture.

If the article is footwear, the article of footwear may be designed for a variety of uses, such as sporting, athletic, military, work-related, recreational, or casual use. Primarily, the article of footwear is intended for outdoor use on unpaved surfaces (in part or in whole), such as on a ground surface including one or more of grass, turf, gravel, sand, dirt, clay, mud, and the like, whether as an athletic performance surface or as a general outdoor surface. However, the article of footwear may also be desirable for indoor applications, such as indoor sports including dirt playing surfaces for example (e.g., indoor baseball fields with dirt infields). As used herein, the terms "at least one" and "one or more of" an element are used interchangeably, and have the same meaning that includes a single element and a plurality of the elements, and may also be represented by the suffix "(s)" at the end of the element. For example, "at least one polyurethane", "one or more polyurethanes", and "polyurethane(s)" may be used interchangeably and have the same meaning.

In preferred aspects, the article of footwear is designed use in outdoor sporting activities, such as global football/soccer, golf, American football, rugby, baseball, running, track and field, cycling (e.g., road cycling and mountain biking), and the like. The article of footwear can optionally include traction elements (e.g., lugs, cleats, studs, and spikes) to provide traction on soft and slippery surfaces. Cleats, studs and spikes are commonly included in footwear designed for use in sports such as global football/soccer, golf, American football, rugby, baseball, and the like, which are frequently played on unpaved surfaces. Lugs and/or exaggerated tread patterns are commonly included in footwear including boots design for use under rugged outdoor conditions, such as trail running, hiking, and military use.

Figure 1B:
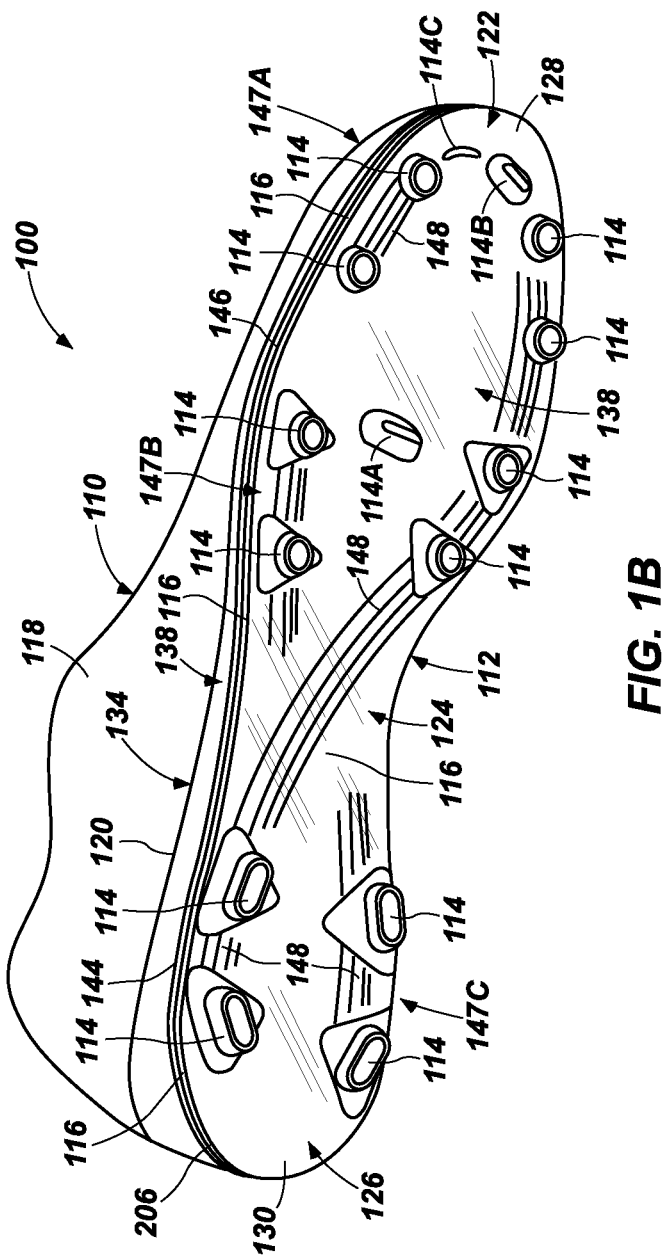
FIG. 1B is a bottom isometric view of an article of footwear in an aspect of the present disclosure having an outsole including a hydrogel-containing material (e.g., in the form of a film) and a tie layer in accordance with the present disclosure.

FIGS. 1A-B depict a layered composition according to this disclosure. As shown generally in FIG. 1A, the article includes a substrate body 204, a tie layer 206, and a hydrogel-containing material 202. The substrate body 204 forms at least a portion of the article, and is in direct contact with the tie layer 206. The tie layer 206 can assist the hydrogel-containing material 202 in bonding or being secured to the substrate body 204. In other words, one or more tie layers 206 are applied between the substrate body 204 and the hydrogel-containing material 202 in order to improve their interlayer bonding. Tie layers can be formed of materials having some functional groups or chain fragments which have compatibility with the substrate body material (e.g. first layer) and other groups or chain fragments which have compatibility with the hydrogel-containing material (e.g. third layer).

Tie layers as described herein can be used in footwear between a substrate body or backing layer of an outsole and a hydrogel-containing material of the outsole. They can also be employed in any other location where one would bond a substrate body to a hydrogel-containing material.

For example, FIGS. 1B-4 illustrate an example article of footwear of the present disclosure, referred to as an article of footwear 100, and which is depicted as footwear for use in global football/soccer applications. As shown in FIG. 1, the footwear 100 includes an upper 110 and an outsole 112 as footwear article components, where outsole 112 includes a plurality of traction elements 114 (e.g., cleats) and a material comprising a hydrogel 116 at its external or ground-facing side or surface. While many of the embodied footwear of the present disclosure preferably include traction elements such as cleats, it is to be understood that in other aspects, the incorporation of cleats is optional.

The upper 110 of the footwear 100 has a body 118 which may be fabricated from materials known in the art for making articles of footwear, and is configured to receive a user's foot. For example, the upper body 118 may be made from or include one or more components made from one or more of natural leather; a knit, braided, woven, or non-woven textile made in whole or in part of a natural fiber; a knit, braided, woven or non-woven textile made in whole or in part of a synthetic polymer, a film of a synthetic polymer, etc.; and combinations thereof. The upper 110 and components of the upper 110 may be manufactured according to conventional techniques (e.g., molding, extrusion, thermoforming, stitching, knitting, etc.). While illustrated in FIG. 1B with a generic design, the upper 110 may alternatively have any desired aesthetic design, functional design, brand designators, and the like.

The outsole 112 may be directly or otherwise secured to the upper 110 using any suitable mechanism or method. As used herein, the terms "secured to", such as for an outsole that is secured to an upper, e.g., is operably secured to an upper, refers collectively to direct connections, indirect connections, integral formations, and combinations thereof. For instance, for an outsole that is secured to an upper, the outsole can be directly connected to the upper (e.g., with an adhesive), the outsole can be indirectly connected to the upper (e.g., with an intermediate midsole), can be integrally formed with the upper (e.g., as a unitary component), and combinations thereof.

For example, the upper 110 may be stitched to the outsole 112, or the upper 110 may be glued to the outsole 112, such as at or near a bite line 120 of the upper 110. The footwear 100 can further include a midsole (not shown) secured between the upper 110 and the outsole 112, or can be enclosed by the outsole 112. When a midsole is present, the upper 110 may be stitched, glued, or otherwise attached to the midsole at any suitable location, such as at or below the bite line 120.

Figure 2:
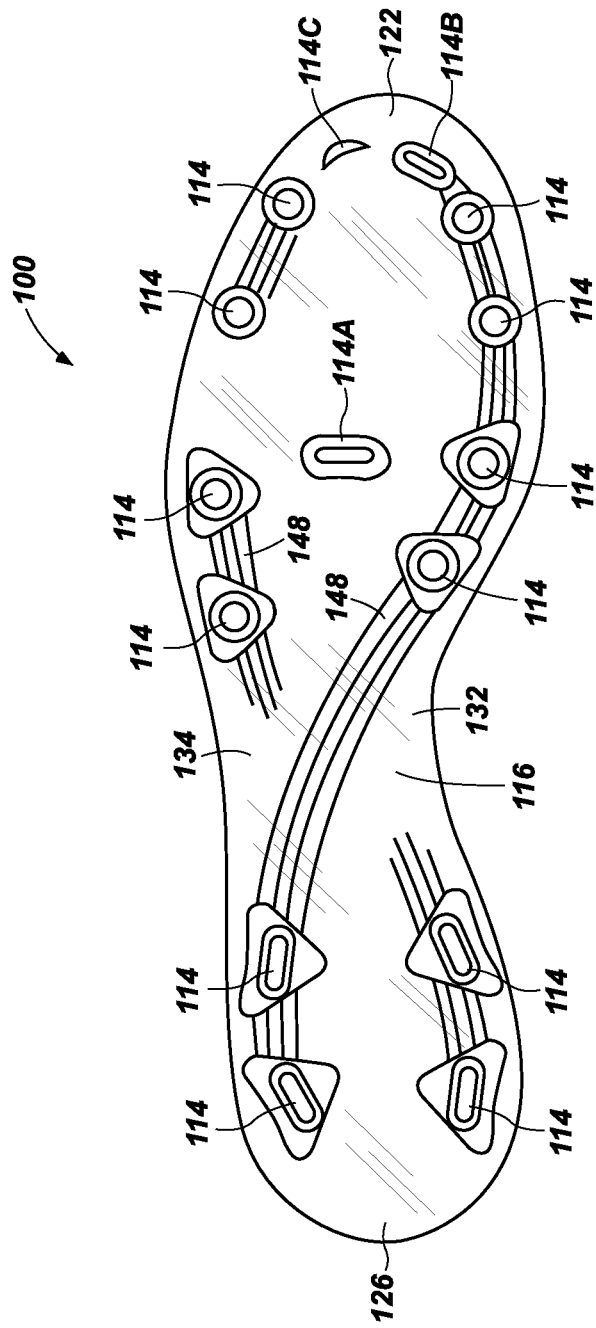
FIG. 2 is a bottom view of the outsole of the article of footwear shown in FIG. 1B, where an upper of the footwear is omitted.

As further shown in FIGS. 1B and 2, the layout of outsole 112 can be segregated into a forefoot region 122, a midfoot region 124, and a heel region 126. The forefoot region 122 is disposed proximate a wearer's forefoot, the midfoot region 124 is disposed between the forefoot region 122 and the heel region 126, and the heel region 126 is disposed proximate a wearer's heel and opposite the forefoot region 122. The outsole 112 may also include a forward edge 128 at the forefoot region 122 and a rearward edge 130 at the heel region 126. In addition to these longitudinal designations, the left/right sides of outsole 112 can also be respectively designated by a medial side 132 and a lateral side 134.

Each of these designations can also apply to the upper 110 and more generally to the footwear 100, and are not intended to particularly define structures or boundaries of the footwear 100, the upper 110, or the outsole 112. As used herein, directional orientations for an article, such as "upward", "downward", "top", "bottom", "left", "right", and the like, are used for ease of discussion, and are not intended to limit the use of the article to any particular orientation. Additionally, references to "ground-facing surface", "ground-facing side", and the like refer to the surface or side of footwear that face the ground during normal use by a wearer as standing. These terms are also used for ease of discussion, and are not intended to limit the use of the article to any particular orientation.

The outsole 112 can optionally include a backing plate or substrate body 136, which, in the shown example, extends across the forefoot region 122, the midfoot region 124, and the heel region 126. The backing plate 136 is an example backing member or other outsole substrate for use in an article of footwear, and can provide structural integrity to the outsole 112. However, the backing plate 136 can also be flexible enough, at least in particular locations, to conform to the flexion of a wearer's foot during the dynamic motions produced during wear. For example, as shown in FIGS. 1B and 2, the backing plate 136 may include a flex region 138 at the forefoot region 122, which can facilitate flexion of the wearer's toes relative to the foot in active use of the footwear 100.

The backing plate 136 may have a top (or first) surface (or side) 142 (best shown in FIGS. 3 and 4), a bottom (or second) surface (or side) 144, and a sidewall 146, where the sidewall 146 can extend around the perimeter of the backing plate 136 at the forward edge 128, the rearward edge 130, the medial side 132, and the lateral side 134. The top surface 142 is the region of the backing plate 136 (and the outsole 112 more generally) that may be in contact with and secured to the upper 110 and/or to any present midsole or insole.

The bottom surface 144 is a surface of the backing plate 136 that is covered (or at least partially covered) by the tie layer 206 secured thereto. The tie layer 206 is disposed between the bottom surface 144 and the hydrogel-containing material 116, and would otherwise be configured to contact a ground surface, whether indoors or outdoors, if the hydrogel-containing material 116 were otherwise omitted. The bottom surface 144 is also the portion of outsole 112 that the traction elements 114 can extend from, as discussed below.

The optional tie layer 206 can be manufactured with one or more layers, may be produced from any suitable material(s), and can provide a good interfacial bond to the hydrogel-containing material 116, as discussed below. Examples of suitable materials for the tie layer 206 or the backing plate 136 include one or more polymeric materials such as thermoplastic elastomers; thermoset polymers; elastomeric polymers; silicone polymers; natural and synthetic rubbers; composite materials including polymers reinforced with carbon fiber and/or glass; natural leather; metals such as aluminum, steel and the like; and combinations thereof. The backing plate or substrate body 136 can be a polymeric material having a water uptake capacity of less than about 10% by weight, as characterized by the Water Uptake Capacity Test with the Article Sampling Procedure discussed herein.

In particular aspects, when the tie layer 206 and/or the backing plate 136 is used, either can be manufactured from one or more polymeric materials having similar chemistries to that of the hydrogel-containing material 116. In other words, the tie layer and the hydrogel-containing material can both comprise or consist essentially of polymers having the same or similar functional groups, and/or can comprise or consist essentially of polymers having the same or similar levels of polarity. For example, the tie layer and the hydrogel-containing material can both comprise or consist essentially of one or more polyurethanes (e.g., thermoplastic polyurethanes), one or more polyamides (e.g., thermoplastic polyamides), one or more polyethers (e.g., thermoplastic polyethers), one or more polyesters (e.g., thermoplastic polyesters), or the like. The similar chemistries can be beneficial for improving manufacturing compatibilities between the hydrogel-containing material 116 and the tie layer 206, and also for improving their interfacial bond strength.

As used herein, the term "polymer" refers to a molecule having polymerized units of one or more species of monomer. The term "polymer" is understood to include both homopolymers and copolymers. The term "copolymer" refers to a polymer having polymerized units of two or more species of monomers, and is understood to include terpolymers and other polymers formed from multiple different monomers. As used herein, reference to "a" polymer or other chemical compound refers one or more molecules of the polymer or chemical compound, rather than being limited to a single molecule of the polymer or chemical compound. Furthermore, the one or more molecules may or may not be identical, so long as they fall under the category of the chemical compound. Thus, for example, "a" polylaurolactam is interpreted to include one or more polymer molecules of the polylaurolactam, where the polymer molecules may or may not be identical (e.g., different molecular weights and/or isomers).

The traction elements 114 may each include any suitable cleat, stud, spike, or similar element configured to enhance traction for a wearer during cutting, turning, stopping, accelerating, and backward movement. The traction elements 114 can be arranged in any suitable pattern along the bottom surface 144 of the backing plate 136. For instance, the traction elements 114 can be distributed in groups or clusters along the outsole 112 (e.g., clusters of 2-8 traction elements 114). As best shown in FIGS. 1B and 2, the traction elements 114 can be grouped into a cluster 147A at the forefoot region 122, a cluster 147B at the midfoot region 124, and a cluster 147C at the heel region 126. In this example, six of the traction elements 114 are substantially aligned along the medial side 132 of the outsole 112, and the other six traction elements 114 are substantially aligned along the lateral side 134 of the outsole 112.

The traction elements 114 may alternatively be arranged along the outsole 112 symmetrically or non-symmetrically between the medial side 132 and the lateral side 134, as desired. Moreover, one or more of the traction elements 114 may be arranged along a centerline of outsole 112 between the medial side 132 and the lateral side 134, such as a blade 114A, as desired to enhance or otherwise modify performance.

Alternatively (or additionally), traction elements can also include one or more front-edge traction elements 114, such as one or more blades 114B, one or more fins 114C, and/or one or more cleats (not shown) secured to (e.g., integrally formed with) the backing plate 136 at a front-edge region between forefoot region 122 and cluster 147A. In this application, the hydrogel-containing material 116 can optionally extend across the bottom surface of the tie layer 206 at this front-edge region while maintaining good traction performance.

Furthermore, the traction elements 114 may each independently have any suitable dimension (e.g., shape and size). For instance, in some designs, each traction element 114 within a given cluster (e.g., clusters 147A, 147B, and 147C) may have the same or substantially the same dimensions, and/or each traction element 114 across the entirety of the outsole 112 may have the same or substantially the same dimensions. Alternatively, the traction elements 114 within each cluster may have different dimensions, and/or each traction element 114 across the entirety of the outsole 112 may have different dimensions.

Examples of suitable shapes for the traction elements 114 include rectangular, hexagonal, cylindrical, conical, circular, square, triangular, trapezoidal, diamond, ovoid, as well as other regular or irregular shapes (e.g., curved lines, C-shapes, etc. . . . ). The traction elements 114 may also have the same or different heights, widths, and/or thicknesses as each other, as further discussed below. Further examples of suitable dimensions for the traction elements 114 and their arrangements along the backing plate 136 include those provided in soccer/global football footwear commercially available under the tradenames "TIEMPO", "HYPERVENOM", "MAGISTA", and "MERCURIAL" from Nike, Inc. of Beaverton, Oreg.

The traction elements 114 may be incorporated into the outsole including the optional backing plate 136 by any suitable mechanism such that the traction elements 114 preferably extend from the bottom surface 144. For example, as discussed below, the traction elements 114 may be integrally formed with the backing plate 136 through a molding process (e.g., for firm ground (FG) footwear). Alternatively, the outsole or optional backing plate 136 may be configured to receive removable traction elements 114, such as screw-in or snap-in traction elements 114. In these aspects, the backing plate 136 may include receiving holes (e.g., threaded or snap-fit holes, not shown), and the traction elements 114 can be screwed or snapped into the receiving holes to secure the traction elements 114 to the backing plate 136 (e.g., for soft ground (SG) footwear).

In further examples, a first portion of the traction elements 114 can be integrally formed with the outsole or optional backing plate 136 and a second portion of the traction elements 114 can be secured with screw-in, snap-in, or other similar mechanisms (e.g., for SG pro footwear). The traction elements 114 may also be configured as short studs for use with artificial ground (AG) footwear, if desired. In some applications, the receiving holes may be raised or otherwise protrude from the general plane of the bottom surface 144 of the backing plate 136. Alternatively, the receiving holes may be flush with the bottom surface 144.

The traction elements 114 can be fabricated from any suitable material for use with the outsole 112. For example, the traction elements 114 may include one or more of polymeric materials such as thermoplastic elastomers; thermoset polymers; elastomeric polymers; silicone polymers; natural and synthetic rubbers; composite materials including polymers reinforced with carbon fiber and/or glass; natural leather; metals such as aluminum, steel and the like; and combinations thereof. In aspects in which the traction elements 114 are integrally formed with the backing plate 136 (e.g., molded together), the traction elements 114 preferably include the same materials as the outsole or backing plate 136 (e.g., thermoplastic materials). Alternatively, in aspects in which the traction elements 114 are separate and insertable into receiving holes of the backing plate 136, the traction elements 114 can include any suitable materials that can secured in the receiving holes of the backing plate 112 (e.g., metals and thermoplastic materials).

The optional backing plate 136 (and more generally, the outsole 112) may also include other features other than the traction elements 114 that can provide support or flexibility to the outsole and/or for aesthetic design purposes. For instance, the outsole or backing plate 136 may also include ridges 148 that may be raised or otherwise protrude from the general plane of the bottom surface 144.

As shown, ridges 148 can extend the arrangement pathways of the traction elements 114, if desired. These features (e.g., ridges 148) can be integrally formed into the outsole or backing plate 136, or alternatively, be removable features that are securable to the backing plate 136. Suitable materials for these features include those discussed above for the traction elements 114.

The backing plate 136 (and more generally, the outsole 112) may also include other features such as exaggerated tread patterns, lugs, and the like, which are configured to contact the ground or playing surface to increase traction, to enhance performance, or for aesthetic design purposes. These other features can be present on the outsole in place of or in addition to the traction elements 114, and can be formed from the suitable materials discussed above for the traction elements 114.

As further shown in FIGS. 3 and 4, the traction elements 114 can be arranged such that when footwear 100 rests on a flat surface 149, the bottom surface 144 of backing plate 136, the tie layer 206, and the hydrogel-containing material 116 (forming the layered structure) are offset from the flat surface 149. This offset is present even when the hydrogel-containing material 116 and/or tie layer 206 is fully saturated and swollen, as discussed below. As such, the traction elements 114 can receive the greatest levels of shear and abrasive contact with surfaces during use, such as by digging into soil during cutting, turning, stopping, accelerating, backward movements, and the like. In comparison, the hydrogel-containing material 116 at its offset location can remain partially protected from a significant portion of these shear and abrasive conditions, thereby preserving its integrity during use.

Figure 5:
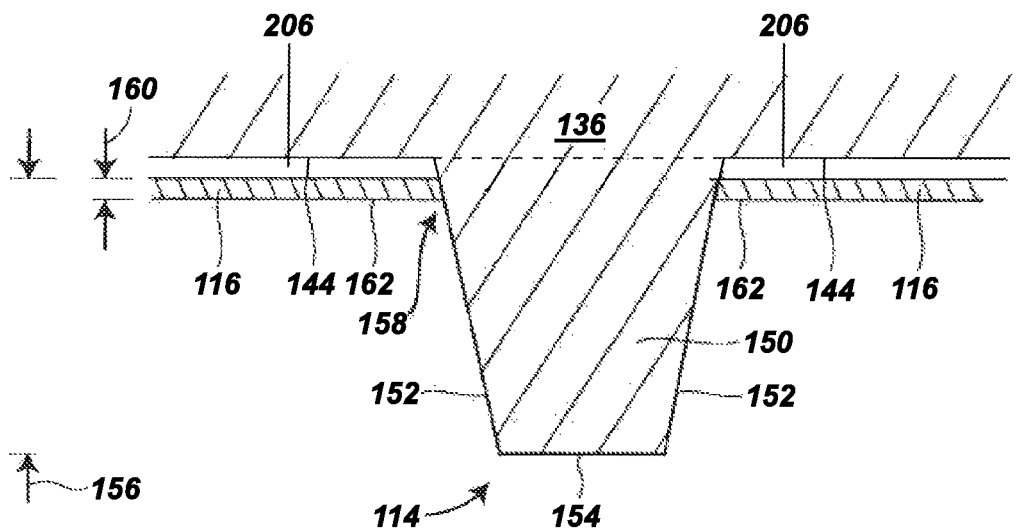
FIG. 5 is an expanded sectional view of a portion of the outsole, illustrating a hydrogel-containing material in accordance with the present disclosure in a dry state secured to a tie layer adjacent to a traction element (e.g., a cleat)

FIG. 5 is an expanded sectional view of the hydrogel-containing material 116 and the bottom surface 144 of the backing plate 136 at one of the traction elements 114. In this shown example, the traction element 114, which can be representative of one or more of the other traction elements 114, is integrally molded with the backing plate 136 and includes a shaft 150 that protrudes downward beyond the bottom surface 144 and the hydrogel-containing material 116. The shaft 150 itself may include an outer side surface 152 and a terminal edge 154. The terminal edge 154 of the shaft 150 is the distal end of the traction element 114, opposite from the bottom surface 144, and is the portion of the traction element 114 that can initially contact and penetrate into a playing or ground surface.

As mentioned above, the traction element 114 may have any suitable dimensions and shape, where the shaft 150 (and the outer side surface 152) can correspondingly have rectangular, hexagonal, cylindrical, conical, circular, square, triangular, trapezoidal, diamond, ovoid, as well as other regular or irregular shapes (e.g., curved lines, C-shapes, etc. . . . ). Similarly, the terminal edge 154 can have dimensions and sizes that correspond to those of the outer side surface 152, and can be substantially flat, sloped, rounded, and the like. Furthermore, in some aspects, the terminal edge 154 can be substantially parallel to the bottom surface 144 and/or the hydrogel-containing material 116.

Examples of suitable average lengths 156 for each shaft 150 relative to bottom surface 144 range from 1 millimeter to 20 millimeters, from 3 millimeters to 15 millimeters, or from 5 millimeters to 10 millimeters, where, as mentioned above, each traction element 114 can have different dimensions and sizes (i.e., the shafts 150 of the various traction elements 114 can have different lengths).

In the example shown in FIGS. 1-5, the hydrogel-containing material 116 is present on the entire bottom surface of the tie layer 206 between (and not including) the traction elements 114. For instance, as shown in FIG. 5, the hydrogel-containing material 116 can cover the bottom surface of the tie layer 206 at locations around the shaft 150 of each traction element 114, such that hydrogel-containing material does not cover the outer side surface 152 or the terminal edge 154 of the traction element 114, other than optionally at a base region 158 of the shaft 150. This can preserve the integrity of the hydrogel-containing material 116 and preserve traction performance of the traction elements 114. In some aspects, the hydrogel-containing material 116 does not cover or contact any portion of the outer side surface 152 of the shaft 150. In other examples, the base region 158 that the hydrogel-containing material 116 (in a dry state) covers and contacts the outer side surface 152 is less than 25%, less than 15%, or less than 10% of the length of the shaft 150, as an average distance measured from the bottom surface 144 at the traction element 114.

As can be seen in FIG. 5, the hydrogel-containing material 116 can be a thin film. Examples of suitable average thicknesses for the hydrogel-containing material 116 in a dry state (referred to as a dry-state material thickness 160) range from 0.025 millimeters to 5 millimeters, from 0.5 millimeters to 3 millimeters, from 0.25 millimeters to 1 millimeter, from 0.25 millimeters to 2 millimeters, from 0.25 millimeters to 5 millimeters, from 0.15 millimeters to 1 millimeter, from 0.15 millimeters to 1.5 millimeters, from 0.1 millimeters to 1.5 millimeters, from 0.1 millimeters to 2 millimeters, from 0.1 millimeters to 5 millimeters, from 0.1 millimeters to 1 millimeter, or from 0.1 millimeters to 0.5 millimeters. As depicted, the thicknesses for the hydrogel-containing material 116 are measured between the interfacial bond at the bottom surface of the tie layer 206 and an exterior surface of the hydrogel-containing material 116 (referred to as a material surface 162). In some aspects, the hydrogel-containing material 116 can also (or alternatively) be present on one or more regions of the traction elements 114. For example, the material can be present at an exterior surface of the traction elements 114. These aspects can be beneficial, for example, in applications where the traction element 114 has a central base with multiple shafts 150 that protrude from the periphery of the central base. In such aspects, the hydrogel-containing material 116 can be present on at least the central base of the traction element 114. Furthermore, for some applications, the hydrogel-containing material 116 may also cover the entirety of one or more of the traction elements 114 (e.g., on the shaft 150).

Presence of the hydrogel-containing material 116 on the ground-facing side of outsole 112 (i.e., on bottom surface 144) allows the hydrogel-containing material 116 to come into contact with soil, including wet soil during use, which is believed to enhance the soil-shedding performance for the footwear 100, as explained below. However, the hydrogel-containing material 116 can also optionally be present on one or more locations of the sidewall 146 of the backing plate 136.

As briefly mentioned above, the hydrogel-containing material 116 compositionally includes a hydrogel. The presence of the hydrogel in the material can allow the hydrogel-containing material 116 to absorb or otherwise take up water. For example, the material can take up water from an external environment (e.g., from mud, wet grass, presoaking, and the like).

As used herein, the term "compliant" refers to the stiffness of an elastic material, and can be determined by the storage modulus of the material. Generally, when the hydrogel of the material is a crosslinked hydrogel (e.g., includes physical crosslinks, covalent crosslinks, or both), the lower the degree of crosslinking in the hydrogel, or the greater the distance between crosslinks in the hydrogel, the more compliant the material will be. In particular aspects, when the material comprises a crosslinked polymeric hydrogel, it is believed that this uptake of water by the hydrogel-containing material 116 can cause the crosslinked polymeric hydrogel to expand and stretch under the pressure of the received water, while retaining its overall structural integrity through its crosslinking. This stretching and expansion of the hydrogel can cause the hydrogel-containing material 116 to swell and become more compliant (e.g., compressible, expandable, and stretchable).

Figure 5A:
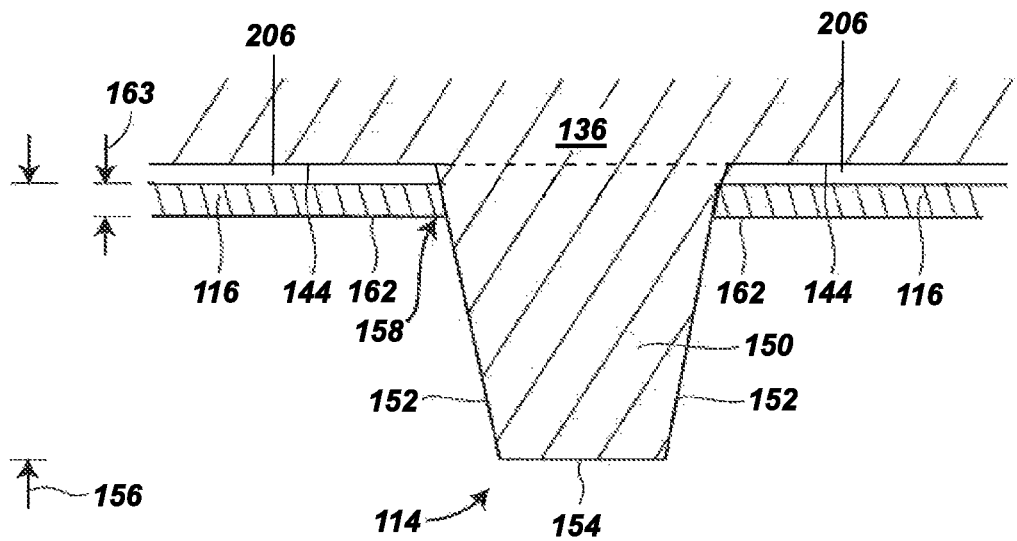
FIG. 5A is an expanded sectional view of the portion of the outsole shown in FIG. 5, where the hydrogel-containing material is partially saturated and swollen.
Figure 5B:
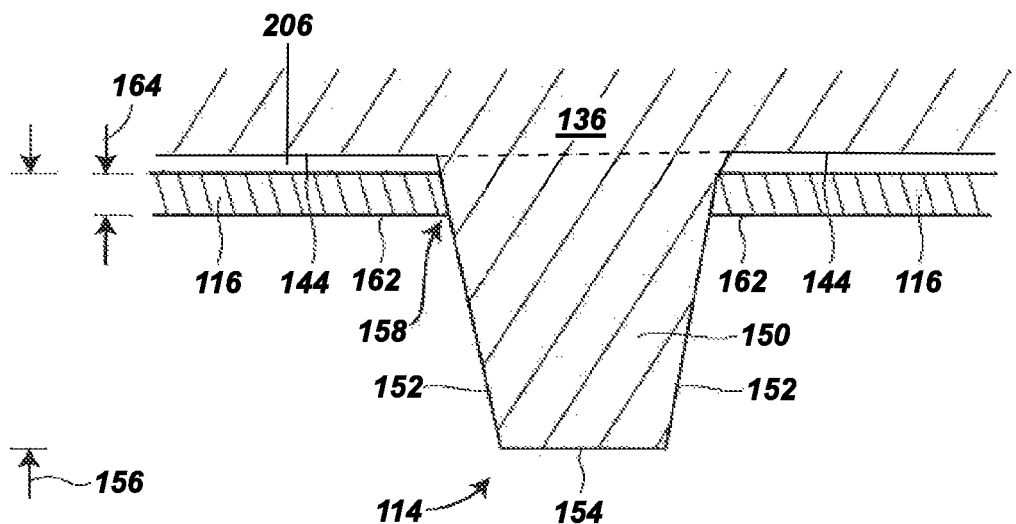
FIG. 5B is an expanded sectional view of the portion of the outsole shown in FIG. 5, where the material is fully saturated and swollen.

In aspects where the material swells, the swelling of the hydrogel-containing material 116 can be observed as an increase in material thickness from the dry-state thickness 160 of the hydrogel-containing material 116 (shown in FIG. 5), through a range of intermediate-state thicknesses (e.g., thickness 163, shown in FIG. 5A) as additional water is absorbed, and finally to a saturated-state thickness 164 (shown in FIG. 5B), which is an average thickness of the hydrogel-containing material 116 when fully saturated with water. For example, the saturated-state thickness 164 for the fully saturated material 116 can be greater than 150%, greater than 200%, greater than 250%, greater than 300%, greater than 350%, greater than 400%, or greater than 500%, of the dry-state thickness 160 for the same hydrogel-containing material 116.

In some aspects, the saturated-state thickness 164 for the fully saturated material 114 range from 150% to 500%, from 150% to 400%, from 150% to 300%, or from 200% to 300% of the dry-state thickness 160 for the same hydrogel-containing material 116. Examples of suitable average thicknesses for the hydrogel-containing material 116 in a wet state (referred to as a saturated-state thickness 164) range from 0.2 millimeters to 10 millimeters, from 0.2 millimeters to 5 millimeters, from 0.2 millimeters to 2 millimeters, from 0.25 millimeters to 2 millimeters, or from 0.5 millimeters to 1 millimeter.

In particular aspects, the hydrogel-containing material 116 can quickly take up water that is in contact with the hydrogel-containing material 116. For instance, the hydrogel-containing material 116 can take up water from mud and wet grass, such as during a warmup period prior to a competitive match. Alternatively (or additionally), the hydrogel-containing material 116 can be pre-conditioned with water so that the hydrogel-containing material 116 is partially or fully saturated, such as by spraying or soaking the outsole 112 with water prior to use.

The total amount of water that the hydrogel-containing material 116 can take up depends on a variety of factors, such as its composition (e.g., its hydrophilicity), its cross-linking density, its thickness, and its interfacial bond to the tie layer 206. For example, it is believed that a material comprising a hydrogel having a higher level of hydrophilicity and a lower level of cross-linking density can increase the water uptake capacity of the hydrogel-containing material 116. On the other hand, the interfacial bond between the hydrogel-containing material 116 and the tie layer 206 can potentially restrict the swelling of the hydrogel-containing material 116 due to its relatively thin dimensions. Accordingly, as described below, the water uptake capacity and the swelling capacity of the hydrogel-containing material 116 can differ between the hydrogel-containing material 116 in a neat film state (isolated film by itself) and the hydrogel-containing material 116 as present in an article (e.g. outsole).

The water uptake capacity and the water uptake rate of the hydrogel-containing material 116 are dependent on the size and shape of its geometry, and are typically based on the same factors. However, it has been found that, to account for part dimensions when measuring water uptake capacity, it is possible to derive an intrinsic, steady-state material property. Therefore, conservation of mass can be used to define the ratio of water weight absorbed to the initial dry weight of the hydrogel-containing material 116 at very long time scales (i.e. when the ratio is no longer changing at a measurable rate).

Conversely, the water uptake rate is transient and can be defined kinetically. The three primary factors for water uptake rate for a hydrogel-containing material 116 present at a surface of an outsole given part geometry include time, thickness, and the exposed surface area available for taking up water. Once again, the weight of water taken up can be used as a metric of water uptake rate, but the water flux can also be accounted for by normalizing by the exposed surface area. For example, a thin rectangular film can be defined by $2 \times L \times W$, where L is the length of one side and W is the width. The value is doubled to account for the two major surfaces of the film, but the prefactor can be eliminated when the film has a non-absorbing, structural layer secured to one of the major surfaces (e.g., with an outsole backing plate).

Normalizing for thickness and time can require a more detailed analysis because they are coupled variables. Water penetrates deeper into the film as more time passes in the experiment, and therefore, there is more functional (e.g., absorbent) material available at longer time scales. One dimensional diffusion models can explain the relationship between time and thickness through material properties, such as diffusivity. In particular, the weight of water taken up per exposed surface area should yield a straight line when plotted against the square root of time.

However, several factors can occur where this model does not represent the data well. First, at long times absorbent materials become saturated and diffusion kinetics change due to the decrease in concentration gradient of the water. Second, as time progresses the material can be plasticized to increase the rate of diffusion, so once again the model do longer represents the physical process. Finally, competing processes can dominate the water uptake or weight change phenomenon, typically through surface phenomenon such as physisorption on a rough surface due to capillary forces.

This is not a diffusion driven process, and the water is not actually be taken up into the hydrogel-containing material or film.

Even though the hydrogel-containing material 116 can swell as it takes up water and transitions between the different material states with corresponding thicknesses 160, 163, and 164, the saturated-state thickness 164 of the hydrogel-containing material 116 can remains less than the length 156 of the traction element 114. This selection of the hydrogel-containing material 116 and its corresponding dry and saturated thicknesses ensures that the traction elements 114 can continue to provide ground-engaging traction during use of the footwear 100, even when the hydrogel-containing material 116 is in a fully swollen state. For example, the average clearance difference between the lengths 156 of the traction elements 114 and the saturated-state thickness 164 of the hydrogel-containing material 116 is desirably at least 8 millimeters. For example, the average clearance distance can be at least 9 millimeters, 10 millimeters, or more. Of course, the hydrogel-containing material 116 can also cover the entire length of the traction element 114 in either its dry-state or saturated-state thicknesses.

As also mentioned above, in addition to swelling, the compliance of the hydrogel-containing material 116 may also increase from being relatively stiff (i.e., dry-state) to being increasingly stretchable, compressible, and malleable (i.e., wet-state). The increased compliance accordingly can allow the hydrogel-containing material 116 to readily compress under an applied pressure (e.g., during a foot strike on the ground), and in some aspects, to quickly expel at least a portion of its retained water (depending on the extent of compression). While not wishing to be bound by theory, it is believed that this compressive compliance alone, water expulsion alone, or both in combination can disrupt the adhesion and/or cohesion of soil at outsole 112, which prevents or otherwise reduces the accumulation of soil on outsole 112.

In addition to quickly expelling water, in particular examples, the compressed hydrogel-containing material 116 is capable of quickly re-absorbing water when the compression is released (e.g., liftoff from a foot strike during normal use). As such, during use in a wet or damp environment (e.g., a muddy or wet ground), the hydrogel-containing material 116 can dynamically expel and repeatedly take up water over successive foot strikes, particularly from a wet surface. As such, the hydrogel-containing material 116 can continue to prevent soil accumulation over extended periods of time (e.g., during an entire competitive match), particularly when there is ground water available for re-uptake.

FIGS. 6-9 illustrate an example method of using footwear 100 with a muddy or wet ground 166, which depict one potential mechanism by which the materials comprising hydrogels as disclosed herein can prevent or reduce soil accumulation on the outsole 112. It is known that the soil of the ground 166 can accumulate on an outsole (e.g., between the traction elements) during normal athletic or casual use, in particular when the ground 166 is wet. The soil is believed to accumulate on the outsole due to a combination of adhesion of the soil particles to the surface of the outsole and cohesion of the soil particles to each other. In order to break these adhesive/cohesive forces, the soil particles need to be subjected to stresses high enough to exceed their adhesive/cohesive activation energies. When this is achieved, the soil particles can then move or flow under the applied stresses, which dislodge or otherwise shed portions of the soil from the outsole.

However, during typical use of cleated footwear, such as during competitive sporting events (e.g., global football/soccer matches, golfing events, and American football games), the actions of walking and running are not always sufficient to dislodge the soil from the outsole. This can result in the soil sticking to the outsoles, particularly in the interstitial regions where compaction forces in the normal direction are maximized between the individual traction elements. As can be appreciated, this soil can quickly accumulate to increase the weight of the footwear and reduce the effectiveness of the traction elements (e.g., because they have less axial or normal extent capable of engaging with the ground 166), each of which can have a significant impact on athletic performance.

Figure 6:
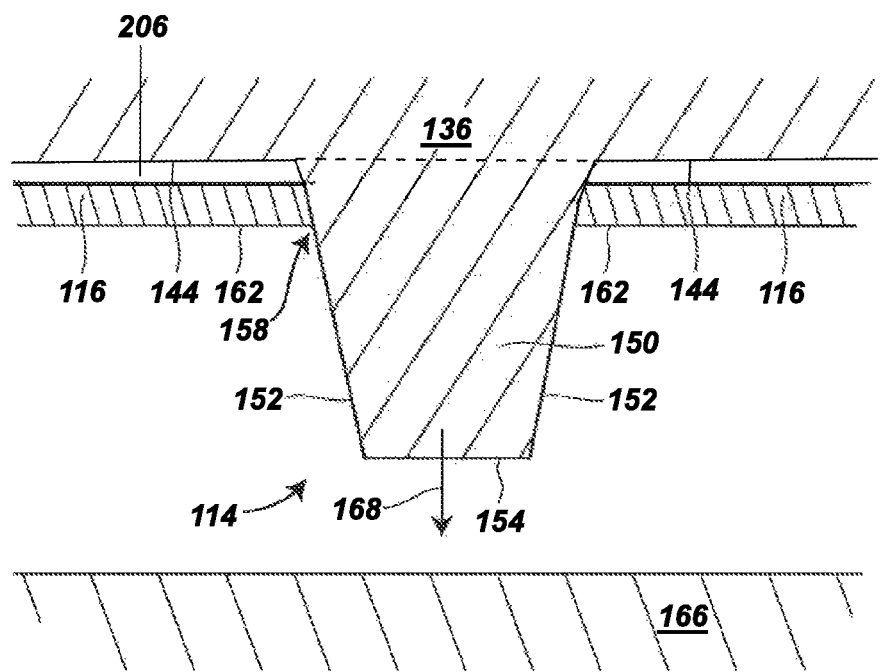
FIGS. 6-9 are expanded sectional views of the portion of the outsole shown in FIG. 5, illustrating the soil-shedding performance of the outsole during a foot strike motion on an unpaved surface.

The incorporation of the hydrogel-containing material 116 to a surface or side of the outsole 112 (e.g., a ground-facing surface or side of the outsole) however, is believed to disrupt the adhesion and/or cohesion of soil at the outsole 112, thereby reducing the adhesive/cohesive activation energies otherwise required to induce the flow of the soil particles. As shown in FIG. 6, the footwear 100 can be provided in a pre-conditioned (e.g., pre-wet) state where the hydrogel-containing material 116 is partially or fully saturated with water. This can be accomplished in a variety of manners, such as spraying the outsole 112 with water, soaking the outsole 112 in water, or otherwise exposing the hydrogel-containing material 116 to water in a sufficient amount for a sufficient duration. Alternatively (or additionally), when water or wet materials are present on the ground 166, footwear 100 can be used in a conventional manner on the ground 166 until the hydrogel-containing material 116 absorbs a sufficient amount of water from the ground 166 or wet materials to reach its pre-conditioned state.

Figure 7:
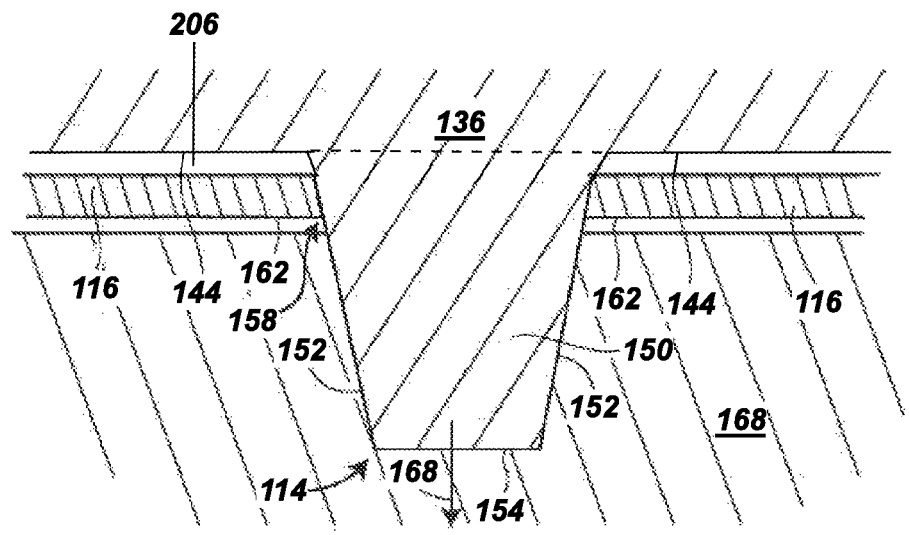
Figure 8:
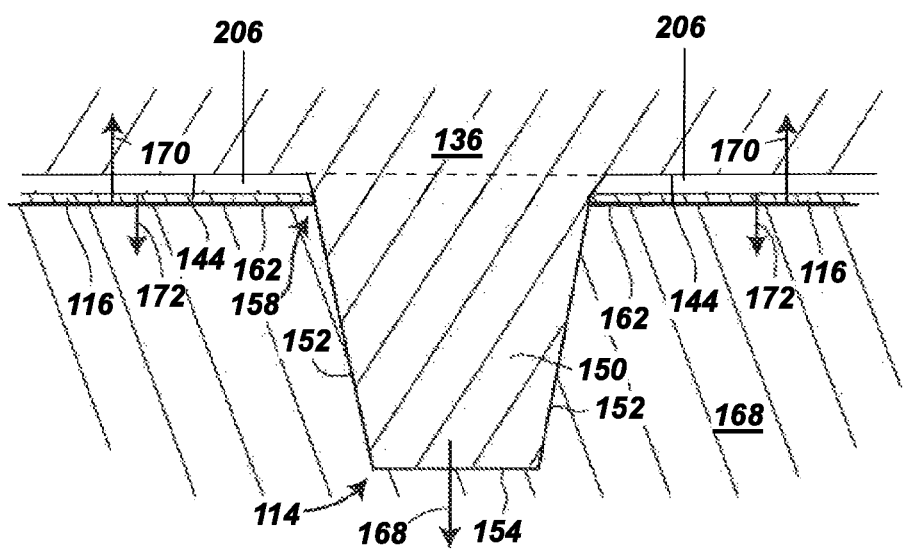

During a foot strike, the downward motion of the footwear 100 (illustrated by arrow 168) causes the traction element 114 to contact the ground 166. As shown in FIG. 7, the continued applied pressure of the foot strike can cause the traction element 114 to penetrate into the softer soil of the ground 166 until the material surface 162 of the hydrogel-containing material 116 contacts the ground 166. As shown in FIG. 8, further applied pressure of the foot strike can press the hydrogel-containing material 116 into the ground 166, thereby at least partially compressing the hydrogel-containing material 116 under the applied pressure (illustrated by arrows 170).

As can be seen, this compression of the hydrogel-containing material 116 into the soil of the ground 166 typically compacts the soil, increasing the potential for the soil particles to adhere to outsole 112 and to cohesively adhere to each other (clumping together). However, the compression of the hydrogel-containing material 116 may also expel at least a portion of its uptaken water into the soil of the ground 166 (illustrated by arrows 172). It is believed that as the water is expelled through the material surface 162 of the hydrogel-containing material 116, the pressure of the expelled water can disrupt the adhesion of the soil to the material surface 162 at this interface.

Additionally, once expelled into the soil, it is also believed that the water may also modify the rheology of the soil adjacent to the material surface 162 (e.g., watering down the soil to a relatively muddier or wetter state). This is believed to essentially spread out the soil particles in the water carrier and weaken their cohesive forces (e.g., mechanical/ionic/hydrogen bonds). Each of these mechanisms from the expelled water is believed to lower the required stresses need to disrupt the adhesion of the soil from the outsole 112. As such, the stresses typically applied during athletic performances (e.g., while running, handling the ball with the footwear, and kicking the ball) can exceed the cohesive/adhesive activation energies more frequently.

Figure 9:
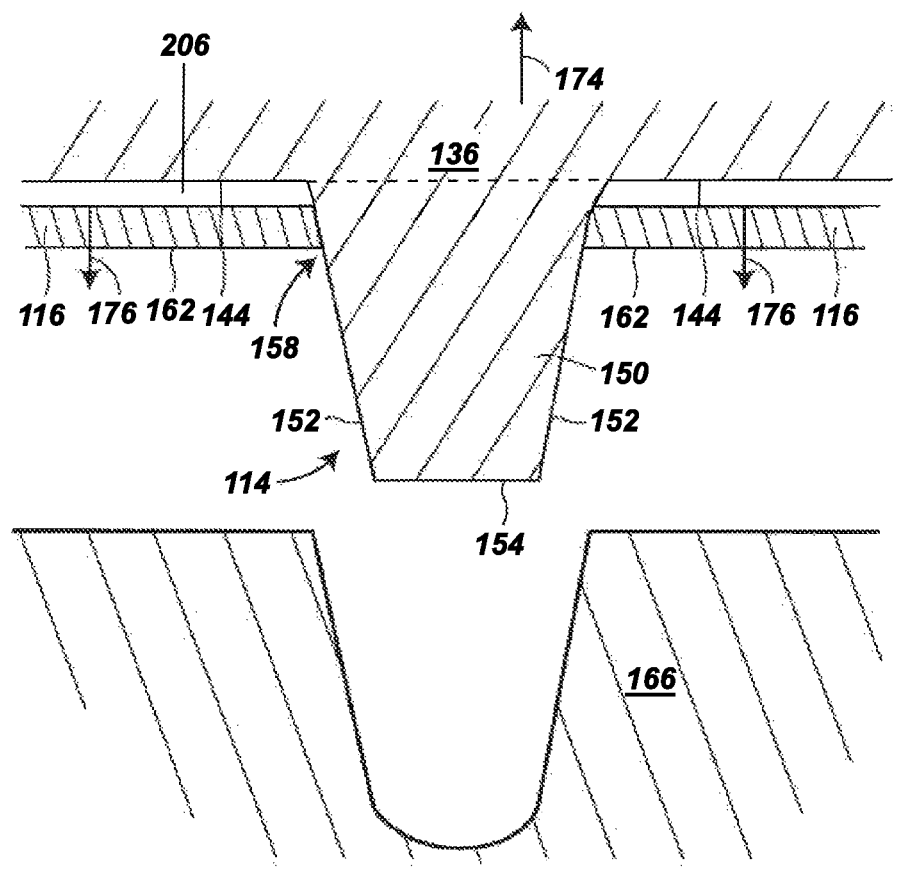

As shown in FIG. 9, when the footwear 100 is lifted following the foot strike (illustrated by arrow 174), it is believed that the compression applied to the hydrogel-containing material 116 is released, and so the hydrogel-containing material 116 can be free to expand. In some examples, it has been found that, when the outsole 112 is lifted apart from the ground 166, a thin water layer can remain in contact with the material surface 162, which can quickly re-uptake into the hydrogel-containing material 116. This quick re-uptake of water from the material surface 162 after compression is removed (e.g., within about 1, 2, or 5 seconds) can quickly swell the hydrogel-containing material 116 back at least partially to its previously-swelled state (depending on the amount of water re-absorbed), as illustrated by arrows 176.

This cyclic compression and expansion from repeated, rapid, and/or forceful foot strikes during use of the footwear 100 can also mechanically disrupt the adhesion of any soil still adhered to the material surface 162, despite the relatively small thickness of the hydrogel-containing material 116 in any of its various states of water saturation (e.g., partially to fully saturated). In particular, the increased compliance is believed, under some conditions, to lead to inhomogeneous shear states in the soil when compressed in the normal or vertical direction, which can also lead to increased interfacial shear stresses and a decrease in soil accumulation.

Figure 19:
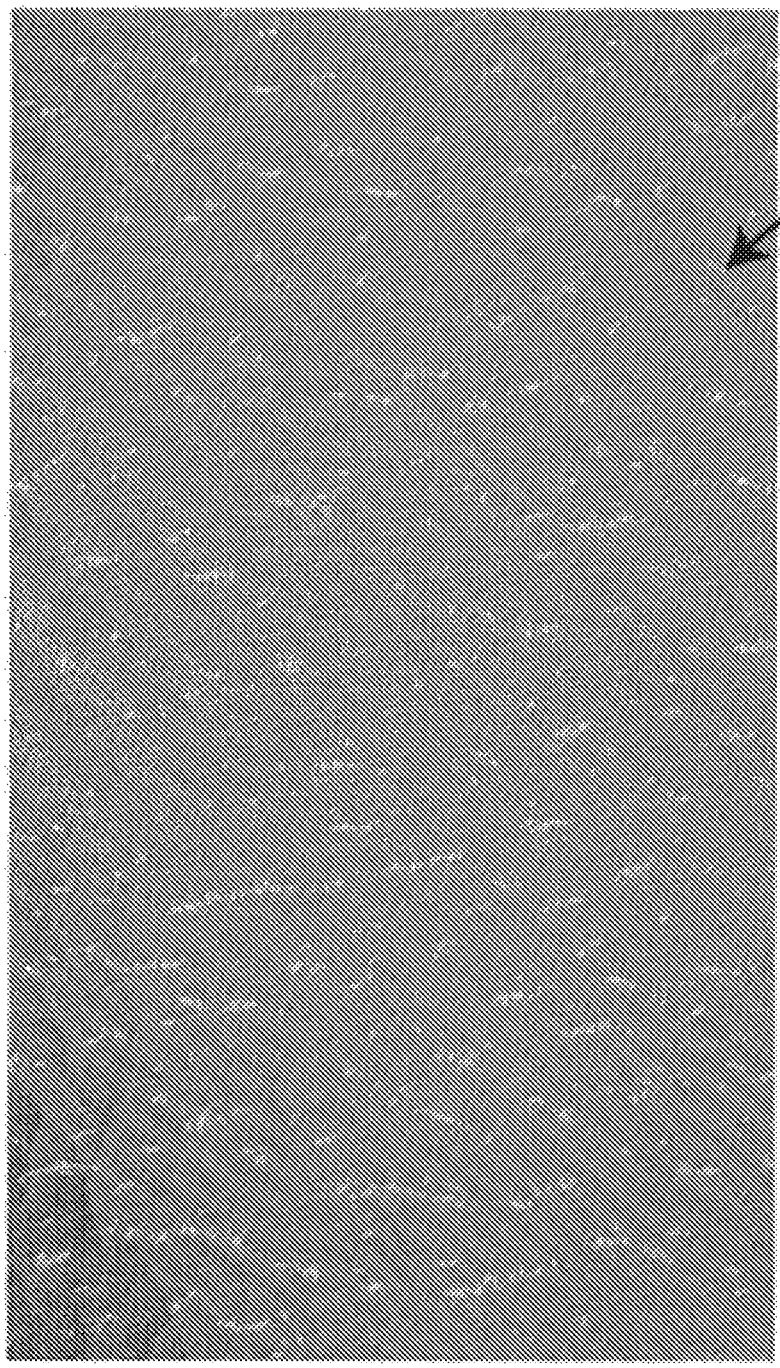
FIG. 19 is a photograph of an example a hydrogel-containing material of the present disclosure.

In some aspects, the hydrogel-containing material 116 can swell during water re-uptake (and also during initial uptake) in a non-uniform manner. In such aspects, the uptaken water may tend to travel in a path perpendicular to the material surface 162, and so may not migrate substantially in a transverse direction generally in the plane of the hydrogel-containing material 116 once absorbed. This uneven, perpendicular water uptake and relative lack of transverse water intra-material transport can form an irregular or rough texture or small ridges on the material surface 162. The presence of these small ridges on the irregular material surface 162 from the non-uniform swelling are also believed to potentially further disrupt the adhesion of the soil at the material surface 162, and thus may loosen the soil and further promote soil shedding. The uneven, ridged material surface 162 can also be seen in the photograph of FIG. 19 of an exemplary water-saturated hydrogel-containing material 116 according to the present disclosure.

Figure 10:
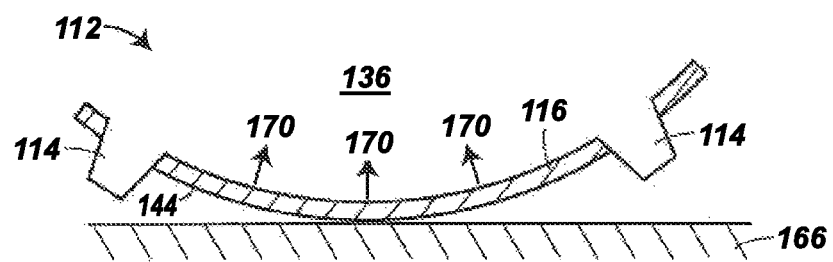
FIG. 10 is a side cross-sectional view of an outsole in an aspect according to the disclosure including a soil-shedding material and soil being shed therefrom, during impact with a ground surface.

In addition to the uptake, compression, expulsion, re-uptake, and swelling cycle discussed above, the increased compliance of the hydrogel-containing material 116, for example elongational compliance in the longitudinal direction, may allow the hydrogel-containing material 116 to be more malleable and stretchable when swelled. For example, as illustrated in FIG. 10 (without a tie layer), during a foot rotation in a foot strike (e.g., as the foot generally rolls from heel to toe during a stride), the outsole 112 and the hydrogel-containing material 116 are correspondingly flexed (e.g., inducing compression forces illustrated by arrows 170). One of skill will appreciate that a tie layer could be added between the hydrogel-containing material and a backing layer or substrate body, as seen in the above figures.

The increased elongation or stretchiness of the hydrogel-containing material 116 when partially or fully saturated with water can increase the extent that the hydrogel-containing material 116 stretches during this flexing, which can induce additional shear on any soil adhered to the material surface 162. As illustrated, a rolling ground strike creates a curved outsole 112 and a curved compressed hydrogel-containing material 116, which can cause water to be expelled therefrom and transverse material stretching forces being induced to pull apart and shed the soil. The compression forces (illustrated by arrows 170) on the hydrogel-containing material 116, which can help to expel the water can be particularly strong at points of contact with the ground 166 and/or where the radius of curvature of the curved outsole 112/curved hydrogel-containing material 116 is relatively small or at its minimum.

The foregoing properties of the hydrogel-containing material 116 related to compression/expansion compliance and the elongation compliance are believed to be closely interrelated, and they can depend on the same hydrogel-containing material 116 properties (e.g., a hydrophilic material able to able to rapidly take up and expel relatively large amounts of water compared to the material size or thickness). A distinction is in their mechanisms for preventing soil accumulation, for example surface adhesion disruption versus shear inducement. The water re-uptake is believed to potentially act to quickly expand or swell the hydrogel-containing material 116 after being compressed to expel water. Rapid water uptake can provide a mechanism for replenishing the hydrogel-containing material 116 water content between foot strikes. Rapid replenishment of the hydrogel-containing material 116 water content can restore the hydrogel-containing material 116 to its compliant state, returning it to a state where stretching and shearing forces can contribute to debris shedding. In addition, replenishment of the hydrogel-containing material 116 water content can permit subsequent water expulsion to provide an additional mechanism for preventing soil accumulation (e.g., application of water pressure and modification of soil rheology). As such, the water absorption/expulsion cycle can provide a unique combination for preventing soil accumulation on the outsole 112 of the footwear 100.

In addition to being effective at preventing soil accumulation, the hydrogel-containing material 116 has also been found to be sufficiently durable for its intended use on the ground-contacting side of the outsole 112. Durability is based in part on the nature and strength of the interfacial bond of the hydrogel-containing material 116 to the tie layer 206, as well as the physical properties of the hydrogel-containing material 116 itself. For many examples, during the useful life of the hydrogel-containing material 116, the hydrogel-containing material 116 may not delaminate from the tie layer 206 and/or backing plate 136, and it can be substantially abrasion- and wear-resistant (e.g., maintaining its structural integrity without rupturing or tearing).

In various aspects, the useful life of the hydrogel-containing material 116 (and the outsole 112 and footwear 100 containing it) is at least 10 hours, 20 hours, 50 hours, 100 hours, 120 hours, or 150 hours of wear. For example, in some applications, the useful life of the hydrogel-containing material 116 ranges from 20 hours to 120 hours. In other applications, the useful life of the hydrogel-containing material 116 ranges from 50 hours to 100 hours of wear.

Interestingly, for many examples, the dry and wet states of the hydrogel-containing material 116 can allow the hydrogel-containing material 116 to dynamically adapt in durability to account for dry and wet surface play. For example, when used on a dry ground 166, the hydrogel-containing material 116 can also be dry, which renders it stiffer and more wear resistant. Alternatively, when used on wet ground 166 or when wet material is present on a dry ground 166, the hydrogel-containing material 116 can quickly take up water to achieve a partially or fully saturated condition, which may be a swollen and/or compliant state. However, the wet ground 166 imposes less wear on the swollen and compliant hydrogel-containing material 116 compared to dry ground 166. As such, the hydrogel-containing material 116 can be used in a variety of conditions, as desired. Nonetheless, the footwear 100 and the outsole 112 are particularly beneficial for use in wet environments, such as with muddy surfaces, grass surfaces, and the like.

Figure 11:
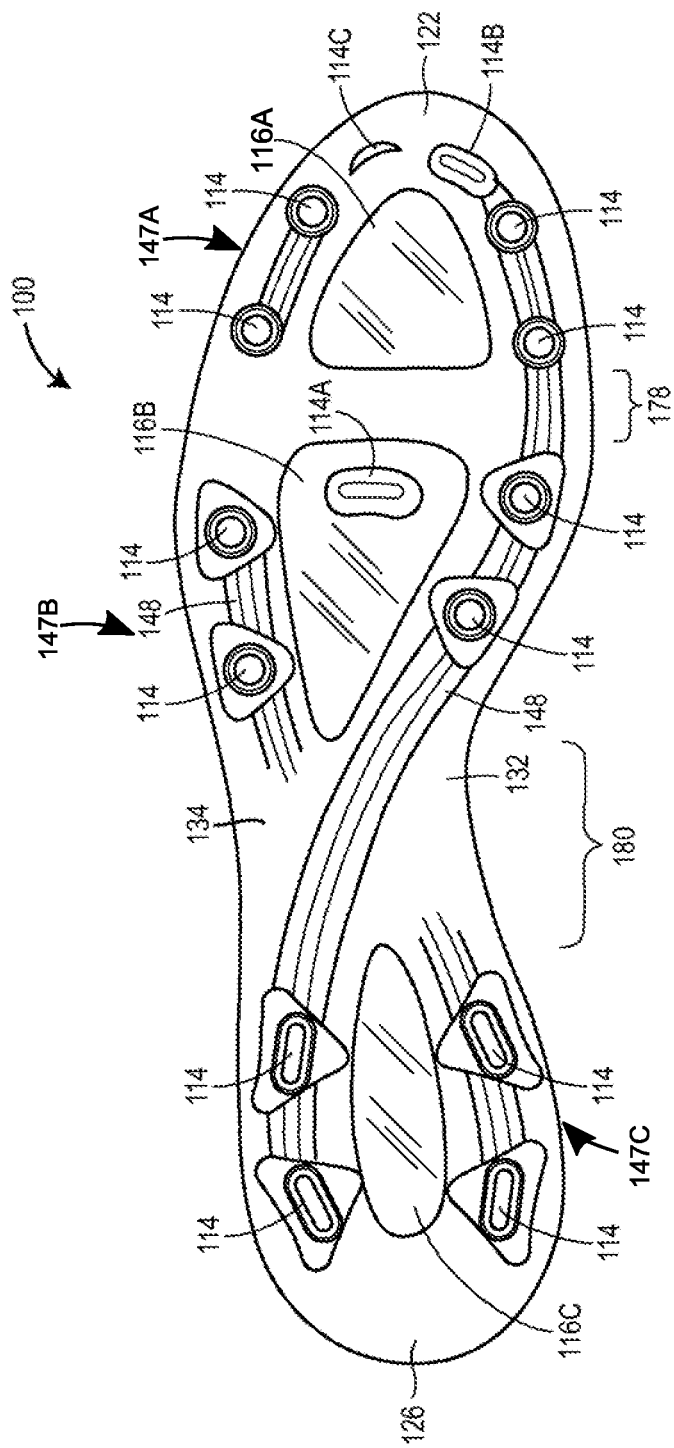
FIG. 11 is a bottom view of an article of footwear in another aspect of the present disclosure having an outsole including a hydrogel-containing material in accordance with the present disclosure, the material having discrete and separate sub-segments.

While the hydrogel-containing material 116 is illustrated above in FIGS. 1B-4 as extending across the entire tie layer 206 and bottom surface 144 of the outsole 112 of the footwear 100, in alternative aspects, the hydrogel-containing material 116 can alternatively be present as one or more segments that are present at separate, discrete locations of the outsole 112. For instance, as shown in FIG. 11, the hydrogel-containing material 116 can alternatively be present as a first segment 116A secured to the tie layer (obscured in this view by the hydrogel-containing material) and/or bottom surface 144 at the forefoot region 122, such as in the interstitial region between the traction elements 114 of cluster 147A; a second segment 116B secured to the tie layer or to the bottom surface 144 at the midfoot region 124, such as in the interstitial region between the traction elements 114 of cluster 147B; and/or a third segment 116C secured to the tie layer or to the bottom surface 144 at the heel region 126, such as in the interstitial region between the traction elements 114 of cluster 147C. In each of these examples, the remaining regions of the bottom surface 144 can be free of the hydrogel-containing material 116.

In some arrangements, the hydrogel-containing material 116 is present as one or more segments secured to the tie layer or to the bottom surface 144 at a region 178 between the clusters 147A and 147B, at a region 180 between the clusters 147B and 147C, or both. For example, the hydrogel-containing material 116 may include a first segment present on the tie layer or bottom surface 144 that encompasses the locations of segment 116A, the region 178, and segment 116B as well at the location of region 178; and a second segment corresponding to the segment 116B (at the cluster 147C). As also shown in FIG. 11, the segments of the hydrogel-containing material 116 (e.g., segments 116A, 116B, and 116C) can optionally have surface dimensions that conform to the overall geometry of the tie layer and/or the backing plate 136, such as to conform to the contours of the ridges 148, the traction elements 114, and the like.

In another arrangement, the bottom surface 144 includes a front edge region 182 between the front edge 128 and the cluster 147A (and optionally include a front portion of the cluster 147A) that is free of the tie layer and the hydrogel-containing material 116. As some of the examples of the hydrogel-containing material 116 may be slippery when partially or fully saturated, having the hydrogel-containing material 116 present in the front edge region 182 can potentially impact traction and ball handling during sports. Furthermore, soil accumulation is typically most prominent in the interstitial regions of the clusters 147A, 147B, and 147C, in comparison to the front edge 128.

Figure 12:
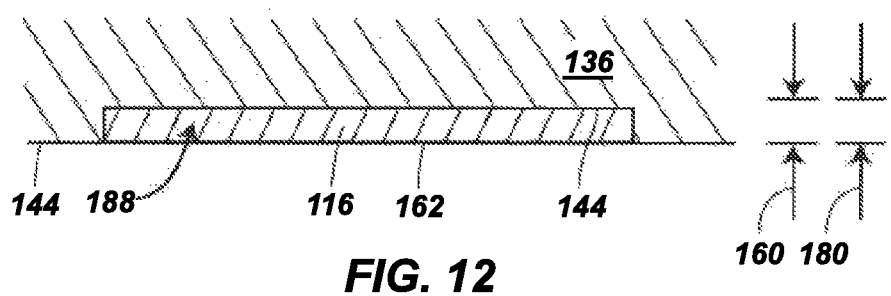
FIG. 12 is an expanded sectional view of a portion of an outsole in another aspect of the present disclosure, which includes a hydrogel-containing material in accordance with the present disclosure, the material being present in a recessed pocket of an outsole backing plate.

Furthermore, the optional backing plate 136 can also include one or more recessed pockets, such as a pocket 188 shown in FIG. 12, in which the hydrogel-containing material 116 or a sub-segment of the hydrogel-containing material 116 can reside. This can potentially increase the durability of the hydrogel-containing material 116 by protecting it from lateral delamination stresses. For instance, the backing plate 136 can include a pocket 188 in the interstitial region of cluster 147C, where the sub-segment 116C of the hydrogel-containing material 116 can be secured to the bottom surface 144 within the pocket 188. In this case, the dry-state thickness 160 of the hydrogel-containing material 116 can vary relative to a depth 190 of the pocket 188.

In some aspects, the depth 190 of the pocket 188 can range from 80% to 120%, from 90% to 110%, or from 95% to 105% of the dry-state thickness 160 of the hydrogel-containing material 116. Moreover, in aspects in which the backing plate 136 includes multiple pockets 188, each pocket 188 may have the same depth 190 or the depths 190 may independently vary as desired. As can be appreciated, the increased bonding of the hydrogel-containing material 116 due to the recessed pocket 188 can potentially reduce the swelling of the hydrogel-containing material 116 when partially or fully saturated. However, a significant portion of the hydrogel-containing material 116 can be offset enough from the walls of the pocket 188 such that these interfacial bonds (relative to the dry-state thickness 160) will minimally affect the swelling and water-absorbing performance of the hydrogel-containing material 116.

Figure 13:
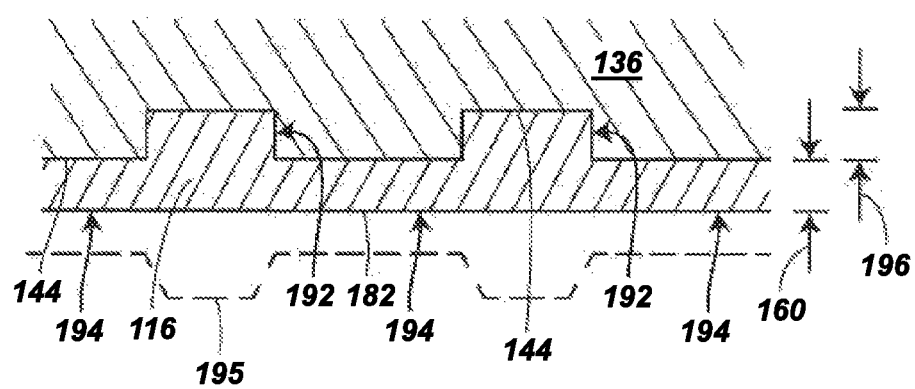
FIG. 13 is an expanded sectional view of a portion of an outsole in another aspect of the present disclosure, which includes an outsole backing plate having one or more indentations, and a hydrogel-containing material in accordance with the present disclosure, the hydrogel-containing material being present in and over the indentations.

FIG. 13 illustrates an alternative design for the engagement between the hydrogel-containing material 116 and the bottom surface 144. In this case, the backing plate 136 can include one or more recessed indentations 192 having any suitable pattern(s), and in which portions of the hydrogel-containing material 116 extend into the indentations 192 to increase the interfacial bond surface area between the hydrogel-containing material 116 and the bottom surface 144 of the backing plate 136. For example, the indentations 192 can be present as one or more geometrically-shaped holes (e.g., circular, rectangular, or other geometric shapes) or irregularly-shaped holes in the backing plate 136, one or more trenches or channels extending partially or fully along the backing plate 136 (in the lateral, longitudinal, or diagonal directions), and the like.

In these aspects, the hydrogel-containing material 116 can have two (or more) thicknesses depending on whether a given portion of the hydrogel-containing material 116 extends into one of the indentations. For ease of discussion and readability, the dry-state thickness 160 of the hydrogel-containing material 116, as used herein, refers to a portion of the hydrogel-containing material 116 (in a dry state) that does not extend into one of the indentations, such as at locations 194. As such, the dry-state thickness 160 shown in FIG. 13 is the same as the dry-state thickness 160 shown above in FIG. 5.

Each indentation 192 may independently have a depth 196, which can range from 1% to 200%, from 25% to 150%, or from 50% to 100% of the dry-state thickness 160 of the hydrogel-containing material 116. In these locations, the dry-state thickness of the hydrogel-containing material 116 is the sum of the dry-state thickness 160 and the depth 196. An interesting result of this arrangement is that the hydrogel-containing material 116 can potentially swell to different partially or fully saturated-state thicknesses 164. In particular, because the amount that the hydrogel-containing material 116 swells depends on the initial, dry-state thickness of the hydrogel-containing material 116, and because the portions of the hydrogel-containing material 116 at the indentations 192 have greater dry-state thicknesses compared to the portions of the hydrogel-containing material 116 at locations 194, this can result in a non-planar swelling of the hydrogel-containing material 116, as depicted by broken lines 198. The particular dimensions of the non-planar swelling can vary depending on the relative dry-state thicknesses of the hydrogel-containing material 116, the depth 196 of the indentations 192, the extent of saturation of the hydrogel-containing material 116, the particular composition of the hydrogel-containing material 116, and the like.

Figure 14:
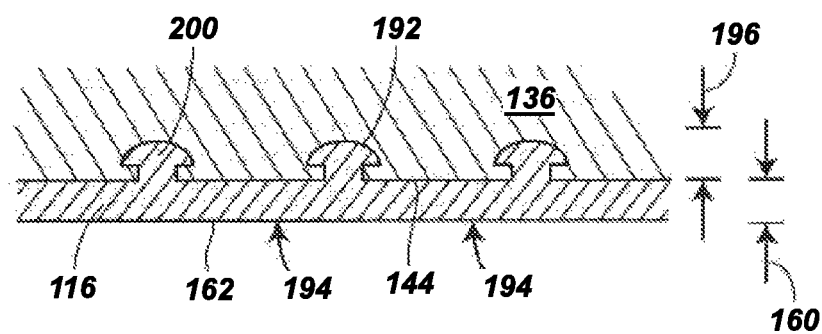
FIG. 14 is an expanded sectional view of a portion of an outsole in another aspect of the present disclosure, which includes an outsole backing plate having one or more indentations having locking members, and a hydrogel-containing material in accordance with the present disclosure, the hydrogel-containing material being present in and over the indentations.

FIG. 14 illustrates a variation on the indentations 192 shown above in FIG. 13. In the design shown in FIG. 14, the indentations 192 can also extend in-plane with the backing plate 136 to form locking members 200 (e.g., arms or flanged heads). This design can also be produced with co-extrusion or injection molding techniques, and can further assist in mechanically locking the hydrogel-containing material 116 to the backing plate 136. As above, one of skill in the art will appreciate that any of FIGS. 12-14 could include a tie layer, as shown in FIGS. 1A-B, between the backing plate 136 and the hydrogel-containing material 116 to assist in bonding.

As discussed above, the outsole 112 with the hydrogel-containing material 116 is particularly suitable for use in global football/soccer applications. However, the hydrogel-containing material 116 can also be used in combination with other types of footwear 100, such as for articles of footwear 100 for golf (shown in FIG. 15), for baseball (shown in FIG. 16), and for American football (shown in FIG. 17), each of which can include traction elements 114 as cleats, studs, and the like.

Figure 15:
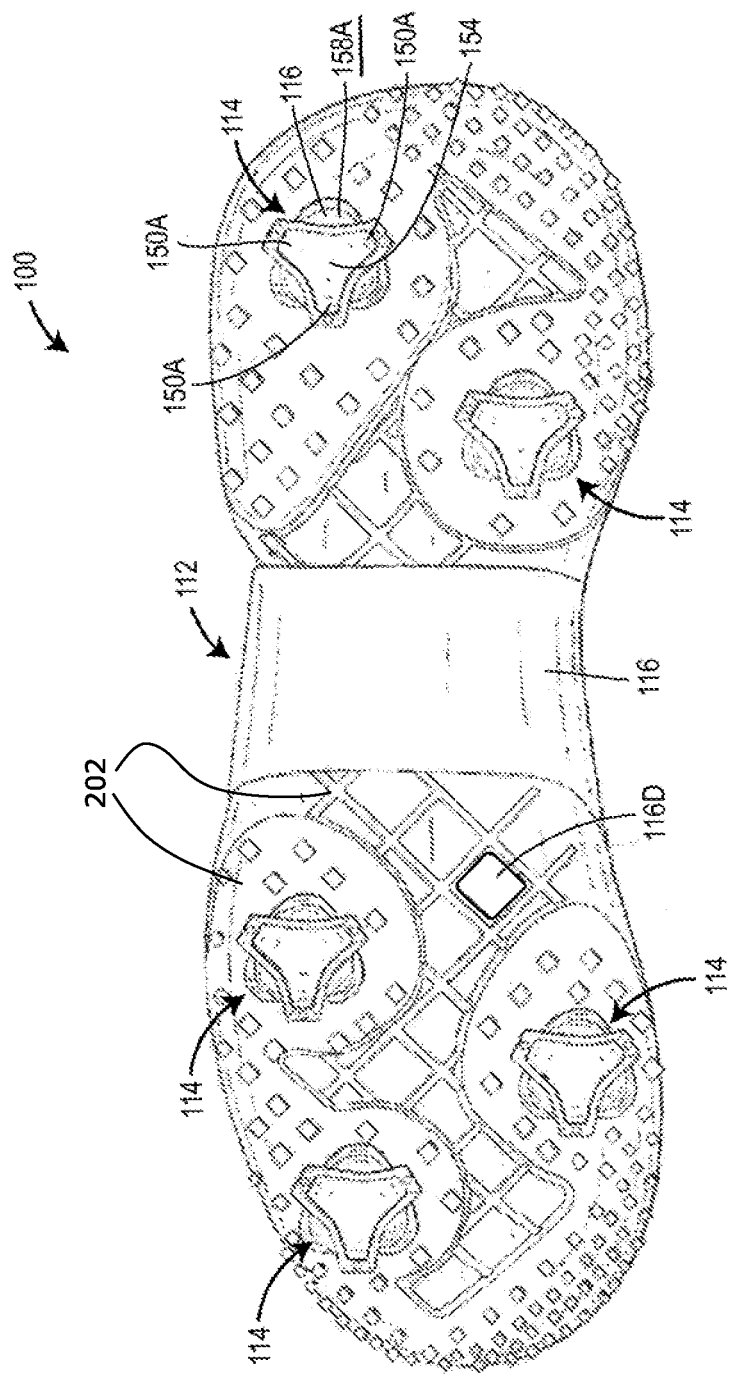
FIG. 15 is a bottom view of an article of footwear in another aspect of the present disclosure, which illustrates an example golf shoe application.

FIG. 15 illustrates an aspect in which the hydrogel-containing material 116 is positioned on one or more portions of the outsole 112 and/or traction elements 114 in an article of golf footwear 100. In some cases, the hydrogel-containing material 116 is present on one or more locations of the ground-facing surface of the outsole 112 except the traction elements 114 (e.g., a non-cleated surface, such as generally illustrated in FIG. 1B for the global football/soccer footwear 100). Alternatively or additionally, the hydrogel-containing material 116 can be present as one or more material segments 116D on one or more surfaces between tread patterns 202 on ground-facing surface of the outsole 112.

Alternatively or additionally, the hydrogel-containing material 116 can be incorporated onto one or more surfaces of the traction elements 114. For example, the hydrogel-containing material 116 can also be on a central region of traction element 114 between the shafts/spikes 150A, such as a surface opposing the area where the traction element 114 is mounted to the outsole 112 backing plate 136. In many traction elements used for golf footwear, the traction element 114 has a generally flat central base region 158A and a plurality of shafts/spikes 150A arranged around the perimeter of the central region 158A. In such traction elements, the hydrogel-containing material 116 can be located on the generally flat central base region 158A.

In such aspects, remaining regions of the outsole 112 can be free of the hydrogel-containing material 116. For example, the cleats 114 having hydrogel-containing material 116 can be separate components that can be secured to the outsole 112 (e.g., screwed or snapped in), where the outsole 112 itself can be free of the hydrogel-containing material 116. In other words, the material-covered cleats 114 can be provided as components for use with standard footwear not otherwise containing the 116 (e.g., golf shoes or otherwise).

Figure 16:
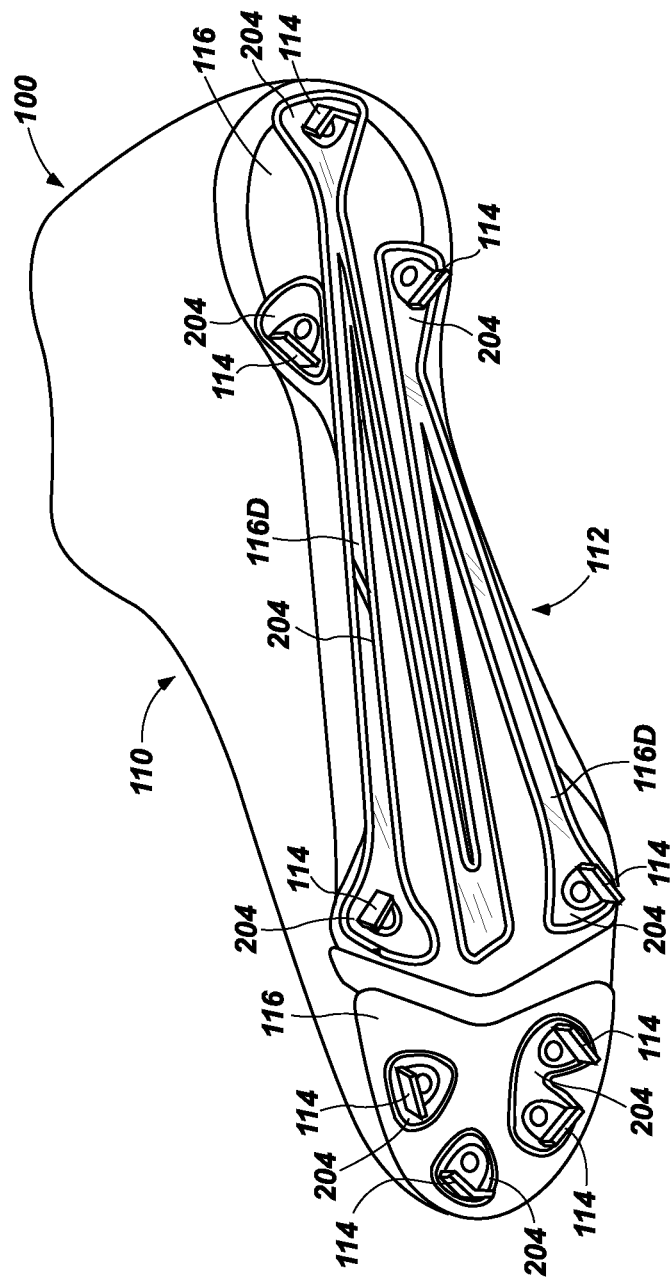
FIG. 16 is a bottom perspective view of an article of footwear in another aspect of the present disclosure, which illustrates an example baseball shoe application.

FIG. 16 illustrates an aspect in which the hydrogel-containing material 116 is positioned on one or more portions of the outsole 112 in an article of baseball footwear 100. In some cases, the hydrogel-containing material 116 is present on one or more locations of the ground-facing surface of the outsole 112 except the cleats 114 (e.g., a non-cleated surface, such as generally illustrated in FIG. 1B for the global football/soccer footwear 100). Alternatively or additionally, the hydrogel-containing material 116 can be present as one or more material segments 116D on one or more recessed surfaces 204 in the ground-facing surface of the outsole 112, which recessed surfaces 204 can include the cleats 114 therein (e.g., hydrogel-containing material 116 is located only in one or more of the recessed surfaces 204, but not substantially on the cleats).

Figure 17:
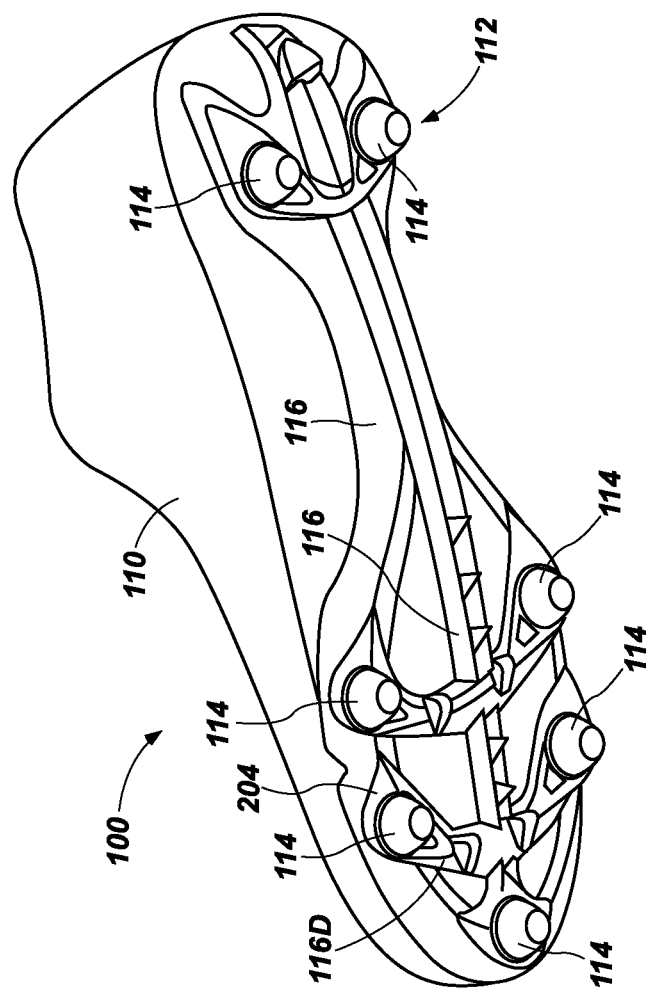
FIG. 17 is a bottom perspective view of an article of footwear in another aspect of the present disclosure, which illustrates an example American football shoe application.

FIG. 17 illustrates an aspect in which the hydrogel-containing material 116 is positioned on one or more portions of the outsole 112 in an article of American football footwear 100. In some cases, the hydrogel-containing material 116 is present on one or more locations of the ground-facing surface of the outsole 112 except the cleats 114 (e.g., a non-cleated surface, such as generally illustrated in FIG. 1B for the global football/soccer footwear 100). Alternatively or additionally, the hydrogel-containing material 116 can be present as one or more material segments 116D on one or more recessed surfaces 204 in the ground-facing surface of the outsole 112, which recessed surfaces 204 can include the cleats 114 therein (e.g., hydrogel-containing material 116 is located only in one or more of the recessed surfaces 204, but not substantially on the cleats).

Figure 18:
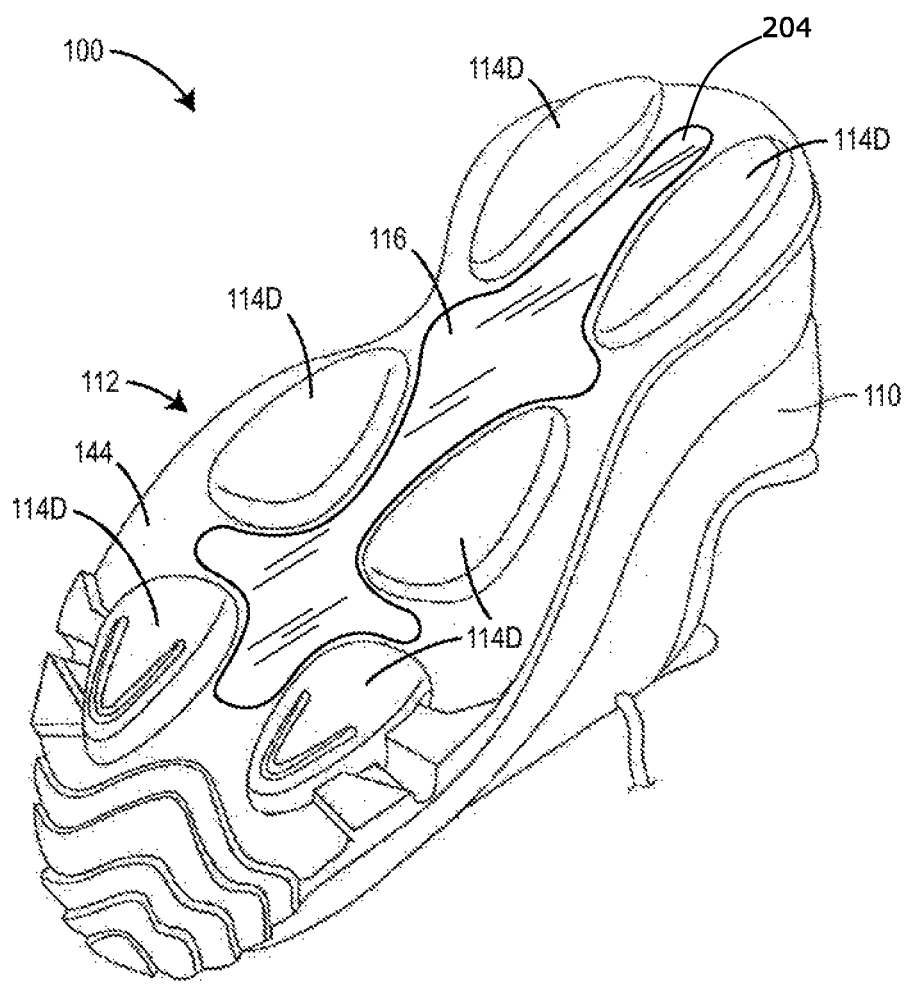
FIG. 18 is a bottom perspective view of an article of footwear in another aspect of the present disclosure, which illustrates an example hiking shoe application.

FIG. 18 illustrates an aspect in which the hydrogel-containing material 116 is positioned on one or more portions of the outsole 112 in an article of hiking footwear 100 (e.g., hiking shoes or boots). As illustrated, the traction elements 114 are in the form of lugs 114D which are integrally formed with and protrude from the outsole 112 bottom surface 144. In some cases, the hydrogel-containing material 116 is present on one or more locations of the bottom surface 144 of the outsole 112 except the lugs 114D. For example, the hydrogel-containing material 116 can be located on recessed surfaces 204 between adjacent lugs 114D (e.g., but not substantially on the lugs 114D).

The foregoing discussions of footwear 100 and outsole 112 have been made above in the context of footwear having traction elements (e.g., traction elements 114), such as cleats, studs, spikes, lugs, and the like. However, footwear 100 having hydrogel-containing material 116 can also be designed for any suitable activity, such as running, track and field, rugby, cycling, tennis, and the like. In these aspects, one or more segments of the hydrogel-containing material 116 are preferably located in interstitial regions between the traction elements, such as in the interstitial grooves of a running shoe tread pattern.

As discussed above, the material of the present disclosure, such as the hydrogel-containing material 116 for use with outsole 112 (and footwear 100), can compositionally include a hydrogel which allows the material to take up water. As used herein, the terms "take up", "taking up", "uptake", "uptaking", and the like refer to the drawing of a liquid (e.g., water) from an external source into the material, such as by absorption, adsorption, or both. Furthermore, as briefly mentioned above, the term "water" refers to an aqueous liquid that can be pure water, or can be an aqueous carrier with lesser amounts of dissolved, dispersed or otherwise suspended materials (e.g., particulates, other liquids, and the like).

The ability of the material (e.g., the hydrogel-containing material 116) when used on an outsole to uptake water and to correspondingly swell and increase in compliance can reflect its ability to prevent soil accumulation during use with an article of footwear (e.g., footwear 100). As discussed above, when the hydrogel-containing material takes up water (e.g., through absorption, adsorption, capillary action, etc. . . . ), the water taken up by the material transitions the hydrogel-containing material from a dry, relatively more rigid state to a partially or fully saturated state that is relatively more compliant. When the hydrogel-containing material is then subjected to an application of pressure, either compressive or flexing, the material can reduce in volume, such as to expel at least a portion of its water.

This expelled water is believed to reduce the adhesive/cohesive forces of soil particles at the outsole, which taken alone, or more preferably in combination with the material compliance, can prevent or otherwise reduce soil accumulation at the outsole. Accordingly, the material can undergo dynamic transitions during and between foot strikes, such as while a wearer is running or walking, and these dynamic transitions can result in forces which dislodge accumulated soil or otherwise reduce soil accumulation on the outsole as well.

Based on the multiple interacting mechanisms involved in reducing or preventing soil accumulation on the outsoles of the present disclosure, it has been found that different properties of the material used to form all or a portion of an outsole can be used to select the desired performance benefits needed, such as, for example, preventing or reducing soil adherence to the outsoles or increasing compliance or durability of the material. For instance, the article of footwear of the present disclosure (e.g., the footwear 100), the outsole (e.g., the outsole 114), and the material (e.g., the hydrogel-containing material 116) can be characterized in terms of material's water uptake capacity and rate, swelling capacity, contact angle when wet, coefficient of friction when wet and dry, reduction in storage modulus from dry to wet, reduction in glass transition temperature from dry to wet, and the like.

The terms "Article Sampling Procedure", "Co-Extruded Film Sampling Procedure", "Neat Film Sampling Procedure", "Neat Material Sampling Procedure", "Water Uptake Capacity Test", "Water Uptake Rate Test", "Swelling Capacity Test", "Contact Angle Test", "Coefficient of Friction Test", "Storage Modulus Test", "Glass Transition Temperature Test", "Impact Energy Test", and "Soil Shedding Article Test" as used herein refer to the respective sampling procedures and test methodologies described in the Property Analysis And Characterization Procedure section below. These sampling procedures and test methodologies characterize the properties of the recited materials, films, articles and components, and the like, and are not required to be performed as active steps in the claims.

It is to be understood that any of the Tests disclosed herein can be conducted using any of the Sampling Procedures disclosed herein to determine a property of an article or a property which can be attributed to an article (e.g. an outsole of an article of footwear) based on a measurement made in a simulated environment (e.g., using a sample prepared according to the Co-extruded Film Sampling Procedure, the Neat Film Sampling Procedure, or the Neat Material Sampling Procedure). In other words, a measurement obtained on a neat material can be attributed to an article comprising the hydrogel-containing material where the hydrogel-containing material defines at least a portion of a surface or side of the article. Additionally, a measurement made in a simulated environment can be used to select the desired performance property for an article comprising the hydrogel-containing material where the material defines at least a portion of a surface or side of the article.

For example, in some aspects, the hydrogel-containing material (e.g., material present as a sample of a portion of an article prepared according to the Article Sampling Procedure, the article having the material present at or defining a side or surface of the article from which the sample was taken) has a water uptake capacity at 24 hours greater than 40% by weight, as characterized by the Water Uptake Capacity Test with the Article Sampling Procedure, each as described below. In some aspects, it is believed that if a particular article is not capable of taking up greater than 40% by weight in water within a 24-hour period, either due to its water uptake rate being too slow, or its ability to take up water is too low (e.g., due to its thinness, not enough material may be present, or the overall capacity of the material to take up water is too low), then the article may not be effective in preventing or reducing soil accumulation.

In further aspects, the hydrogel-containing material as secured to present in, or defining a portion of an article or component (e.g. including a side or surface of an outsole formed of the material) has a water uptake capacity at 24 hours greater than 50% by weight, greater than 100% by weight, greater than 150% by weight, or greater than 200% by weight. In other aspects, outsole has a water uptake capacity at 24 hours less than 900% by weight, less than 750% by weight, less than 600% by weight, or less than 500% by weight.

In particular aspects, the hydrogel-containing material as secured to present in, or defining a portion of an article or component (e.g. including a side or surface of an outsole formed of the material) has a water uptake capacity at 24 hours ranging from 40% by weight to 900% by weight. For example, the outsole can have a water uptake capacity ranging from 100% by weight to 900% by weight, from 100% by weight to 750% by weight, from 100% by weight to 700% by weight, from 150% by weight to 600% by weight, from 200% by weight to 500% by weight, or from 300% by weight to 500% by weight.

These water uptake capacities are determined by the Water Uptake Capacity Test with the Article Sampling Procedure, and can apply to samples taken at any suitable representative location along the article, where the samples may be acquired pursuant to the Article Sampling Procedure. In some cases, samples can be taken from one or more of the forefoot region, the midfoot region, and/or the heel region of footwear; from each of the forefoot region, the midfoot region, and the heel region of footwear; from within one or more of the traction element clusters (between the traction elements) at the forefoot region, the midfoot region, and/or the heel region of footwear; from of the traction element clusters of footwear; on planar regions of the traction elements of footwear (for aspects in which the material is present on the traction elements), and combinations thereof.

As discussed below, the water uptake capacity of the hydrogel-containing material as secured to present in, or defining a portion of an article or component (e.g. including a side or surface of an outsole formed of the material) can alternatively be measured in a simulated environment, such as using the material co-extruded with a backing substrate or substrate body. The backing substrate can be produced from any suitable material that is compatible with the material, such as a material used to form an outsole backing plate. As such, suitable water uptake capacities at 24 hours for the material as co-extruded with a backing substrate, as characterized by the Water Uptake Capacity Test with the Co-extruded Film Sampling Procedure, include those discussed above for the Water Uptake Capacity Test with the Article Sampling Procedure.

Additionally, it has been found that when the hydrogel-containing material is secured to another surface, such as being thermally or adhesively bonded to a tie layer, the interfacial bond formed between the material and the tie layer can restrict the extent that the hydrogel-containing material can take up water and/or swell. As such, it is believed that the hydrogel-containing material as bonded to a tie layer or co-extruded tie layer can potentially have a lower water uptake capacity and/or a lower swell capacity compared to the same material in a neat material form, including neat film form.

As such, the water uptake capacity and the water uptake rate of the hydrogel-containing material can also be characterized based on the hydrogel-containing material in neat form (e.g., an isolated film that is not bonded to another material). The hydrogel-containing material in neat form can have a water uptake capacity at 24 hours greater than 40% by weight, greater than 100% by weight, greater than 300% by weight, or greater than 1000% by weight, as characterized by the Water Uptake Capacity Test with the Neat Film Sampling Procedure or the Neat Material Sampling Procedure. The material in neat form can also have a water uptake capacity at 24 hours less than 900% by weight, less than 800% by weight, less than 700% by weight, less than 600% by weight, or less than 500% by weight.

In particular aspects, the hydrogel-containing material in neat form has a water uptake capacity at 24 hours ranging from 40% by weight to 900% by weight, from 150% by weight to 700% by weight, from 200% by weight to 600% by weight, or from 300% by weight to 500% by weight.

The hydrogel-containing material as secured to present in, or defining a portion of an article or component (e.g. including a side or surface of an outsole formed of the material) can also have a water uptake rate greater than 20 grams/(meter$^2$-minutes$^{1/2}$), as characterized by the Water Uptake Rate Test with the Article Sampling Procedure. As discussed above, in some aspects, the outsole having the hydrogel-containing material 116 can take up water between the compressive cycles of foot strikes, which is believed to at least partially replenish the hydrogel-containing material between the foot strikes.

As such, in further aspects, the hydrogel-containing material as secured to present in, or defining a portion of an article or component (e.g. including a side or surface of an outsole formed of the material) has a water uptake rate greater than 20 grams/(meter$^2$-minutes$^{1/2}$), greater than 100 grams/(meter$^2$-minutes$^{1/2}$), greater than 200 grams/(meter$^2$-minutes$^{1/2}$), greater than 400 grams/(meter$^2$-minutes$^{1/2}$), or greater than 600 grams/(meter$^2$-minutes$^{1/2}$). In particular aspects, the article has a water uptake rate ranging from 1 to 1,500 grams/(meter$^2$-minutes$^{1/2}$), 20 to 1,300 grams/(meter$^2$-minutes$^{1/2}$), from 30 to 1,200 grams/(meter$^2$-minutes$^{1/2}$), from 30 to 800 grams/(meter$^2$-minutes$^{1/2}$), from 100 to 800 grams/(meter$^2$-minutes$^{1/2}$), from 100 to 600 grams/(meter$^2$-minutes$^{1/2}$), from 150 to 450 grams/(meter$^2$-minutes$^{1/2}$), from 200 to 1,000 grams/(meter$^2$-minutes$^{1/2}$), from 400 to 1,000 grams/(meter$^2$-minutes$^{1/2}$), or from 600 to 900 grams/(meter$^2$-minutes$^{1/2}$).

Suitable water uptake rates for the hydrogel-containing material as secured to a co-extruded backing substrate, as characterized by the Water Uptake Rate Test with the Co-extruded Film Sampling Procedure, and as provided in neat form, as characterized by the Water Uptake Rate Test with the Neat Film Sampling Procedure, each include those discussed above for the Water Uptake Rate Test with the Article Sampling Procedure.

In certain aspects, the hydrogel-containing material as secured to, present in, or defining a portion of an article or component (e.g. including a side or surface of an outsole formed of the material) can also swell, increasing the hydrogel-containing material's thickness and/or volume, due to water uptake. This swelling of the hydrogel-containing material can be a convenient indicator showing that the hydrogel-containing material is taking up water, and can assist in rendering the material compliant. In some aspects, the article has an increase in material thickness (or swell thickness increase) at 1 hour of greater than 20% or greater than 50%, for example ranging from 30% to 350%, from 50% to 400%, from 50% to 300%, from 100% to 300%, from 100% to 200%, or from 150% to 250%, as characterized by the Swelling Capacity Test with the Article Sampling Procedure. In further aspects, the article has an increase in material thickness at 24 hours ranging from 45% to 400%, from 100% to 350%, or from 150% to 300%.

Additionally, the hydrogel-containing material as secured to, present in, or defining a portion of an article or component (e.g. including a side or surface of an outsole formed of the material) can have an increase in hydrogel-containing material volume (or volumetric swell increase) at 1 hour of greater than 50%, for example ranging from 10% to 130%, from 30% to 100%, or from 50% to 90%. Moreover, the article can have an increase in material volume at 24 hours ranging from 25% to 200%, from 50% to 150%, or from 75% to 100%.

For co-extruded film simulations, suitable increases in material thickness and volume at 1 hour and 24 hours for the material as secured to a co-extruded backing substrate, as characterized by the Swelling Capacity Test with the Co-extruded Film Sampling Procedure, include those discussed above for the Swelling Capacity Test with the Article Sampling Procedure.

The hydrogel-containing material in neat form can have an increase in material thickness at 1 hour ranging from 35% to 400%, from 50% to 300%, or from 100% to 200%, as characterized by the Swelling Capacity Test with the Neat Film Sampling Procedure. In some further aspects, the hydrogel-containing material in neat form can have an increase in material thickness at 24 hours ranging 45% to 500%, from 100% to 400%, or from 150% to 300%. Correspondingly, the hydrogel-containing material in neat form can have an increase in material volume at 1 hour ranging from 50% to 500%, from 75% to 400%, or from 100% to 300%.

As also discussed above, in some aspects, the surface of the hydrogel-containing material forms a side or surface of the article, wherein the side or surface has hydrophilic properties. The hydrophilic properties of the material's surface can be characterized by determining the static sessile drop contact angle of the hydrogel-containing material's surface. Accordingly, in some examples, the hydrogel-containing material's surface in a dry state has a static sessile drop contact angle (or dry-state contact angle) of less than 105°, or less than 95°, less than 85°, as characterized by the Contact Angle Test. The Contact Angle Test can be conducted on a sample obtained in accordance with the Article Sampling Procedure, the Co-Extruded Film Sampling Procedure, or the Neat Film Sampling Procedure. In some further examples, the hydrogel-containing material in a dry state has a static sessile drop contact angle ranging from 60° to 100°, from 70° to 100°, or from 65° to 95°.

In other examples, the hydrogel-containing material's surface in a wet state has a static sessile drop contact angle (or wet-state contact angle) of less than 90°, less than 80°, less than 70°, or less than 60°. In some further examples, the surface in a wet state has a static sessile drop contact angle ranging from 45° to 75°. In some cases, the dry-state static sessile drop contact angle of the surface is greater than the wet-state static sessile drop contact angle of the surface by at least 10°, at least 15°, or at least 20°, for example from 10° to 40°, from 10° to 30°, or from 10° to 20°.

The surface of the hydrogel-containing material, including the surface of an article can also exhibit a low coefficient of friction when the material is wet. Examples of suitable coefficients of friction for the hydrogel-containing material in a dry state (or dry-state coefficient of friction) are less than 1.5, for instance ranging from 0.3 to 1.3, or from 0.3 to 0.7, as characterized by the Coefficient of Friction Test. The Coefficient of Friction Test can be conducted on a sample obtained in accordance with the Article Sampling Procedure, the Co-Extruded Film Sampling Procedure, or the Neat Film Sampling Procedure. Examples of suitable coefficients of friction for the hydrogel-containing material in a wet state (or wet-state coefficient of friction) are less than 0.8 or less than 0.6, for instance ranging from 0.05 to 0.6, from 0.1 to 0.6, or from 0.3 to 0.5. Furthermore, the hydrogel-containing material can exhibit a reduction in its coefficient of friction from its dry state to its wet state, such as a reduction ranging from 15% to 90%, or from 50% to 80%. In some cases, the dry-state coefficient of friction is greater than the wet-state coefficient of friction for the material, for example being higher by a value of at least 0.3 or 0.5, such as 0.3 to 1.2 or 0.5 to 1.

Furthermore, the compliance of the hydrogel-containing material, including an article comprising the material, can be characterized by based on the hydrogel-containing material's storage modulus in the dry state (when equilibrated at 0% relative humidity (RH)), and in a partially wet state (e.g., when equilibrated at 50% RH or at 90% RH), and by reductions in its storage modulus between the dry and wet states. In particular, the hydrogel-containing material can have a reduction in storage modulus ($\Delta E'$) from the dry state relative to the wet state. A reduction in storage modulus as the water concentration in the hydrogel-containing material increases corresponds to an increase in compliance, because less stress is required for a given strain/deformation.

In some aspects, the hydrogel-containing material exhibits a reduction in the storage modulus from its dry state to its wet state (50% RH) of more than 20%, more than 40%, more than 60%, more than 75%, more than 90%, or more than 99%, relative to the storage modulus in the dry state, and as characterized by the Storage Modulus Test with the Neat Film Sampling Process. In some further aspects, the dry-state storage modulus of the hydrogel-containing material is greater than its wet-state (50% RH) storage modulus by more than 25 megaPascals (MPa), by more than 50 MPa, by more than 100 MPa, by more than 300 MPa, or by more than 500 MPa, for example ranging from 25 MPa to 800 MPa, from 50 MPa to 800 MPa, from 100 MPa to 800 MPa, from 200 MPa to 800 MPa, from 400 MPa to 800 MPa, from 25 MPa to 200 MPa, from 25 MPa to 100 MPa, or from 50 MPa to 200 MPa. Additionally, the dry-state storage modulus can range from 40 MPa to 800 MPa, from 100 MPa to 600 MPa, or from 200 MPa to 400 MPa, as characterized by the Storage Modulus Test. Additionally, the wet-state storage modulus can range from 0.003 MPa to 100 MPa, from 1 MPa to 60 MPa, or from 20 MPa to 40 MPa.

In other aspects, the hydrogel-containing material exhibits a reduction in the storage modulus from its dry state to its wet state (90% RH) of more than 20%, more than 40%, more than 60%, more than 75%, more than 90%, or more than 99%, relative to the storage modulus in the dry state, and as characterized by the Storage Modulus Test with the Neat Film Sampling Process. In further aspects, the dry-state storage modulus of the hydrogel-containing material is greater than its wet-state (90% RH) storage modulus by more than 25 megaPascals (MPa), by more than 50 MPa, by more than 100 MPa, by more than 300 MPa, or by more than 500 MPa, for example ranging from 25 MPa to 800 MPa, from 50 MPa to 800 MPa, from 100 MPa to 800 MPa, from 200 MPa to 800 MPa, from 400 MPa to 800 MPa, from 25 MPa to 200 MPa, from 25 MPa to 100 MPa, or from 50 MPa to 200 MPa. Additionally, the dry-state storage modulus can range from 40 MPa to 800 MPa, from 100 MPa to 600 MPa, or from 200 MPa to 400 MPa, as characterized by the Storage Modulus Test. Additionally, the wet-state storage modulus can range from 0.003 MPa to 100 MPa, from 1 MPa to 60 MPa, or from 20 MPa to 40 MPa.

In addition to a reduction in storage modulus, the hydrogel-containing material can also exhibit a reduction in its glass transition temperature from the dry state (when equilibrated at 0% relative humidity (RH)) to the wet state (when equilibrated at 90% RH). While not wishing to be bound by theory, it is believed that the water taken up by the hydrogel-containing material plasticizes the hydrogel-containing material, which reduces its storage modulus and its glass transition temperature, rendering the hydrogel-containing material more compliant (e.g., compressible, expandable, and stretchable).

In some aspects, the hydrogel-containing material can exhibit a reduction in glass transition temperature ($\Delta T_g$) from its dry-state (0% RH) glass transition temperature to its wet-state glass transition (90% RH) temperature of more than a 5° C. difference, more than a 6° C. difference, more than a 10° C. difference, or more than a 15° C. difference, as characterized by the Glass Transition Temperature Test with the Neat Film Sampling Process or the Neat Material Sampling Process. For instance, the reduction in glass transition temperature ($\Delta T_g$) can range from more than a 5° C. difference to a 40° C. difference, from more than a 6° C. difference to a 50° C. difference, form more than a 10° C. difference to a 30° C. difference, from more than a 30° C. difference to a 45° C. difference, or from a 15° C. difference to a 20° C. difference. The hydrogel-containing material can also exhibit a dry glass transition temperature ranging from −40° C. to −80° C., or from −40° C. to −60° C.

Alternatively (or additionally), the reduction in glass transition temperature ($\Delta T_g$) can range from a 5° C. difference to a 40° C. difference, form a 10° C. difference to a 30° C. difference, or from a 15° C. difference to a 20° C. difference. The hydrogel-containing material can also exhibit a dry glass transition temperature ranging from −40° C. to −80° C., or from −40° C. to −60° C.

In further aspects, the hydrogel-containing material can exhibit a soil shedding ability with a relative impact energy ranging from 0 to 0.9, from 0.2 to 0.7, or from 0.4 to 0.5, as characterized by the Impact Energy Test with the Article Sampling Procedure, the Co-extruded Film Sampling Procedure, the Neat Film Sampling Procedure, or the Neat Material Sampling Procedure. Moreover, the material (e.g., the hydrogel-containing material 116) is preferably durable enough, and has a sufficient bond to the tie layer, for use over extended durations. For instance, it has been found that the hydrogel-containing material of the present disclosure can, in some aspects, continue to perform without significant visual abrasion or delamination for more than 80 or 100 hours, as discussed above.

In particular aspects, the hydrogel-containing material compositionally includes a hydrogel and one or more additives. As used herein, the term "hydrogel" refers to a composition that is capable of taking up at least 10% by weight in water, based on a dry weight of the composition. The hydrogel can be a polymeric hydrogel. The hydrogel can include a crosslinked or crosslinkable polymeric network, where crosslinks interconnect multiple polymer chains to form the polymeric network, and where the crosslinks can be physical crosslinks, covalent crosslinks, or can include both physical and covalent crosslinks (within the same polymeric network). The hydrogel can constitute more than 50% by weight of the entire material for the article, or more than 75% by weight, or more 85% by weight, or more than 95% by weight. In some aspects, the material of the article consists essentially of the hydrogel.

For a physical crosslink, a copolymer chain can form entangled regions and/or crystalline regions through non-covalent bonding interactions, such as, for example, an ionic bond, a polar bond, and/or a hydrogen bond. In particular aspects, the crystalline regions create the physical crosslink between the copolymer chains. The crystalline regions can include hard segments, as described below.

In some aspects, the hydrogel can exhibit sol-gel reversibility, allowing it to function as a thermoplastic polymer, which can be advantageous for manufacturing and recyclability. As such, in some aspects, the hydrogel of the material includes a physically crosslinked polymeric network to function as a thermoplastic hydrogel.

The physically crosslinked hydrogels can be characterized by hard segments and soft segments, which can exist as phase separated regions within the polymeric network while the hydrogel is in a solid (non-molten) state. The hard segments can form portions of the polymer chain backbones, and can exhibit high polarities, allowing the hard segments of multiple polymer chains to aggregate together, or interact with each other, to form semi-crystalline regions of the polymeric network.

A "semi-crystalline" or "crystalline" region has an ordered molecular structure with sharp melt points, which remains solid until a given quantity of heat is absorbed and then rapidly changes into a low viscosity liquid. A "pseudo-crystalline" region has properties of a crystal, but does not exhibit a true crystalline diffraction pattern. For ease of reference, the term "crystalline region" will be used herein to collectively refer to a crystalline region, a semi-crystalline region, and a pseudo-crystalline region of a polymeric network.

In comparison, the soft segments can be longer, more flexible, hydrophilic regions of the polymeric network that allow the polymer network to expand and swell under the pressure of taken up water. The soft segments can constitute amorphous hydrophilic regions of the hydrogel. The soft segments, or amorphous regions, can also form portions of the backbones of the polymer chains along with the hard segments. Additionally, one or more portions of the soft segments, or amorphous regions, can be grafted or otherwise extend as pendant chains that extend from the backbones at the soft segments. The soft segments, or amorphous regions, can be covalently bonded to the hard segments, or crystalline regions (e.g., through carbamate linkages). For example, a plurality of amorphous hydrophilic regions can be covalently bonded to the crystalline regions of the hard segments.

Thus, in various aspects, the hydrogel comprises a crosslinked polymeric network which includes a plurality of copolymer chains wherein at least a portion of the copolymer chains each comprise a hard segment physically crosslinked to other hard segments of the copolymer chains and a soft segment covalently bonded to the hard segment, such as through a carbamate group or an ester group. In some cases, the hydrogel includes a plurality of copolymer chains wherein at least a portion of the copolymer chains each comprise a first chain segment physically crosslinked to at least one other copolymer chain of the plurality of copolymer chains and a hydrophilic segment (e.g., a polyether chain segment) covalently bonded to the first chain segment, such as through a carbamate group or an ester group.

In various aspects, the hydrogel includes a plurality of copolymer chains, wherein at least a portion of the copolymer chains each include a first segment forming at least a crystalline region with other hard segments of the copolymer chains; and a second segment, such as a soft segment (e.g., a segment having polyether chains or one or more ether groups) covalently bonded to the first segment, where the soft segment forms amorphous regions of the hydrogel. In some cases, the hydrogel includes a plurality of copolymer chains, where at least a portion of the copolymer chains have hydrophilic segments.

The soft segments, or amorphous regions, of the copolymer chains can constitute a substantial portion of the polymeric network, allowing their hydrophilic segments or groups to attract water molecules. In some aspects, the soft segments, or amorphous regions, are present in the copolymer chains in a ratio (relative to the hard segments, or crystalline regions) that is at least or greater than 20:1 by weight, that ranges from 20:1 to 110:1 by weight, or from 40:1 to 110:1 by weight, or from 40:1 to 80:1 by weight, or from 60:1 to 80:1.

For a covalent crosslink, one polymer chain is linked to one or more additional polymer chains with one or more covalent bonds, typically with a linking segment or chain. Covalently crosslinked hydrogels (e.g., thermoset and photocured hydrogels) can be prepared by covalently linking the polymer chains together using one or more multi-functional compounds, such as, for example, a molecule having at least two ethylenically-unsaturated groups, at least two oxirane groups (e.g., diepoxides), or combinations thereof (e.g., glycidyl methacrylate); and can also include any suitable intermediate chain segment, such as $C_{1-30}$, $C_{2-20}$, or $C_{2-10}$ hydrocarbon, polyether, or polyester chain segments.

The multi-functional compounds can include at least three functional groups selected from the group consisting of isocyanidyl, hydroxyl, amino, sulfhydryl, carboxyl or derivatives thereof, and combinations thereof. In some aspects, such as when the polymer network includes polyurethane, the multi-functional compound can be a polyol having three or more hydroxyl groups (e.g., glycerol, trimethylolpropane, 1,2,6-hexanetriol, 1,2,4-butanetriol, trimethylolethane) or a polyisocyanate having three or more isocyanate groups. In some cases, such as when the polymer network includes polyamide, the multi-functional compound can include, for example, carboxylic acids or activated forms thereof having three or more carboxyl groups (or activated forms thereof, polyamines having three or more amino groups, and polyols having three or more hydroxyl groups (e.g., glycerol, trimethylolpropane, 1,2,6-hexanetriol, 1,2,4-butanetriol, and trimethylolethane). In various cases, such as when the polymer network includes polyolefin, the multi-functional compound can be a compound having two ethylenically-unsaturated groups.

When the hydrogel of the material is crosslinked, it has been found that the crosslinking density of the crosslinked hydrogel can impact the structural integrity and water uptake capacities of the material (e.g., the hydrogel-containing material 116). If the crosslinking density is too high, the resulting material can be stiff and less compliant, which can reduce its water uptake and swelling capacity. On the other hand, if the crosslinking density is too low, then the resulting material can lose its structural integrity when saturated. As such, the hydrogel(s) of the material preferably have a balanced crosslinking density such that the material retains its structural integrity, yet is also sufficiently compliant when partially or fully saturated with water.

The hydrogel of the material (e.g., the hydrogel-containing material 116) can include any suitable polymer chains that provide the functional properties disclosed herein (e.g., water uptake, swelling, and more generally, preventing soil accumulation). For example, the hydrogel can be a polymeric hydrogel comprising or consisting essentially of one or more polymer chains such as one or more polyurethanes, one or more polyamides, one or more polyolefins, and combinations thereof (e.g., a hydrogel based on polyurethane(s) and polyamide(s)). The polymeric hydrogel can comprise or consist essentially of one or more polysiloxane chains (i.e., the hydrogel can comprise or consist essentially of a silicone hydrogel). The polymeric hydrogel can comprise or consist essentially of one or more ionomeric polymer chains (i.e., the hydrogel can comprise or consist essentially of an ionomeric hydrogel). In these aspects, the hydrogel can include a plurality of copolymer chains wherein at least a portion of the copolymer chains each include a polyurethane segment, a polyamide segment, a polyolefin segment, a polysiloxane segment, an ionomer segment, and combinations thereof. The segments can comprise one or more polyurethanes, one or more polyamides, one or more polyolefins, and combinations thereof.

In some aspects, the hydrogel includes a polymeric network with one or more polyurethane copolymer chains (i.e., a plurality of polyurethane chains), referred to as a "polyurethane hydrogel". The polyurethane hydrogel can be physically and/or covalently crosslinked. The polyurethane hydrogel can be produced by polymerizing one or more isocyanates with one or more polyols to produce copolymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units).

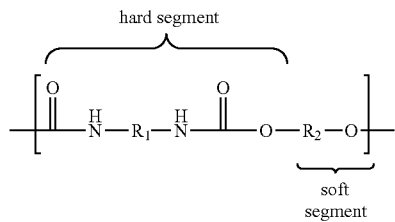

(Formula 1)

In these aspects, each $R_1$ independently is an aliphatic or aromatic segment, and each $R_2$ is a hydrophilic segment.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substitutent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

Additionally, the isocyanates can also be chain extended with one or more chain extenders to bridge two or more isocyanates. This can produce polyurethane copolymer chains as illustrated below in Formula 2, wherein $R_3$ includes the chain extender.

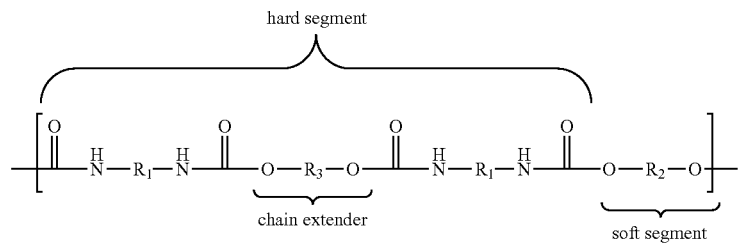

(Formula 2)

Each segment $R_1$, or the first segment, in Formulas 1 and 2 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

In aliphatic aspects (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., $C_{4-15}$ alkylene or $C_{6-10}$ alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane copolymer chains include hexamethylene diisocyanate (HDI), isophorone diisocyanate butylene diisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

In aromatic aspects (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from the group consisting of oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane copolymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some aspects, the copolymer chains are substantially free of aromatic groups.

In some preferred aspects, the polyurethane copolymer chains are produced from diisocynates including HMDI, TDI, MDI, $H_{12}$ aliphatics, and combinations thereof.

Examples of suitable triisocyanates for producing the polyurethane copolymer chains include TDI, HDI, and IPDI adducts with trimethyloylpropane (TMP), uretdiones (i.e., dimerized isocyanates), polymeric MDI, and combinations thereof.

Segment $R_3$ in Formula 2 can include a linear or branched $C_2$-$C_{10}$ segment, based on the particular chain extender polyol used, and can be, for example, aliphatic, aromatic, or polyether. Examples of suitable chain extender polyols for producing the polyurethane copolymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis (2-hydroxyethyl) ethers of hydroquinone and resorcinol, xylene-α,α-diols, bis(2-hydroxyethyl) ethers of xylene-α,α-diols, and combinations thereof.

Segment $R_2$ in Formula 1 and 2 can include polyether, polyester, polycarbonate, an aliphatic group, or an aromatic group, wherein the aliphatic group or aromatic group is substituted with one or more pendant hydrophilic groups selected from the group consisting of hydroxyl, polyether, polyester, polylactone (e.g., polyvinylpyrrolidone (PVP)), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. Therefore, the hydrophilic segment of $R_2$ can form portions of the hydrogel backbone, or be grafted to the hydrogel backbone as a pendant group. In some aspects, the pendant hydrophilic group or segment is bonded to the aliphatic group or aromatic group through a linker. Each segment $R_2$ can be present in an amount of 5% to 85% by weight, from 5% to 70% by weight, or from 10% to 50% by weight, based on the total weight of the reactant monomers.

In some aspects, at least one $R_2$ segment includes a polyether segment (i.e., a segment having one or more ether groups). Suitable polyethers include, but are not limited to polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some cases, at least one $R_2$ segment includes a polyester segment. The polyester can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly(hexamethylene carbonate) glycol, poly (propylene carbonate) glycol, poly(tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly (nonanemethylene carbonate), and combinations thereof.

In various cases, at least one $R_2$ segment includes a polycarbonate segment. The polycarbonate can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various aspects, at least one $R_2$ segment includes an aliphatic group substituted with one or more hydrophilic groups selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. In some aspects, the aliphatic group is linear and can include, for example, a $C_{1-20}$ alkylene chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkylene" refers to a bivalent hydrocarbon. The term $C_n$ means the alkylene group has "n" carbon atoms. For example, $C_{1-6}$alkylene refers to an alkylene group having, e.g., 1, 2, 3, 4, 5, or 6 carbon atoms. The term "alkenylene" refers to a bivalent hydrocarbon having at least one double bond.

In some cases, at least one $R_2$ segment includes an aromatic group substituted with one or more hydrophilic groups selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. Suitable aromatic groups include, but are not limited to, phenyl, naphthyl, tetrahydronaphthyl, phenanthrenyl, biphenylenyl, indanyl, indenyl, anthracenyl, fluorenylpyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

The aliphatic and aromatic groups are substituted with an appropriate number of pendant hydrophilic and/or charged groups so as to provide the resulting hydrogel with the properties described herein. In some aspects, the pendant hydrophilic group is one or more (e.g., 2, 3, 4, 5, 6, 7, 8, 9, 10 or more) hydroxyl groups. In various aspects, the pendant hydrophilic group is one or more (e.g., 2, 3, 4, 5, 6, 7, 8, 9, 10 or more) amino groups. In some cases, the pendant hydrophilic group is one or more (e.g., 2, 3, 4, 5, 6, 7, 8, 9, 10 or more) carboxylate groups. For example, the aliphatic group can include polyacrylic acid. In some cases, the pendant hydrophilic group is one or more (e.g., 2, 3, 4, 5, 6, 7, 8, 9, 10 or more) sulfonate groups. In some cases, the pendant hydrophilic group is one or more (e.g., 2, 3, 4, 5, 6, 7, 8, 9, 10 or more) phosphate groups. In some aspects, the pendant hydrophilic group is one or more ammonium groups (e.g., tertiary and/or quaternary ammonium). In other aspects, the pendant hydrophilic group is one or more zwitterions (e.g., a betaine, such as poly(carboxybetaine (pCB) and ammonium phosphonates such as phosphatidylcholine).

In some aspects, the $R_2$ segment includes charged groups that are capable of binding to a counterion to ionically crosslink the polymer the polymer network and form ionomers. In these aspects, for example, $R_2$ is an aliphatic or aromatic group having pendant amino, carboxylate, sulfonate, phosphate, ammonium, zwitterionic groups, or combinations thereof. For example, $R_2$ can be an aliphatic or aromatic group having one or more pendant carboxylate group.

In various cases, the pendant hydrophilic group is at least one polyether, such as two polyethers. In other cases, the pendant hydrophilic group is at least one polyester. In various cases, the pendant hydrophilic group is polylactone (e.g., polyvinylpyrrolidone). Each carbon atom of the pendant hydrophilic group can optionally be substituted with, e.g., $C_{1-6}$ alkyl. In some of these aspects, the aliphatic and aromatic groups can be graft polymers, wherein the pendant groups are homopolymers (e.g., polyethers, polyesters, polyvinylpyrrolidone).

In some preferred aspects, the pendant hydrophilic group is a polyether (e.g., polyethylene oxide and polyethylene glycol), polyvinylpyrrolidone, polyacrylic acid, or combinations thereof.

The pendant hydrophilic group can be bonded to the aliphatic group or aromatic group through a linker. The linker can be any bifunctional small molecule (e.g., $C_{1-20}$) capable of linking the pendant hydrophilic group to the aliphatic or aromatic group. For example, the linker can include a diisocyanate, as previously described herein, which when linked to the pendant hydrophilic group and to the aliphatic or aromatic group forms a carbamate bond. In some aspects, the linker can be 4,4'-diphenylmethane diisocyanate (MDI), as shown below.

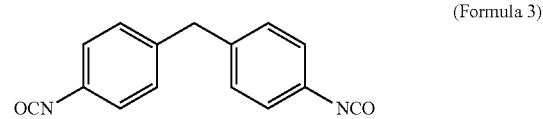

(Formula 3)

In some exemplary aspects, the pendant hydrophilic group is polyethylene oxide and the linking group is MDI, as shown below.

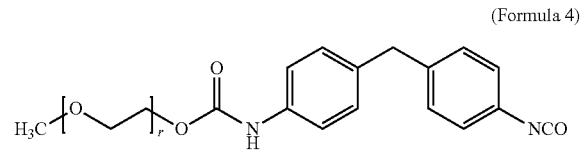

(Formula 4)

In some cases, the pendant hydrophilic group is functionalized to enable it to bond to the aliphatic or aromatic group, optionally through the linker. In various aspects, for example, when the pendant hydrophilic group includes an alkene group, which can undergo a Michael addition with a sulfhydryl-containing bifunctional molecule (i.e., a molecule having a second reactive group, such as a hydroxyl group or amino group), to result in a hydrophilic group that can react with the polymer backbone, optionally through the linker, using the second reactive group. For example, when the pendant hydrophilic group is polyvinylpyrrolidone, it can react with the sulfhydryl group on mercaptoethanol to result in hydroxyl-functionalized polyvinylpyrrolidone, as shown below.

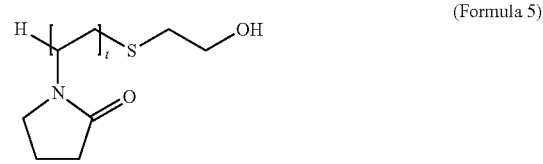

(Formula 5)

In some of the aspects disclosed herein, at least one $R_2$ segment is polytetramethylene oxide. In other exemplary aspects, at least one $R_2$ segment can be an aliphatic polyol functionalized with polyethylene oxide or polyvinylpyrrolidone, such as the polyols described in E.P. Patent No. 2 462 908. For example, the $R_2$ segment can be derived from the reaction product of a polyol (e.g., pentaerythritol or 2,2,3-trihydroxypropanol) and either MDI-derivatized methoxy-polyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below, In some aspects, the hydrogel includes a crosslinked polymeric network that includes copolymer chains that are derivatives of polyurethane. This crosslinked polymeric network can be produced by polymerizing one or more isocyanates with one or more polyamino compounds, polysulfhydryl compounds, or combinations thereof, as shown in Formulas 11 and 12, below:

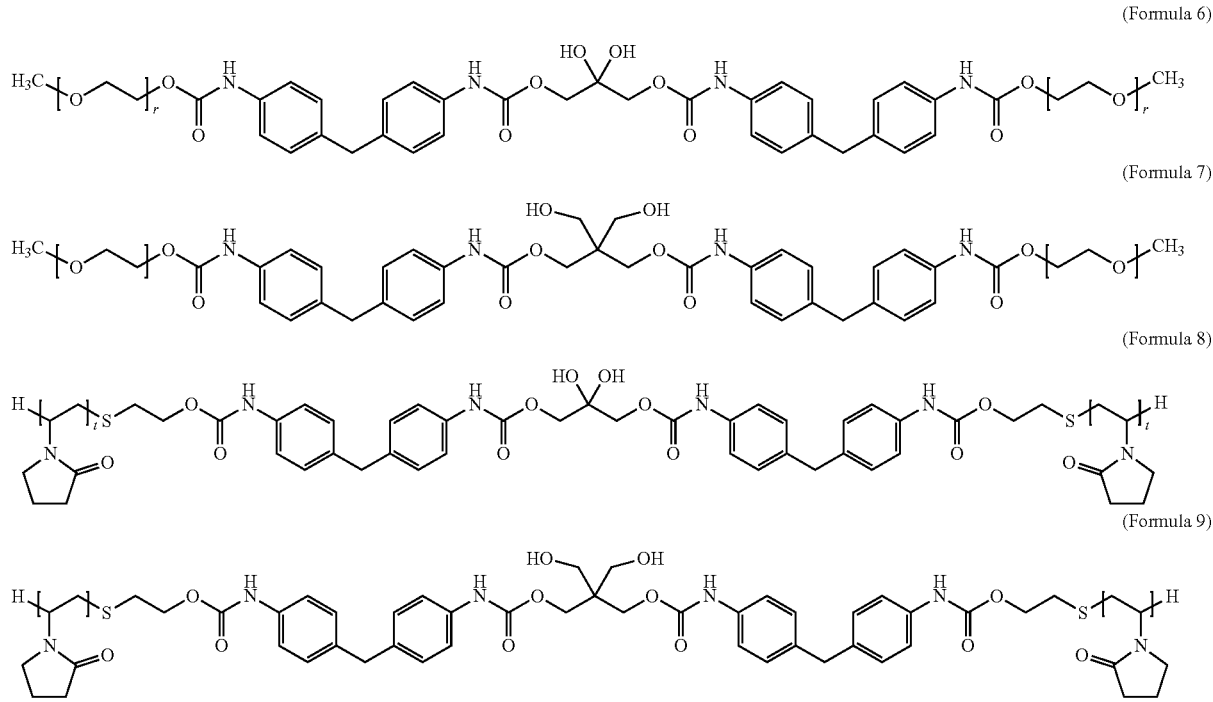

In various cases, at least one $R_2$ is a polysiloxane. In these cases, $R_2$ can be derived from a silicone monomer of Formula 10, such as a silicone monomer disclosed in U.S. Pat. No. 5,969,076:

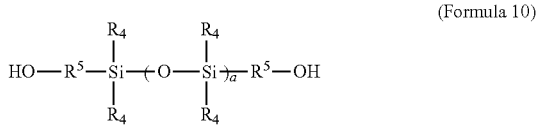

wherein:

a is 1 to 10 or larger (e.g., 1, 2, 3, 4, 5, 6, 7, 8, 9, or 10);

each $R^4$ independently is hydrogen, $C_{1-18}$ alkyl, $C_{2-18}$ alkenyl, aryl, or polyether; and each $R^5$ independently is $C_{1-10}$alkylene, polyether, or polyurethane.

In some aspects, each $R^4$ independently is H, $C_{1-10}$ alkyl, $C_{2-10}$alkenyl, $C_{1-6}$aryl, polyethylene, polypropylene, or polybutylene. For example, each $R^4$ can independently be selected from the group consisting of methyl, ethyl, n-propyl, isopropyl, n-butyl, isobutyl, s-butyl, t-butyl, ethenyl, propenyl, phenyl, and polyethylene.

In various aspects, each $R^5$ independently is $C_{1-10}$alkylene (e.g., methylene, ethylene, propylene, butylene, pentylene, hexylene, heptylene, octylene, nonylene, or decylene). In other cases, each $R^5$ is polyether (e.g., polyethylene, polypropylene, or polybutylene). In various cases, each $R^5$ is polyurethane.

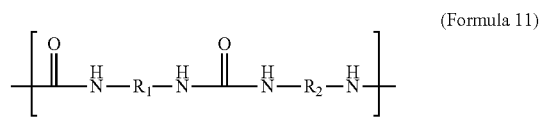

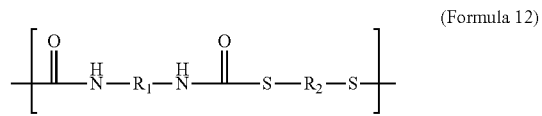

wherein the variables are as described above. Additionally, the isocyanates can also be chain extended with one or more polyamino or polythiol chain extenders to bridge two or more isocyanates, such as previously described for the polyurethanes of Formula 2.

In some aspects, the polyurethane hydrogel is composed of MDI, PTMO, and 1,4-butylene glycol, as described in U.S. Pat. No. 4,523,005.

In some aspects, the polyurethane hydrogel is physically crosslinked through e.g., nonpolar or polar interactions between the urethane or carbamate groups on the polymers (the hard segments), and is a thermoplastic polyurethane (TPU), or specifically, what may be referred to as a hydrophilic thermoplastic polyurethane. In these aspects, component $R_1$ in Formula 1, and components $R_1$ and $R_3$ in Formula 2, forms the portion of the polymer often referred to as the "hard segment", and component $R_2$ forms the portion of the polymer often referred to as the "soft segment". In these aspects, the soft segment can be covalently bonded to the hard segment.

Commercially available thermoplastic polyurethane hydrogels suitable for the present use include, but are not limited to those under the tradename "TECOPHILIC", such as TG-500, TG-2000, SP-80A-150, SP-93A-100, SP-60D-60 (Lubrizol, Countryside, Ill.), "ESTANE" (e.g., ALR G 500; Lubrizol, Countryside, Ill.).

In various aspects, the polyurethane hydrogel is covalently crosslinked, as previously described herein.

The tie layer as discussed herein can be compositionally the same or similar to the hydrogel-containing material. Therefore, the tie layer can include aspects of the hydrogel-containing material and the hydrogels discussed herein. Because the tie layer improves interlayer bonding between the hydrogel-containing material and the substrate body, the tie layer may advantageously be compositionally similar or the same as the tie layer. While not wishing to be bound by any theory, it is believed that similar hydrogel-containing material and tie layers bond together and are less likely to delaminate based on the intermolecular forces between like molecules. These like molecules can create a correlated movement of electrons and instantaneous dipoles, which increase the interlayer bonding forces between the layers.

In some aspects, the tie layer comprises or consists essentially of aliphatic thermoplastic polyurethane (TPU). One example of this TPU is commercially available under the tradenames "Bio TPU" and "Pearlthane ECO TPU," such as Pearlthane™ ECO D12T80, Pearlthane™ ECO D12T80E, Pearlthane™ ECO D12T85, Pearlthane™ ECO D12T90, Pearlthane™ ECO D12T90E, Pearlthane™ ECO 12T95, and Pearlthane™ ECO D12T55D (Lubrizol, Countryside Ill.).

Additionally or alternatively, the tie layer can comprise TPU having hydrophilic regions or segments that may take up water (e.g. a TPU hydrogel) in additional to other forms of TPU (e.g. aliphatic TPU). The tie layer can have a water uptake capacity of greater than or equal to about 10% by weight, as characterized in the Water Update Capacity Test and the Article Sample Procedure discussed herein. Additionally, the tie layer may be a mixture or dispersion of a TPU hydrogel and other forms of TPU.

The tie layer can be formed by obtaining recycled, ground, or reground TPU scrap. The tie layer can be formed by grinding a composition containing a polymeric hydrogel under conditions such that the polymeric hydrogel is maintained at a grinding temperature being below its melting point, forming a ground material. Additionally or alternatively, the polymeric hydrogel can be maintained at the grinding temperature being below a softening point of the polymeric hydrogel.

The ground TPU material can be pelletized, forming a pelletized material, and used to form the tie layer. This step of pelletization can be conducted under conditions which minimize water uptake of the material. For example, the tradename "EREMA" pelletizer (EREMA, Engineering Recycling Maschinen and Anlagen Ges.m.b.H., Unterfeldstraβe 3, 4052 Ansfelden, Austria) has been found to minimize water uptake during the pelletization process. Pelletizing can be performed under conditions such that the pelletized takes up less than about 50% by weight, as characterized by the Water Uptake Test with the Article Sampling Procedure discussed below.

After pelletizing, the pelletized material may be extruded or coextruded to form a film for use as the tie layer, or to form a co-extruded film comprising the substrate and the tie layer, the tie layer and the hydrogel-containing material, or all three layers.

The tie layers discussed herein may also include an ethylene vinyl alcohol copolymer (EVOH). Without wishing to be bound by any theory, the EVOH may advantageously increase the strength of the tie layers.

In some cases, in order to be compositionally similar, the hydrogel-containing material can include a first polymeric hydrogel and the tie layer can include a second polymeric hydrogel. The first polymeric hydrogel can include one or more first polymers having one or more respective chemical structures, one or more respective number average molecular weights, and one or more respective average degrees of crosslinking such that the first polymeric hydrogel has a first water uptake capacity and a first melting point. The second polymeric hydrogel can include one or more second polymers having one or more respective chemical structures, one or more respective number average molecular weights, one or more respective average degrees of crosslinking such that the second polymeric hydrogel has a second water uptake capacity and a second melting point. The one or more chemical structures of the first and second polymers can be substantially the same, or the one or more number average molecular weights of the first and second polymers can be within plus or minus (+/−) 10% of each other, or the average degrees of crosslinking of the first and second polymers can be within plus or minus (+/−) 20% of each other, or the water uptake capacities of the first and second polymers can be within plus or minus (+/−) 10% of each other, or the melting points of the first and second polymers can be within plus or minus (+/−) 10% of each other, or any combination thereof. Additionally, a water uptake capacity of the first polymeric hydrogel at 1 hour can be within plus or minus (+/−) 10% of the water uptake capacity of the second polymeric hydrogel, as characterized by the Water Uptake Capacity Test with the Sampling Procedure. These similarities can assist in forming interfacial bonds between the hydrogel-containing material and the tie layer.

In some aspects, the polyamide segment of the polyamide hydrogel, in either the hydrogel-containing material and/or the tie layer, comprises or consists essentially of a polyamide. The polyamide hydrogel can be formed from the polycondensation of a polyamide prepolymer with a hydrophilic prepolymer to form a block copolyamide.

In some aspects, the polyamide segment of the polyamide hydrogel can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the polyamide hydrogel can be the same or different.

In some aspects, the polyamide segment is derived from the polycondensation of lactams and/or amino acids, and includes an amide segment having a structure shown in Formula 13, below, wherein $R_6$ is the segment of the block copolymer derived from the lactam or amino acid, and $R_2$ is the segment derived from a hydrophilic prepolymer:

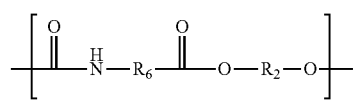

(Formula 13)

In some aspects, $R_6$ is derived from a lactam. In some cases, $R_6$ is derived from a $C_{3-20}$ lactam, or a $C_{4-15}$ lactam, or a $C_{6-12}$ lactam. For example, $R_6$ can be derived from caprolactam or laurolactam. In some cases, $R_6'$ is derived from one or more amino acids. In various cases, $R_6$ is derived from a $C_{4-25}$ amino acid, or a $C_{5-20}$ amino acid, or a $C_{8-15}$ amino acid. For example, $R_6'$ can be derived from 12-aminolauric acid or 11-aminoundecanoic acid.

In some cases, Formula 13 includes a polyamide-polyether block copolymer segment, as shown below:

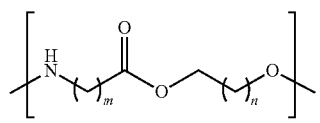

(Formula 14)

wherein m is 3-20, and n is 1-8. In some exemplary aspects, m is 4-15, or 6-12 (e.g., 6, 7, 8, 9, 10, 11, or 12), and n is 1 2, or 3. For example, m can be 11 or 12, and n can be 1 or 3.

In various aspects, the polyamide segment of the polyamide hydrogel is derived from the condensation of diamino compounds with dicarboxylic acids, or activated forms thereof, and includes an amide segment having a structure shown in Formula 15, below, wherein $R_7$ is the segment of the block copolymer derived from the diamino compound, $R_8$ is the segment derived from the dicarboxylic acid compound, and $R_2$ is the segment derived from a hydrophilic prepolymer:

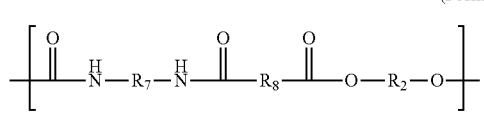

(Formula 15)

In some aspects, $R_7$ is derived from a diamino compound that includes an aliphatic group having $C_{4-15}$ carbon atoms, or $C_{5-10}$ carbon atoms, or $C_{6-9}$ carbon atoms. In some aspects, the diamino compound includes an aromatic group, such as phenyl, naphthyl, xylyl, and tolyl. Suitable diamino compounds include, but are not limited to, hexamethylene diamine (HIVID), tetramethylene diamine, trimethyl hexamethylene diamine (TMD), m-xylylene diamine (MXD), and 1,5-pentamine diamine. In various aspects, $R_8$ is derived from a dicarboxylic acid or activated form thereof, includes an aliphatic group having $C_{4-15}$ carbon atoms, or $C_{5-12}$ carbon atoms, or $C_{6-10}$ carbon atoms. In some cases, the dicarboxylic acid or activated form thereof includes an aromatic group, such as phenyl, naphthyl, xylyl, and tolyl. Suitable carboxylic acids or activated forms thereof include, but are not limited to adipic acid, sebacic acid, terephthalic acid, and isophthalic acid. In some aspects, the copolymer chains are substantially free of aromatic groups.

In some preferred aspects, each polyamide segment is independently derived from a polyamide prepolymer selected from the group consisting of 12-aminolauric acid, caprolactam, hexamethylene diamine and adipic acid.

Additionally, the polyamide hydrogels can also be chain extended with one or more polyamino, polycarboxyl (or derivatives thereof), or amino acid chain extenders, as previously described herein. In some aspects, the chain extender can include a diol, dithiol, amino alcohol, amino-alkyl mercaptan, hydroxyalkyl mercaptan, a phosphite or a bisacyllactam compound (e.g., triphenylphosphite, N,N'-terephthaloyl bis-laurolactam, and diphenyl isophthalate).

Each component $R_2$ of Formula 13 and 15 independently is polyether, polyester, polycarbonate, an aliphatic group, or an aromatic group, wherein the aliphatic group or aromatic group is substituted with one or more pendant hydrophilic groups, as previously described herein, wherein the pendant group can optionally be bonded to the aliphatic or aromatic group through a linker, as previously described herein.

In some preferred aspects, $R_2$ is derived from a compound selected from the group consisting of polyethylene oxide (PEO), polypropylene oxide (PPO), polytetrahydrofuran (PTHF), polytetramethylene oxide (PTMO), a polyethylene oxide-functionalized aliphatic or aromatic group, a polyvinylpyrrolidone-functionalized aliphatic of aromatic group, and combinations thereof. In various cases, $R_2$ is derived from a compound selected from the group consisting of polyethylene oxide (PEO), polypropylene oxide (PPO), polytetramethylene oxide (PTMO), a polyethylene oxide-functionalized aliphatic or aromatic group, and combinations thereof. For example, $R_2$ can be derived from a compound selected from the group consisting of polyethylene oxide (PEO), polytetramethylene oxide (PTMO), and combinations thereof.

In some aspects, the polyamide hydrogel is physically crosslinked through, e.g., nonpolar or polar interactions between the polyamide groups on the polymers, and is a thermoplastic polyamide, or in particular, a hydrophilic thermoplastic polyamide. In these aspects, component $R_6$ in Formula 13 and components $R_7$ and $R_8$ in Formula 15 form the portion of the polymer often referred to as the "hard segment", and component $R_2$ forms the portion of the polymer often referred to as the "soft segment". Therefore, in some aspects, the hydrogel can include a physically crosslinked polymeric network having one or more polymer chains with amide linkages.

In some aspects, the hydrogel includes plurality of block copolymer chains, wherein at least a portion of the block copolymer chains each include a polyamide block and a hydrophilic block, (e.g., a polyether block) covalently bonded to the polyamide block to result in a thermoplastic polyamide block copolymer hydrogel (i.e., a polyamide-polyether block copolymer). In these aspects, the polyamide segments can interact with each other to form the crystalline region. Therefore, the polyamide block copolymer chains can each comprise a plurality of polyamide segments forming crystalline regions with other polyamide segments of the polyamide block copolymer chains, and a plurality of hydrophilic segments covalently bonded to the polyamide segments.

In some aspects, the polyamide is polyamide-11 or polyamide-12 and the polyether is selected from the group consisting of polyethylene oxide, polypropylene oxide, and polytetramethylene oxide. Commercially available thermoplastic polyamide hydrogels suitable for the present use include those under the tradename "PEBAX" (e.g., "PEBAX MH1657" and "PEBAX MV1074") from Arkema, Inc., Clear Lake, Tex.), and "SERENE" coating (Sumedics, Eden Prairie, Minn.).

In various aspects, the polyamide hydrogel is covalently crosslinked, as previously described herein.

In some aspects, particularly when the substrate comprises a thermoplastic polyurethane, the tie layer can also be formed of polymers having similar functional groups to thermoplastic polyurethane, such as aliphatic polyamides, nylons, caprolactam functional groups, caprolactam, and/or polymers having caprolactam functionality. These compositions can form the tie layer additionally, or alternatively, to thermoplastic polyurethane as discussed herein.

In some aspects, the hydrogel comprises or consists essentially of a polyolefin hydrogel. The polyolefin hydrogel can be formed through free radical, cationic, and/or anionic polymerization by methods well known to those skilled in the art (e.g., using a peroxide initiator, heat, and/or light).

In some aspects, the hydrogel can include one or more, or a plurality, of polyolefin chains. For instance, the polyolefin can include polyacrylamide, polyacrylate, polyacrylic acid and derivatives or salts thereof, polyacrylohalide, polyacrylonitrile, polyallyl alcohol, polyallyl ether, polyallyl ester, polyallyl carbonate, polyallyl carbamate, polyallyl sulfone, polyallyl sulfonic acid, polyallyl amine, polyallyl cyanide, polyvinyl ester, polyvinyl thioester, polyvinyl pyrrolidone, polyα-olefin, polystyrene, and combinations thereof. Therefore, the polyolefin can be derived from a monomer selected from the group consisting of acrylamide, acrylate, acrylic acid and derivatives or salts thereof, acrylohalide, acrylonitrile, allyl alcohol, allyl ether, allyl ester, allyl carbonate, allyl carbamate, allyl sulfone, allyl sulfonic acid, allyl amine, allyl cyanide, vinyl ester, vinyl thioester, vinyl pyrrolidone, α-olefin, styrene, and combinations thereof.

In some aspects, the polyolefin is derived from an acrylamide. Suitable acrylamides can include, but are not limited to, acrylamide, methacrylamide, ethylacrylamide, N,N-dimethylacrylamide, N-isopropylacrylamide, N-tert-butylacrylamide, N-isopropylmethacrylamide, N-phenylacrylamide, N-diphenylmethylacrylamide, N-(triphenylmethyl)methacrylamide, N-hydroxyethyl acrylamide, 3-acryloylamino-1-propanol, N-acryloylamido-ethoxyethanol, N-[tris(hydroxymethyl)methyl]acrylamide, N-(3-methoxypropyl)acrylamide, N-[3-(dimethylamino)propyl]methacrylamide, (3-acrylamidopropyl)trimethyl ammonium chloride, diacetone acrylamide, 2-acrylamido-2-methyl-1-propanesulfonic acid, salts of 2-acrylamido-2-methyl-1-propanesulfonic acid, 4-acryloylmorpholine, and combinations thereof. For example, the acrylamide prepolymer can be acrylamide or methacrylamide.

In some cases, the polyolefin is derived from an acrylate (e.g., acrylate and/or alkylacrylate). Suitable acrylates include, but are not limited to, methyl acrylate, ethyl acrylate, propyl acrylate, isopropyl acrylate, n-butyl acrylate, isobutyl acrylate, tert-butyl acrylate, hexyl acrylate, isooctyl acrylate, isodecyl acrylate, octadecyl acrylate, lauryl acrylate, 2-ethylhexyl acrylate, 4-tert-butylcyclohexyl acrylate, 3,5,5-trimethylhexyl acrylate, isobornyl acrylate, vinyl methacrylate, allyl methacrylate, methyl methacrylate, ethyl methacrylate, butyl methacrylate, isobutyl methacrylate, tert-butyl methacrylate, hexyl methacrylate, 2-ethylhexyl methacrylate, isodecyl methacrylate, lauryl methacrylate, stearyl methacrylate, cyclohexyl methacrylate, 3,3,5-trimethylcyclohexyl methacrylate, combinations thereof, and the like. For example, acrylate prepolymer can be methyl acrylate, ethyl methacrylate, or 2-hydroxyethyl methacrylate.

In some cases, the polyolefin is derived from an acrylic acid or a derivative or salt thereof. Suitable acrylic acids, but are not limited to acrylic acid, sodium acrylate, methacrylic acid, sodium methacrylate, 2-ethylacrylic acid, 2-propylacrylic acid, 2-bromoacrylic acid, 2-(bromomethyl)acrylic acid, 2-(trifluoromethyl)acrylic acid, acryloyl chloride, methacryloyl chloride, and 2-ethylacryloyl chloride.

In various aspects, the polyolefin can be derived from an allyl alcohol, allyl ether, allyl ester, allyl carbonate, allyl carbamate, allyl sulfone, allyl sulfonic acid, allyl amine, allyl cyanide, or a combination thereof. For example, the polyolefin segment can be derived from allyloxyethanol, 3-allyloxy-1,2-propanediol, allyl butyl ether, allyl benzyl ether, allyl ethyl ether, allyl phenyl ether, allyl 2,4,6-tribromophenyl ether, 2-allyloxybenzaldehyde, 2-allyloxy-2-hydroxybenzophenone, allyl acetate, allyl acetoacetate, allyl chloroacetate, allylcyanoacetate, allyl 2-bromo-2-methylpropionate, allyl butyrate, allyltrifluoroacetae, allyl methyl carbonate, tert-butyl N-allylcarbamate, allyl methyl sulfone, 3-allyloxy-2-hydroxy-1-propanesulfonic acid, 3-allyloxy-2-hydroxy-1-propanesulfonic acid sodium salt, allylamine, an allylamine salt, and allyl cyanide.

In some cases, the polyolefin can be derived from a vinyl ester, vinyl thioester, vinyl pyrrolidone (e.g., N-vinyl pyrrolidone), and combinations thereof. For example, the vinyl monomer can be vinyl chloroformate, vinyl acetate, vinyl decanoate, vinyl neodecanoate, vinyl neononanoate, vinylpivalate, vinyl propionate, vinyl stearate, vinyl valerate, vinyl trifluoroacetate, vinyl benzoate, vinyl 4-tert-butylbenzoate, vinyl cinnamate, butyl vinyl ether, tert-butyl vinyl ether, cyclohexyl vinyl ether, dodecyl vinyl ether, ethylene glycol vinyl ether, 2-ethylhexyl vinyl ether, ethyl vinyl ether, ethyl-1-propenyl ether, isobutyl vinyl ether, propyl vinyl ether, 2-chloroethyl vinyl ether, 1,4-butanediol vinyl ether, 1,4-cyclohexanedimethanol vinyl ether, di(ethylene glycol) vinyl ether, diethyl vinyl orthoformate, vinyl sulfide, vinyl halide, and vinyl chloride.

In some aspects, the polyolefin can be derived from an alpha-olefin, such as 1-octene, 1-nonene, 1-decene, 1-undecene, 1-dodecene, 1-tridecene, 1-tetradecene, 1-pentadecene, 1-hexadecene, 1-pentadecene, 1-heptadecene, and 1-octadecene.

In various cases, the polyolefin segment containing $R_7$ can be derived from a styrene. Suitable styrene monomers include styrene, α-bromostyrene, 2,4-diphenyl-4-methyl-1-pentene, α-methylstyrene, 4-acetoxystyrene, 4-benzhydrylstyrene, 4-tert-butyl styrene, 2,4-dimethylstyrene, 2,5-dimethylstyrene, 2-methylstyrene, 3-methylstyrene, 4-methylstyrene, 2-(trifluoromethyl)styrene, 3-(trifluoromethyl)styrene, 4-(trifluoromethyl)styrene, 2,4,6-trimethylstyrene, vinylbenzyl chloride, 4-benzyloxy-3-methoxystyrene, 4-tert-butoxystyrene, 3,4-dimethoxystyrene, 4-ethoxystyrene, 4-vinylanisole, 2-bromostyrene, 3-bromostyrene, 4-bromosytrene, 4-chloro-α-methylstyrene, 2-chlorostyrene, 3-chlorostyrene, 4-chlorostyrene, 2,6-dichlorostyrene, 2,6-difluorostyrene, 2-fluorostyrene, 3-fluorostyrene, 4-fluorostyrene, 2,3,4,5,6-pentafluorostyrene, N,N-dimethylvinylbenzylamine, 2-isopropenylaniline, 4-[N-(methylaminoethyl)aminomethyl]styrene, 3-vinylaniline, 4-vinylaniline, (vinylbenzyl)trimethylammonium chloride, 4-(diphenylphosphino)styrene, 3-isopropenyl-α,α-dimethylbenzyl isocyanate, 3-nitrostyrene, 9-vinylanthracene, 2-vinylnaphthalene, 4-vinylbenzocyclobutene, 4-vinylbiphenyl, and vinylbenzoic acid.

In some aspects, the polyolefin comprises a hydrophilic portion. The hydrophilic portion of the polyolefin hydrogel can be pendant to the polyolefin backbone, or the hydrophilic portion can function as a covalent crosslinker of the polyolefin hydrogel. In some aspects, the hydrophilic portion of the polyolefin hydrogel includes a pendant polyether, polyester, polycarbonate, hydroxyl, lactone (e.g., pyrrolidone), amino, carboxylate, sulfonate, phosphate, ammonium (e.g., tertiary and quaternary ammonium), zwitterion group (e.g., a betaine, such as poly(carboxybetaine (pCB) and ammonium phosphonates such as phosphatidylcholine), or combinations thereof. Polyolefin hydrogels containing a pendant hydrophilic portion can be formed by copolymerizing a polyolefin monomer, as previously described, with a second polymer olefin monomer having a hydrophilic side chain, such as acrylic acid or polyvinylpyrrolidone).

In some aspects, the polyolefin hydrogel includes a plurality of polyolefin chains wherein at least a portion of the polyolefin chains each comprise a first chain segment physically crosslinked to at least one other polyolefin chain of the plurality of polyolefin chains and one or more hydrophilic chain segments covalently bonded to the first chain segment.

In other aspects, the hydrophilic portion of the polyolefin hydrogel is a hydrophilic crosslinker. The crosslinker can include polyether, polyester, polycarbonate, hydroxyl, lactone (e.g., pyrrolidone), amino, carboxylate, sulfonate, phosphate, ammonium (e.g., tertiary and quaternary ammonium), a zwitterion (e.g., a betaine, such as poly(carboxybetaine (pCB) and ammonium phosphonates such as phosphatidylcholine), and combinations thereof. The hydrophilic crosslinker can be derived from a molecule having at least two ethylenically-unsaturated groups, such as a polyethylene glycol dimethacrylate.

Suitable commercially available polyolefin materials include, but are not limited to the "POLYOX" product line by Dow Chemical, Midland Mich., and styrenic block co-polymers. Examples of styrenic co-polymers include, but are not limited to TPE-s (e.g., styrene-butadiene-styrene (SBS) block copolymers, such as "SOFPRENE" and styrene-ethylene-butylene-styrene (SEBS) block copolymer, such as "LAPRENE", by SO.F.TER. GROUP, Lebanon, Tenn.); thermoplastic copolyester elastomers (e.g., thermoplastic elastomer vulconates (TPE-v or TPV)), such as "FORPRENE" by SO.F.TER. GROUP), "TERMOTON-V" by Termopol, Istanbul Turkey; and TPE block copolymers, such as "SANTOPRENE" (ExxonMobil, Irving, Tex.).

In some aspects, the a monomer or prepolymer, such as the polyolefin prepolymer described above, is co-polymerized with a silicone prepolymer to form a silicone hydrogel. In these aspects, the silicone prepolymer, the polyolefin prepolymer, or both can function as the crosslinker.

Examples of silicone monomers include, but are not limited to, 3-methacryloxypropyl tris(trimethylsiloxy)silane (TRIS), and monomethacryloxypropyl terminated polydimethylsiloxane (mPDMS), m vinyl[3-[3,3,3-trimethyl-1,1bis (trimethylsiloxy)-disiloxanyl]propyl]carbamate, 3-methacryloxypropyl-bis(trimethylsiloxy)methyl silane, and methacryloxypropylpentamethyl disiloxane.

In other aspects, the hydrogel comprises or consists essentially of an ionomeric hydrogel including a plurality of ionomer chains. An ionomer is a copolymer formed of both neutrally charged units and ionized units bonded to the polymer backbone, e.g., as pendant groups. Commonly the ionized units include carboxylic acid groups. Synthesis of ionomers typically includes the step of first introducing the ionized units (e.g., acid groups) into the polymer chain, and then neutralizing a portion of the ionized units (e.g., with a metal cation). The ionomer can comprise units of acrylic acid, methacrylic acid, or both. The ionomer can comprise a copolymer of ethylene and methacrylic acid.

As discussed above, the hydrogel-containing material or the tie layer can also optionally include one or more additives, such as antioxidants, colorants, stabilizers, anti-static agents, wax packages, antiblocking agents, crystal nucleating agents, melt strength enhancers, anti-stain agents, stain blockers, hydrophilicity-enhancing additives, and combinations thereof.

Examples of particularly suitable additives include hydrophilicity-enhancing additives, such as one or more superabsorbent polymers (e.g., superabsorbent polyacrylic acid or copolymers thereof). Examples of hydrophilicity-enhancing additives include those commercially available under the tradenames "CREASORB" or "CREABLOCK" by Evonik, Mobile, Ala., "HYSORB" by BASF, Wyandotte, Mich., "WASTE LOCK PAM" by $M^2$ Polymer Technologies, Inc., Dundee Township, Ill., and "AQUA KEEP" by Sumitomo Seika, New York, N.Y. The incorporation of the hydrophilicity-enhancing additive can assist the hydrogel by increasing the water uptake rate and/or capacity for the material. Examples of suitable concentrations of the hydrophilicity-enhancing additive in the material range from 0.1% to 15% by weight, from 0.5% to 10% by weight, or from 1% to 5% by weight, based on the total weight of the material.

In some aspects, the substrate body can be compositionally similar to the tie layer and/or the hydrogel-containing material. The substrate body or backing layer have a water uptake capacity of less than about 10% by weight, as characterized by the Water Uptake Test with the Article Sampling Procedure. The substrate body can compositionally contain or consist essentially of one or more polymers selected from the group consisting of an aliphatic thermoplastic polyurethane, an aliphatic polyamide, and combinations thereof. The aliphatic polyamide can comprise a caprolactam functional group and/or a nylon.

The substrate body can also include or consist essentially of a reinforced polymer. In one example, the reinforced polymer may be a thermoplastic nylon reinforced with about 30% glass fiber. Such reinforced polymers are commercially available under the tradename Rilsan® BZM or Rilsan® BZM 30 NOIR TL Nylon 11 (Arkema, King of Prussia, Pa.). Because the substrate body can contain a reinforced polymer, the tie layer and/or the hydrogel-containing material may also contain the reinforced polymer or similar composition to assist in interfacial bonding.

In some aspects, the hydrogel-containing material can define an exterior or ground-facing surface of the outsole. Alternatively, a water-permeable membrane can define the exterior or ground-facing surface of the outsole, and can be in direct contact with the material. For example, at least a portion of the exterior surface of the outsole can be defined by a first side of the water-permeable membrane, with the material present between the backing plate/outsole substrate and the membrane.

The level of water permeability of the water-permeable membrane is preferably sufficient for water to rapidly partition from the exterior surface of the outsole (i.e., the first side of the membrane), across the second side of the membrane, and into the material. For example, the level of water permeability of the water-permeable membrane can be sufficient for a sample of the outsole obtained in accordance with the Article Sampling Procedure to have a water uptake capacity of greater than 40% by weight at 24 hours. The level of water permeability of the water-permeable membrane can be sufficient for a sample of the outsole obtained in accordance with the Article Sampling Procedure to have a water uptake capacity of greater than 40% by weight at 1 hour.

The articles of the present disclosure can be manufactured using a variety of different manufacturing techniques. For example, the material (e.g., the hydrogel-containing material 116), the tie layer, and the optional backing plate or substrate body can be formed using methods such as injection molding, cast molding, solvent casting, thermoforming, vacuum forming, extrusion, co-extrusion, pelletization, spray coating, and the like.

Figure 19A:
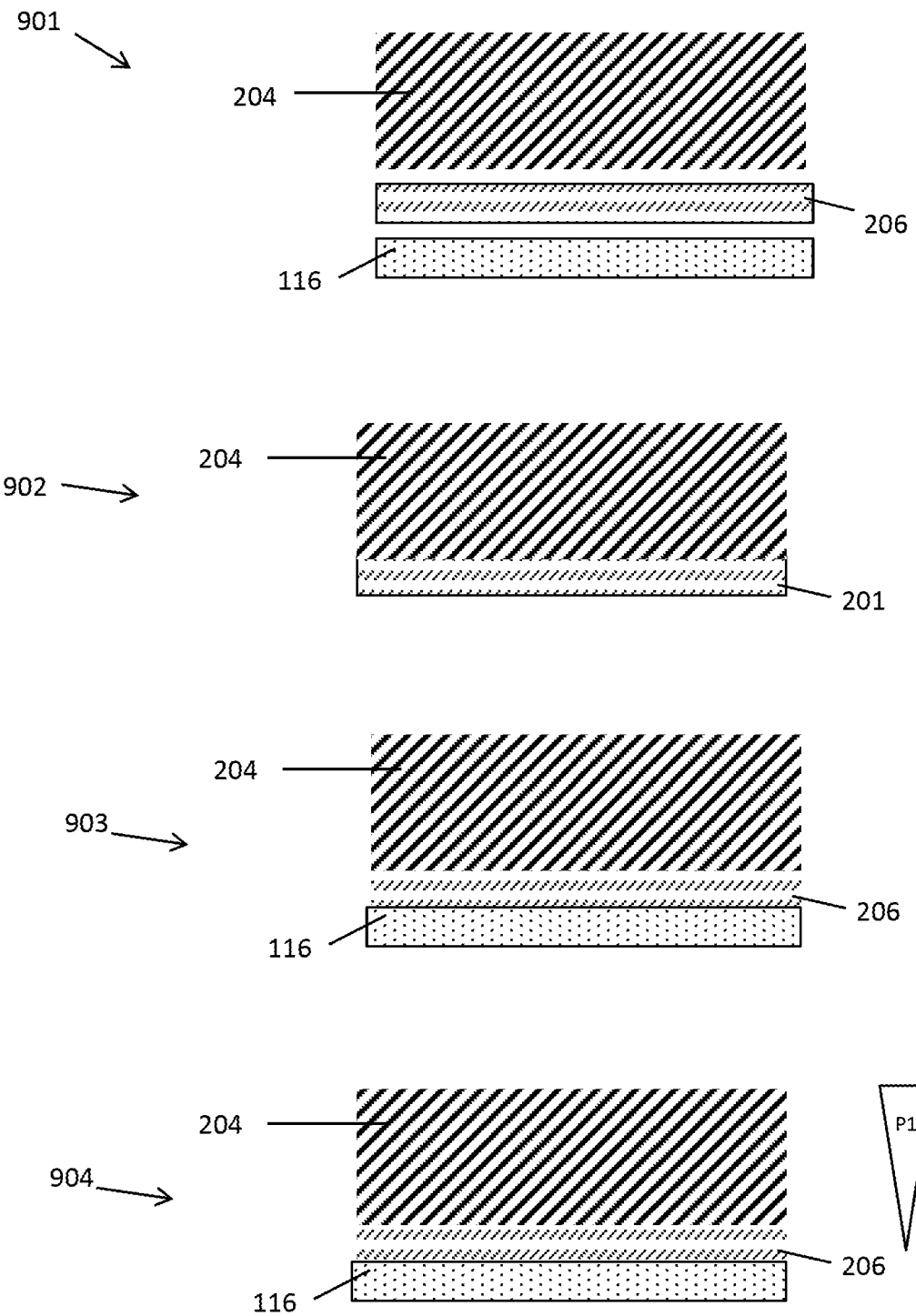
FIG. 19A depict steps in one or more methods of forming the layered structure of FIG. 1A.

As discussed herein and shown in FIG. 19A, step 901, each of the substrate body 204, the tie layer 206, and the hydrogel-containing material 116 can be separately manufactured and bonded together in subsequent steps and/or create a dual layer intermediate. Alternatively, the three layers (204, 206, 116) can be manufactured in a single step. In one example, an outsole or a portion thereof can be manufactured by thermoforming a polymer film (e.g. hydrogel-containing material and tie layer), trimming and cutting the film to form a perimeter and orifices (e.g. to receive traction elements), and back injection molding the film with the reinforced polymer to form other three dimensional structures (e.g. traction elements and substrate body).

Alternatively, the outsole or a portion thereof can be manufactured by injection molding each of the each of the substrate body 204, the tie layer 206, and the hydrogel-containing material 116 in a sequential process.

In either process, the tie layer 206 can be prepared as a blend or mixture of materials, such as a blend of the material or select polymers forming the substrate body 204 (e.g. reinforced polymer) and the material or select polymers forming the hydrogel-containing layer 116 (e.g. TPU hydrogel). Prior to use, these blends can be made in a solvent cast system, melt blended in a single or twin screw extruder for pelletization or extrusion formed, and/or dry blended within a hopper prior to injection molding.

After forming the tie layer blend or mixture, the blend may be bonded or secured to one of the substrate body 204 and the hydrogel-containing layer 116 such that the blend forms an exterior layer or cap layer 201, as shown in step 902. A "cap layer" refers to a polymer layer that forms an exterior layer. In some examples, after forming or securing the cap layer to a surface, a polymeric material can in turn be secured to the cap layer. In this manner, a cap layer can be used as an intermediate structure which will become a tie layer in the final article. In other words, this cap layer can be part of an intermediate (e.g. dual layer intermediate) formed as a precursor to the final layered structure that has a tie layer tying two layers together.

After forming the cap layer, the cap layer can be bonded or secured to the other of the substrate body 204 and the hydrogel-containing layer 116, forming the layered structure having a tie layer 206 in step 903. This layered structure can be formed to have a graded hydrophilicity to improve adhesion between two different, possibly incompatible thermoplastics and two hydrophilic polymers.

While FIG. 19A demonstrates bonding the cap layer to the substrate body 204 first to form an intermediate, and subsequently bonding the cap layer to the hydrogel-containing material 116, forming the tie layer 206, one of skill will appreciate that the tie layer 206 and/or the cap layer 201 could first be bonded to the hydrogel-containing material 116 and subsequently bonded to the substrate body 204.

While the tie layer 206 may be a blend or mixture of various polymers, there may also be a plurality of tie layers between the substrate body 204 and the hydrogel-containing material 116. The tie layer 206 closest to the substrate body 204 may be formed of one or more similar polymers to the substrate body (e.g. a reinforced polymer, 904, P1). The concentration of this similar polymer can decrease in tie layers positioned farther away from the substrate body 204, depicted in gradient 205 with P1. For example, the substrate body could have a first amount of a glass fiber-reinforced polymer and the tie layer could have a second amount of the same glass fiber-reinforced polymer such that the first amount is greater than the second amount. Subsequent adjacent tie layers could have lesser amounts of the glass fiber-reinforced polymer as they are positioned farther away from the substrate body.

Likewise, the tie layers closer to the hydrogel-containing material 116 can have a greater concentration of a polymer similar to a polymer in the hydrogel-containing material 116 (Polymer P2, depicted with gradient 207). One skilled in the art will appreciate that these gradients could also be formed in one tie layer. Overall, this orientation can create one or more gradients (e.g. 205, 207) of similar polymers between the substrate body and the hydrogel-containing material to assist in interfacial bonding.

In some aspects without a tie layer, the outsole is formed with the use of a co-extruded outsole plate. In this case, the hydrogel-containing material can be co-extruded with a thermoplastic material used to form a thin backing substrate, where the resulting co-extruded material can be provided in a web or sheet form. The web or sheet can then be placed in a vacuum thermoforming tool to produce the three-dimensional geometry of the outsole ground-facing side (referred to as an outsole face precursor). The backing substrate provides a first function in this step by creating a structural support for the relatively thinner and weaker material. The outsole face precursor can then be trimmed to form its perimeter and orifices to receive traction elements, thereby providing an outsole face.

The outsole face can then be placed in a mold cavity, where the material is preferably positioned away from the injection sprues. Another thermoplastic material can then be back injected into the mold to bond to the backing substrate, opposite of the material. This illustrates the second function of the backing substrate, namely to protect the material from the injection pressure. The injected thermoplastic material can be the same or different from the material used to produce the backing substrate. Preferably, they can include the same or similar materials (e.g., both being thermoplastic polyurethanes). As such, the backing substrate and the injected material in the mold form the outsole backing plate, which is secured to the material (during the co-extrusion step).

In other aspects, the outsole is formed with the use of injection molding. In this case, a substrate material is preferably injected into a mold to produce the outsole backing plate. The outsole backing plate can then be back injected with the material to produce the hydrogel-containing material bonded to the outsole backing plate.

In either of the above aspects, after the outsole is manufactured, it can be directly or indirectly secured to a footwear upper (i.e., the upper portion of an article of footwear which typically forms a void into which a wearer's foot can be inserted during wear) to provide the article of footwear of the present disclosure. In particular, the material can function as a ground-facing surface of the outsole, which is positioned on the opposite side of the outsole backing plate from the upper.

Property Analysis and Characterization Procedure

Various properties can be determined for the articles in accordance with the present disclosure according to the following methodologies.

In some cases, the properties determined using these test methods may be from samples of articles taken according to the Article Sampling Procedures. In other cases, the properties determined using these test methods may be from samples of material taken according to the Co-extruded Film Sampling Procedure, the Neat Film Sampling Procedure, or the Neat Material Sampling Procedure. Regardless of whether the test was conducted on a sample taken from an article or a sample of the hydrogel-containing material, the properties obtained by these tests are understood to be representative of the article of the present disclosure.

1. Sampling Procedures

As mentioned above, it has been found that when the hydrogel-containing material is secured to another substrate (e.g. tie layer), the interfacial bond can restrict the extent that the hydrogel-containing material can take up water and/or swell. As such, various properties of the hydrogel-containing material of the present disclosure can be characterized using samples prepared with the following sampling procedures:

A. Article Sampling Procedure

This procedure can be used to obtain a sample of the hydrogel-containing material from a component of an article or from the article itself. This procedure may be used to obtain a sample of the hydrogel-containing material when it is present on a component of an article (e.g., when the hydrogel-containing material is affixed to a substrate, or when the hydrogel-containing material is integrally formed in the component). A sample including the hydrogel-containing material in a non-wetted state (e.g., at 25° C. and 20% relative humidity) is cut from the component or article using a blade, or other suitable cutting instrument (e.g., saw, scissors, tin snips). Alternatively, the process may be performed by first separating the component of the article from an associated component of the article. The process is performed by separating the sample of the hydrogel-containing material from the remainder of the component or article, and removing any other materials from the sample that can uptake water and potentially skew the water uptake measurements of the sample. For example, a sample surface can be skinned, abraded, scraped, or otherwise cleaned to remove any adhesives, yarns, fibers, foams, and the like that could potentially take up water themselves. Depending on the size, composition, and complexity of a particular component or article, the entire component or article can constitute the sample. For example, components or articles having a small size, few or just a single component, or that are composed largely or entirely of the hydrogel-containing material can be used directly as the sample.

The resulting sample includes the hydrogel-containing material and any substrate bonded thereto, and thus maintains the interfacial bond between the hydrogel-containing material and the associated substrate. As such, this test can simulate how the hydrogel-containing material will perform as part of a component or an article. Additionally, this sample is also useful in cases where the interfacial bond between the hydrogel-containing material and the substrate is less defined, such as where the hydrogel-containing material is highly diffused into the substrate (e.g., with a concentration gradient).

The sample is taken at a location on the component or article that provides a substantially constant thickness for the hydrogel-containing material (within +/−10% of the average thickness), and has a surface area of 4 square centimeters (cm²). In cases where the hydrogel-containing material is not present on the substrate in any segment having a 4 cm² surface area and/or where the material thickness is not substantially constant for a segment having a 4 cm² surface area, sample sizes with smaller cross-sectional surface areas can be taken and the area-specific measurements adjusted accordingly.

B. Co-Extruded Film Sampling Procedure

This procedure can be used to obtain a sample of hydrogel-containing material when it is co-extruded onto a backing substrate. The backing substrate is produced from a second material that is compatible with the hydrogel-containing material.

It has been found that samples taken from co-extrusions are suitable substitutes to samples taken from components or articles. Additionally, this sample is also useful in cases where the interfacial bond between the hydrogel-containing material and the backing substrate is less defined, such as where the hydrogel-containing material is highly diffused into the material of the backing substrate (e.g., with a concentration gradient).

In this case, the hydrogel-containing material is co-extruded with the backing substrate as a web or sheet having a substantially constant film thickness for the hydrogel-containing material (within +/−10% of the average thickness), and cooled to solidify the resulting web or sheet. A sample of the hydrogel-containing material secured to the backing substrate is then cut from the resulting web or sheet, with a sample size surface area of 4 cm², such that the hydrogel-containing material of the resulting sample remains secured to the backing substrate.

C. Neat Film Sampling Procedure

This procedure can be used to obtain a sample of the hydrogel-containing material as a film when the hydrogel-containing material is isolated in a neat form (i.e., without any bonded substrate). In this case, the hydrogel-containing material is extruded as a web or sheet having a substantially constant thickness for the hydrogel-containing material (within +/−10% of the average thickness), and cooled to solidify the resulting web or sheet. A sample of the hydrogel-containing material having a surface area of 4 cm² is then cut from the resulting web or sheet.

Alternatively, if a source of the hydrogel-containing material is not available in a neat form, the hydrogel-containing material can be cut from a substrate of a component or an article, or from a backing substrate of a co-extruded sheet or web, thereby isolating the hydrogel-containing material. In either case, a sample of the hydrogel-containing material having a surface area of 4 cm² is then cut from the resulting isolated hydrogel-containing material.

D. Neat Material Sampling Procedure

This procedure can be used to obtain a sample of a hydrogel-containing material used to form the hydrogel-containing material as a film. In this case, the hydrogel-containing material is provided in media form, such as flakes, granules, powders, pellets, and the like. If a source of the hydrogel-containing material is not available in a neat form, the material can be cut, scraped, or ground from a substrate, a component, or an article, or from a backing substrate of a co-extruded sheet or web, thereby isolating the hydrogel-containing material.

2. Water Uptake Capacity Test

This test measures the water uptake capacity of the hydrogel-containing material after a given soaking duration for a sample (e.g., taken with the above-discussed Article Sampling Procedure, Co-extruded Film Sampling Procedure, or the Neat Film Sampling Procedure). The sample is initially dried at 60° C. until there is no weight change for consecutive measurement intervals of at least 30 minutes apart (e.g., a 24-hour drying period at 60° C. is typically a suitable duration). The total weight of the dried sample ($Wt_{sample,dry}$) is then measured in grams. The dried sample is then allowed to cool down to 25° C., and is fully immersed in a deionized water bath maintained at 25° C. After a given soaking duration, the sample is removed from the deionized water bath, blotted with a cloth to remove surface water, and the total weight of the soaked sample ($Wt_{sample,wet}$) is measured in grams.

Any suitable soaking duration can be used, where a 24-hour soaking duration is believed to simulate saturation conditions for the material of the present disclosure. Accordingly, as used herein, the expression "having a water uptake capacity at 5 minutes of . . . " refers to a soaking duration of 5 minutes, having a water uptake capacity at 1 hour of . . . " refers to a soaking duration of 1 hour, the expression "having a water uptake capacity at 24 hours of . . . " refers to a soaking duration of 24 hours, and the like.

As can be appreciated, the total weight of a sample taken pursuant to the Article Sampling Procedure or the Co-extruded Film Sampling Procedure includes the weight of the hydrogel-containing material as dried or soaked ($Wt_{,film,dry}$ or $Wt_{,film,wet}$) and the weight of the backing substrate ($Wt_{,substrate}$). In order to determine a change in weight of the hydrogel-containing material due to water uptake, the weight of the substrate ($Wt_{,substrate}$) needs to be subtracted from the sample measurements.

The weight of the substrate ($Wt_{,substrate}$) is calculated using the sample surface area (e.g., 4 cm²), an average measured thickness of the substrate in the sample, and the average density of the substrate material. Alternatively, if the density of the material for the substrate is not known or obtainable, the weight of the substrate ($Wt_{,substrate}$) is determined by taking a second sample using the same sampling procedure as used for the primary sample, and having the same dimensions (surface area and film/substrate thicknesses) as the primary sample. The hydrogel-containing material of the second sample is then cut apart from the substrate of the second sample to provide an isolated substrate. The isolated substrate is then dried at 60° C. for 24 hours, which can be performed at the same time as the primary sample drying. The weight of the isolated substrate ($Wt_{,substrate}$) is then measured in grams.

The resulting substrate weight ($Wt_{,substrate}$) is then subtracted from the weights of the dried and soaked primary sample ($Wt_{,sample,dry}$ and $Wt_{,sample,wet}$) to provide the weights of the hydrogel-containing material as dried and soaked ($Wt_{,film,dry}$ and $Wt_{,film,wet}$), as depicted below by Equations 1 and 2:

$$Wt_{,film,dry} = Wt_{,sample,dry} - WT_{,substrate} \quad \text{(Equation 1)}$$

$$Wt_{,film,wet} = Wt_{,sample,wet} - Wt_{,substrate} \quad \text{(Equation 2)}$$

For hydrogel-containing material samples taken pursuant to the Neat Film Sampling Procedure, the substrate weight ($Wt_{,substrate}$) is zero. As such, Equation 1 collapses to $Wt_{,film,dry} = Wt_{,sample,dry}$, and Equation 2 collapses to $Wt_{,film,wet} = Wt_{,sample,wet}$.

The weight of the dried hydrogel-containing material ($Wt_{,film,dry}$) is then subtracted from the weight of the soaked hydrogel-containing material ($Wt_{,film,wet}$) to provide the weight of water that was taken up by the hydrogel-containing material, which is then divided by the weight of the dried hydrogel-containing material ($Wt_{,film,dry}$) to provide the water uptake capacity for the given soaking duration as a percentage, as depicted below by Equation 3:

$$\text{Water Uptake Capacity} = \frac{Wt_{,film,wet} - Wt_{,film,dry}}{Wt_{,film,dry}} (100\%) \quad \text{(Equation 3)}$$

For example, a water uptake capacity of 50% at 1 hour means that the soaked hydrogel-containing material weighed 1.5 times more than its dry-state weight after soaking for 1 hour, where there is a 1:2 weight ratio of water to hydrogel-containing material. Similarly, a water uptake capacity of 500% at 24 hours means that the soaked hydrogel-containing material weighed 5 times more than its dry-state weight after soaking for 24 hours, where there is a 4:1 weight ratio of water to hydrogel-containing material.

3. Water Uptake Rate Test

This test measures the water uptake rate of the hydrogel-containing material by modeling weight gain as a function of soaking time for a sample with a one-dimensional diffusion model. The sample can be taken with any of the above-discussed Article Sampling Procedure, Co-extruded Film Sampling Procedure, or the Neat Film Sampling Procedure. The sample is initially dried at 60° C. until there is no weight change for consecutive measurement intervals of at least 30 minutes apart (a 24-hour drying period at 60° C. is typically a suitable duration). The total weight of the dried sample ($Wt_{,sample,dry}$) is then measured in grams. Additionally, the average thickness of the hydrogel-containing material for the dried sample is measured for use in calculating the water uptake rate, as explained below.

The dried sample is then allowed to cooled down to 25° C., and is fully immersed in a deionized water bath maintained at 25° C. Between soaking durations of 1, 2, 4, 9, 16, and 25 minutes, the sample is removed from the deionized water bath, blotted with a cloth to remove surface water, and the total weight of the soaked sample ($Wt_{,sample,wet,t}$) is measured, where "t" refers to the particular soaking-duration data point (e.g., 1, 2, 4, 9, 16, or 25 minutes).

The exposed surface area of the soaked sample ($A_t$) is also measured with calipers for determining the specific weight gain, as explained below. The exposed surface area refers to the surface area that comes into contact with the deionized water when fully immersed in the bath. For samples obtained using the Article Sampling Procedure and the Co-extruded Film Sampling Procedure, the samples only have one major surface exposed. However, for samples obtained using the Neat Film Sampling Procedure, both major surfaces are exposed. For convenience, the surface areas of the peripheral edges of the sample are ignored due to their relatively small dimensions.

The measured sample is fully immersed back in the deionized water bath between measurements. The 1, 2, 4, 9, 16, and 25 minute durations refer to cumulative soaking durations while the sample is fully immersed in the deionized water bath (i.e., after the first minute of soaking and first measurement, the sample is returned to the bath for one more minute of soaking before measuring at the 2-minute mark).

As discussed above in the Water Uptake Capacity Test, the total weight of a sample taken pursuant to the Article Sampling Procedure or the Co-extruded Film Sampling Procedure includes the weight of the hydrogel-containing material as dried or soaked ($Wt_{,film,dry}$ or $Wt_{,film,wet,t}$) and the weight of the backing substrate ($Wt_{,substrate}$). In order to determine a weight change of the hydrogel-containing material due to water uptake, the weight of the substrate ($Wt_{,substrate}$) needs to be subtracted from the sample weight measurements. This can be accomplished using the same steps discussed above in the Water Uptake Capacity Test to provide the resulting hydrogel-containing material weights $Wt_{,film,dry}$ and $Wt_{,film,wet,t}$ for each soaking-duration measurement.

The specific weight gain ($Ws_{,film,t}$) from water uptake for each soaked sample is then calculated as the difference between the weight of the soaked sample ($Wt_{,film,wet,t}$) and the weight of the initial dried sample ($Wt_{,film,dry}$), where the resulting difference is then divided by the exposed surface area of the soaked sample ($A_t$), as depicted below by Equation 4:

$$Wt_{,film,t} = \frac{Wt_{,film,wet,t} - Wt_{,film,dry}}{A_t} \quad \text{(Equation 4)}$$

where t refers to the particular soaking-duration data point (e.g., 1, 2, 4, 9, 16, or 25 minutes), as mentioned above.

The water uptake rate for the hydrogel-containing material is then determined as the slope of the specific weight gains ($Ws_{,fiml,t}$) versus the square root of time (in minutes), as determined by a least squares linear regression of the data points. For the hydrogel-containing material of the present disclosure, the plot of the specific weight gains ($Ws_{,film,t}$) versus the square root of time (in minutes) provides an initial slope that is substantially linear (to provide the water uptake rate by the linear regression analysis). However, after a period of time depending on the thickness of the hydrogel-containing material, the specific weight gains will slow down, indicating a reduction in the water uptake rate, until the saturated state is reached. This is believed to be due to the water being sufficiently diffused throughout the hydrogel-containing material as the water uptake approaches saturation, and will vary depending on thickness.

As such, for the hydrogel-containing material having an average dried thickness (as measured above) less than 0.3 millimeters, only the specific weight gain data points at 1, 2, 4, and 9 minutes are used in the linear regression analysis. In these cases, the data points at 16 and 25 minutes can begin to significantly diverge from the linear slope due to the water uptake approaching saturation, and are omitted from the linear regression analysis. In comparison, for the hydrogel-containing material having an average dried thickness (as measured above) of 0.3 millimeters or more, the specific weight gain data points at 1, 2, 4, 9, 16, and 25 minutes are used in the linear regression analysis. The resulting slope defining the water uptake rate for the sampled hydrogel-containing material has units of weight/(surface area-square root of time), such as grams/(meter$^2$-minutes$^{1/2}$).

Furthermore, some film or substrate surfaces can create surface phenomenon that quickly attract and retain water molecules (e.g., via surface hydrogen bonding or capillary action) without actually drawing the water molecules into the film or substrate. Thus, samples of these films or substrates can show rapid specific weight gains for the 1-minute sample, and possibly for the 2-minute sample. After that, however, further weight gain is negligible. As such, the linear regression analysis is only applied if the specific weight gain data points at 1, 2, and 4 minutes continue to show an increase in water uptake. If not, the water uptake rate under this test methodology is considered to be about zero grams/(meter$^2$-minutes$^{1/2}$).

4. Swelling Capacity Test

This test measures the swelling capacity of the hydrogel-containing material in terms of increases in thickness and volume after a given soaking duration for a sample (e.g., taken with the above-discussed Article Sampling Procedure, Co-extruded Film Sampling Procedure, or the Neat Film Sampling Procedure). The sample is initially dried at 60° C. until there is no weight change for consecutive measurement intervals of at least 30 minutes apart (a 24-hour drying period is typically a suitable duration). The dimensions of the dried sample are then measured (e.g., thickness, length, and width for a rectangular sample; thickness and diameter for a circular sample, etc. ... ). The dried sample is then fully immersed in a deionized water bath maintained at 25° C. After a given soaking duration, the sample is removed from the deionized water bath, blotted with a cloth to remove surface water, and the same dimensions for the soaked sample are re-measured.

Any suitable soaking duration can be used. Accordingly, as used herein, the expressions "having a swelling thickness (or volume) increase at 5 minutes of . . . " refers to a soaking duration of 5 minutes, having a swelling thickness (or volume) increase at 1 hour of . . . " refers to a test duration of 1 hour, the expression "having a swelling thickness (or volume) increase at 24 hours of . . . " refers to a test duration of 24 hours, and the like.

The swelling of the hydrogel-containing material is determined by (i) an increase in the thickness between the dried and soaked hydrogel-containing material, by (ii) an increase in the volume between the dried and soaked hydrogel-containing material, or (iii) both. The increase in thickness between the dried and soaked hydrogel-containing material is calculated by subtracting the measured thickness of the initial dried hydrogel-containing material from the measured thickness of the soaked hydrogel-containing material. Similarly, the increase in volume between the dried and soaked hydrogel-containing material is calculated by subtracting the measured volume of the initial dried hydrogel-containing material from the measured volume of the soaked hydrogel-containing material. The increases in the thickness and volume can also be represented as percentage increases relative to the dry thickness or volume, respectively.

5. Contact Angle Test

This test measures the contact angle of the hydrogel-containing material surface based on a static sessile drop contact angle measurement for a sample (e.g., taken with the above-discussed Article Sampling Procedure, Co-extruded Film Sampling Procedure, or the Neat Film Sampling Procedure). The contact angle refers to the angle at which a liquid interface meets a solid surface, and is an indicator of how hydrophilic the surface is.

For a dry test (i.e., to determine a dry-state contact angle), the sample is initially equilibrated at 25° C. and 20% humidity for 24 hours. For a wet test (i.e., to determine a wet-state contact angle), the sample is fully immersed in a deionized water bath maintained at 25° C. for 24 hours. After that, the sample is removed from the bath and blotted with a cloth to remove surface water, and clipped to a glass slide if needed to prevent curling.

The dry or wet sample is then placed on a moveable stage of a contact angle goniometer commercially available under the tradename "RAME-HART F290" from Rame-Hart Instrument Co., Succasunna, N.J. A 10-microliter droplet of deionized water is then placed on the sample using a syringe and automated pump. An image is then immediately taken of the droplet (before hydrogel-containing material can take up the droplet), and the contact angle of both edges of the water droplet are measured from the image. The decrease in contact angle between the dried and wet samples is calculated by subtracting the measured contact angle of the wet hydrogel-containing material from the measured contact angle of the dry hydrogel-containing material.

6. Coefficient of Friction Test

This test measures the coefficient of friction of the hydrogel-containing material surface for a sample (e.g., taken with the above-discussed Article Sampling Procedure, Co-extruded Film Sampling Procedure, or the Neat Film Sampling Procedure). For a dry test (i.e., to determine a dry-state coefficient of friction), the sample is initially equilibrated at 25° C. and 20% humidity for 24 hours. For a wet test (i.e., to determine a wet-state coefficient of friction), the sample is fully immersed in a deionized water bath maintained at 25° C. for 24 hours. After that, the sample is removed from the bath and blotted with a cloth to remove surface water.

The measurement is performed with an aluminum sled mounted on an aluminum test track, which is used to perform a sliding friction test for test sample on an aluminum surface of the test track. The test track measures 127 millimeters wide by 610 millimeters long. The aluminum sled measures 76.2 millimeters×76.2 millimeters, with a 9.5 millimeter radius cut into the leading edge. The contact area of the aluminum sled with the track is 76.2 millimeters×66.6 millimeters, or 5,100 square millimeters).

The dry or wet sample is attached to the bottom of the sled using a room temperature-curing two-part epoxy adhesive commercially available under the tradename "LOCTITE 608" from Henkel, Düsseldorf, Germany. The adhesive is used to maintain the planarity of the wet sample, which can curl when saturated. A polystyrene foam having a thickness of about 25.4 millimeters is attached to the top surface of the sled (opposite of the test sample) for structural support.

The sliding friction test is conducted using a screw-driven load frame. A tow cable is attached to the sled with a mount supported in the polystyrene foam structural support, and is wrapped around a pulley to drag the sled across the aluminum test track. The sliding or frictional force is measured using a load transducer with a capacity of 2,000 Newtons. The normal force is controlled by placing weights on top of the aluminum sled, supported by the polystyrene foam structural support, for a total sled weight of 20.9 kilograms (205 Newtons). The crosshead of the test frame is increased at a rate of 5 millimeters/second, and the total test displacement is 250 millimeters. The coefficient of friction is calculated based on the steady-state force parallel to the direction of movement required to pull the sled at constant velocity. The coefficient of friction itself is found by dividing the steady-state pull force by the applied normal force. Any transient value relating static coefficient of friction at the start of the test is ignored.

7. Storage Modulus Test

This test measures the resistance of the hydrogel-containing material to being deformed (ratio of stress to strain) when a vibratory or oscillating force is applied to it, and is a good indicator of film compliance in the dry and wet states. For this test, a sample is provided in neat form using the Neat Film Sampling Procedure, which is modified such that the surface area of the test sample is rectangular with dimensions of 5.35 millimeters wide and 10 millimeters long. The thickness can range from 0.1 millimeters to 2 millimeters, and the specific range is not particularly limited as the end modulus result is normalized according to thickness.

The storage modulus (E') with units of megaPascals (MPa) of the sample is determined by dynamic mechanical analysis (DMA) using a DMA analyzer commercially available under the tradename "Q800 DMA ANALYZER" from TA Instruments, New Castle, Del., which is equipped with a relative humidity accessory to maintain the sample at constant temperature and relative humidity during the analysis.

Initially, the thickness of the test sample is measured using calipers (for use in the modulus calculations). The test sample is then clamped into the DMA analyzer, which is operated at the following stress/strain conditions during the analysis: isothermal temperature of 25° C., frequency of 1 Hertz, strain amplitude of 10 micrometers, preload of 1 Newton, and force track of 125%. The DMA analysis is performed at a constant 25° C. temperature according to the following time/relative humidity (RH) profile: (i) 0% RH for 300 minutes (representing the dry state for storage modulus determination), (ii) 50% RH for 600 minutes, (iii) 90% RH for 600 minutes (representing the wet state for storage modulus determination), and (iv) 0% RH for 600 minutes.

The E' value (in MPa) is determined from the DMA curve according to standard DMA techniques at the end of each time segment with a constant RH value. Namely, the E' value at 0% RH (i.e., the dry-state storage modulus) is the value at the end of step (i), the E' value at 50% RH is the value at the end of step (ii), and the E' value at 90% RH (i.e., the wet-state storage modulus) is the value at the end of step (iii) in the specified time/relative humidity profile.

The hydrogel-containing material can be characterized by its dry-state storage modulus, its wet-state storage modulus, or the reduction in storage modulus between the dry-state and wet-state, where wet-state storage modulus is less than the dry-state storage modulus. This reduction in storage modulus can be listed as a difference between the dry-state storage modulus and the wet-state storage modulus, or as a percentage change relative to the dry-state storage modulus.

8. Glass Transition Temperature Test

This test measures the glass transition temperature ($T_g$) of the hydrogel-containing material for a sample, where the hydrogel-containing material is provided in neat form, such as with the Neat Film Sampling Procedure or the Neat Material Sampling Procedure, with a 10-milligram sample weight. The sample is measured in both a dry state and a wet state (i.e., after exposure to a humid environment as described herein).

The glass transition temperature is determined with DMA using a DMA analyzer commercially available under the tradename "Q2000 DMA ANALYZER" from TA Instruments, New Castle, Del., which is equipped with aluminum hermetic pans with pinhole lids, and the sample chamber is purged with 50 milliliters/minute of nitrogen gas during analysis. Samples in the dry state are prepared by holding at 0% RH until constant weight (less than 0.01% weight change over 120 minute period). Samples in the wet state are prepared by conditioning at a constant 25° C. according to the following time/relative humidity (RH) profile: (i) 250 minutes at 0% RH, (ii) 250 minutes at 50% RH, and (iii) 1,440 minutes at 90% RH. Step (iii) of the conditioning program can be terminated early if sample weight is measured during conditioning and is measured to be substantially constant within 0.05% during an interval of 100 minutes.

After the sample is prepared in either the dry or wet state, it is analyzed by DSC to provide a heat flow versus temperature curve. The DSC analysis is performed with the following time/temperature profile: (i) equilibrate at −90° C. for 2 minutes, (ii) ramp at +10° C./minute to 250° C., (iii) ramp at −50° C./minute to −90° C., and (iv) ramp at +10° C./minute to 250° C. The glass transition temperature value (in Celsius) is determined from the DSC curve according to standard DSC techniques.

9. Impact Energy Test

This test measures the ability of a hydrogel-containing material sample to shed soil under particular test conditions, where the sample is prepared using the Co-extruded Film Sampling Procedure or the Neat Film Sampling Procedure (to obtain a suitable sample surface area). Initially, the sample is fully immersed in a water bath maintained at 25° C. for 24 hours), and then removed from the bath and blotted with a cloth to remove surface water.

The saturated test sample is then adhered to an aluminum block having a 25.4-millimeter thickness and a 76.2 millimeters×76.2 millimeters surface area, using a room temperature-curing two-part epoxy adhesive commercially available under the tradename "LOCTITE 608" from Henkel, Düsseldorf, Germany. The adhesive is used to maintain the planarity of the soaked sample, which can curl when saturated.

To expose the sample to soil, a bed of soil of about 75 millimeters in height is placed on top of a flat plastic plate. The soil is commercially available under the tradename "TIMBERLINE TOP SOIL", model 50051562, from Timberline (subsidiary of Old Castle, Inc., Atlanta, Ga.) and was sifted with a square mesh with a pore dimension of 1.5 millimeter on each side. The sample is then compressed into the soil under body weight. The weight is removed from the sample, and the sample is then twisted by 90 degrees in the plane of the plate and then lifted vertically. If no soil clogs the sample, no further testing is conducted.

However, if soil does clog the sample, the soil is knocked loose by dropping a 25.4-millimeter diameter steel ball weighing 67 grams onto the top side of the aluminum block (opposite of the test sample and clogged soil). The initial drop height is 152 millimeters (6 inches) above the aluminum block. If the soil does not come loose, the ball drop height is increased by an additional 152 millimeters (6 inches) and dropped again. This procedure of increasing the ball drop height by 152 millimeter (6 inch) increments is repeated until the soil on the bottom of the aluminum block (i.e., on the sample) is knocked loose.

This test is run 10 times per test sample. For each run, the ball drop height can be converted into unclogging impact energy by multiplying the ball drop height by the ball mass (67 grams) and the acceleration of gravity (9.8 meters/second). The unclogging impact energy in Joules equals the ball drop height in inches multiplied by 0.0167. The procedure is performed on both the aluminum block with the hydrogel-containing material sample and a control aluminum block without the hydrogel-containing material, and the relative ball drop height, and therefore relative impact energy, is determined as the ball drop height for the aluminum block with the hydrogel-containing material sample divided by the control aluminum block without the hydrogel-containing material. A result of zero for the relative ball drop height (or relative impact energy) indicates that no soil clogged to the aluminum block initially when the sample was compressed into the test soil (i.e., in which case the ball drop and control portions of the test are omitted).

10. Soil Shedding Article Test

This test measures the mud shedding ability of a component or an article, and does not require any sampling procedure. Initially, the component or article is fully immersed in a water bath maintained at 25° C. for 20 minutes), and then removed from the bath and blotted with a cloth to remove surface water, and its initial weight is measured.

The soaked component/article is then placed on a support and positioned as the article is positioned during normal use. The component or article is then exposed to test soil in a manner which approximates the manner in which the component or article is exposed to mud or dirt during normal use. Soil is sprayed at the article. The amount and velocity of the soil are selected to approximate the conditions which the component or article would be exposed to during normal use. The test soil is commercially available under the tradename "TIMBERLINE TOP SOIL", model 50051562, from Timberline (subsidiary of Old Castle, Inc., Atlanta, Ga.), and the moisture content is adjusted so that the shear strength value is between 3 and 4 kilograms/cm$^2$ on a shear vane tester available from Test Mark Industries (East Palestine, Ohio).

After the test is complete, the component/article is carefully removed from the support and its post-test weight is measured. The difference between the post-test weight and the initial weight of the component or article, due to soil accumulation, is then determined.

11. Water Uptake Test

This test measures the water uptake of pelletized hydrogel-containing material immediately after being pelletized. A sample of pelletized material is removed from the pelletizing equipment after completing the pelletization process, and immediately weighted in grams to determine its wet weight t ($Wt_{sample,wet}$). The sample is then dried at 60° C. until there is no weight change for consecutive measurement intervals of at least 30 minutes apart (e.g., a 24-hour drying period at 60° C. is typically a suitable duration). The total weight of the dried sample ($Wt_{sample,dry}$) is then measured in grams.

The weight of the dried hydrogel-containing material ($Wt_{sample,dry}$) is then subtracted from the weight of the wet hydrogel-containing material ($Wt_{sample,wet}$) to provide the weight of water that was taken up by the hydrogel-containing material during the pelletization process, which is then divided by the weight of the dried hydrogel-containing material ($Wt_{sample,dry}$) to provide the water uptake during pelletization as a percentage, as depicted below by Equation 5:

$$\text{Water Uptake} = \frac{Wt_{sample,wet} - Wt_{sample,dry}}{Wt_{sample,dry}}(100\%) \quad \text{(Equation 5)}$$

For example, a water uptake of 50% means that the pelletized hydrogel-containing material weighed 1.5 times more than its dry-state weight, where there is a 1:2 weight ratio of water to hydrogel-containing material.

Although the present disclosure has been described with reference to particular examples, workers skilled in the art will recognize that changes may be made in form and detail without departing from the spirit and scope of the disclosure.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

1. Footwear Outsole Water Uptake Analysis

Test samples for Examples 1-5 were measured for water uptake capacities over multiple soaking durations. Each test sample was taken from a global football/soccer shoe outsole having an outsole of the present disclosure. Each outsole was initially manufactured by co-extruding the hydrogel-containing material with a substrate body having a substrate thickness of 0.4 millimeters, where the substrate body material was anaromatic thermoplastic polyurethane commercially available under the tradename "ESTANE 2103-87AE" from Lubrizol Corporation, Wickliffe, Ohio.

For Examples 1-3, the hydrogel-containing material was a thermoplastic polyurethane hydrogel commercially available under the tradename "TECOPHILIC TG-500" from the Lubrizol Corporation, Wickliffe, Ohio, which included copolymer chains having aliphatic hard segments and hydrophilic soft segments (with polyether chains). For Examples 4 and 5, the hydrogel-containing material was a lower-water-uptake thermoplastic polyurethane hydrogel commercially available under the tradename "TECOPHILIC HP-60D-60" from the Lubrizol Corporation, Wickliffe, Ohio.

For each example, the resulting co-extruded web was then sheeted, vacuum thermoformed, and trimmed to dimensions for an outsole face. The outsole face was then back injected with another thermoplastic polyurethane commercially available under the tradename "DESMOPAN DP 8795 A" from Bayer MaterialScience AG, Leverkusen, Germany to produce the outsole having the hydrogel-containing material defining the ground-facing surface, and the extruded substrate body and back-injected material collectively forming the outsole backing plate. Footwear uppers were then adhered to the top sides of the produced outsoles to provide the article of footwear.

Test samples for each example were then taken as described above in the Article Sampling Procedure, with the exception of the sample sizes described below. In particular, annular test samples including the hydrogel-containing material and the outsole backing plate were cut out of the footwear. This was performed by initially cutting off the upper from the outsole near the biteline where the outsole and upper meet.

A small guide hole in the center of the sample was then created (creating an inner diameter for the sample) to assist in cutting the annular sample with the desired outer diameter. All removable layers remaining on the top side of the outsole backing plate after cutting were peeled away from the test samples, including the sockliner, strobel, and insole board, while some residual adhesive remained on the sample. Each sample was taken from a central location in its respective region (i.e., near a longitudinal midline) and generally in-between the cleats.

Test samples for Examples 1-3 were respectively taken from the forefoot region, the midfoot region, and the heel region of the outsole. Test samples for Examples 4 and 5 were respectively taken from the forefoot region and the midfoot region. Each sample was taken from a central location in its respective region (i.e., near a longitudinal midline) and generally in-between the cleats.

For comparison purposes, outsole samples were also taken from a global football/soccer footwear having a thermoplastic polyurethane commercially available under the tradename "DESMOPAN DP 8795 A" from Bayer MaterialScience AG, Leverkusen, Germany; where the outsoles did not include any hydrogel-containing material of the present disclosure. For Comparative Example A, an annular test sample was taken from the forefoot region of the outsole using the same technique as discussed above for Examples 1-5. For Comparative Example B, a rectangular test sample was taken from the midfoot region of the outsole. Each sample was taken from a central location in its respective region (i.e., near a longitudinal midline) and generally in-between the cleats.

The material thickness, outsole thickness, surface area, and material volume of each test sample was then measured and calculated. The water uptake capacity for each test sample was then measured for different soaking durations, pursuant to the Water Uptake Capacity Test. After each soaking duration, the total sample weight was recorded, and the water uptake weight for each soaking duration was calculated by subtracting out the dry sample weight from the given recorded total sample weight.

The material weight was also calculated for each soaking duration by subtracting out the weight of the sample outsole substrate, as described in the Water Uptake Capacity Test. The outsole substrate weight was determined by calculating its volume (from the outsole thickness and surface area) and using the known density of the outsole backing plate material. The water uptake capacity was then calculated for each soaking duration, as also described in the Water Uptake Capacity Test. Tables 1A-1G shown below list the total sample weights, the water uptake weights, the material weights, and the water uptake capacities for the test samples of Examples 1-5 and Comparative Examples A and B over different soaking durations.

TABLE 1A

| Sample | Soak Time (minutes) | Total Sample Weight (grams) | Uptaken Water Weight (grams) | Material Weight (grams) | Water Uptake Capacity |
|---|---|---|---|---|---|
| Example 1 | 0 | 1.54 | 0.00 | 0.64 | 0% |
| Example 1 | 2 | 1.72 | 0.18 | 0.77 | 28% |
| Example 1 | 5 | 1.75 | 0.21 | 0.84 | 33% |
| Example 1 | 10 | 1.84 | 0.30 | 0.90 | 47% |
| Example 1 | 30 | 2.01 | 0.47 | 1.10 | 74% |
| Example 1 | 60 | 2.18 | 0.64 | 1.22 | 101% |

TABLE 1B

| Sample | Soak Time (minutes) | Total Sample Weight (grams) | Uptaken Water Weight (grams) | Material Weight (grams) | Water Uptake Capacity |
|---|---|---|---|---|---|
| Example 2 | 0 | 1.50 | 0.00 | 0.51 | 0% |
| Example 2 | 2 | 1.68 | 0.18 | 0.67 | 35% |
| Example 2 | 5 | 1.75 | 0.25 | 0.73 | 49% |
| Example 2 | 10 | 1.84 | 0.34 | 1.04 | 66% |
| Example 2 | 30 | 2.15 | 0.65 | 1.33 | 127% |
| Example 2 | 60 | 2.40 | 0.90 | 1.49 | 176% |

TABLE 1C

| Sample | Soak Time (minutes) | Total Sample Weight (grams) | Uptaken Water Weight (grams) | Material Weight (grams) | Water Uptake Capacity |
|---|---|---|---|---|---|
| Example 3 | 0 | 1.21 | 0.00 | 0.46 | 0% |
| Example 3 | 2 | 1.36 | 0.15 | 0.51 | 32% |
| Example 3 | 5 | 1.44 | 0.23 | 0.72 | 50% |
| Example 3 | 10 | 1.52 | 0.31 | 0.88 | 67% |
| Example 3 | 30 | 1.63 | 0.42 | 0.79 | 91% |
| Example 3 | 60 | 1.80 | 0.59 | 1.12 | 127% |
| Example 3 | 180 | 2.15 | 0.94 | 1.58 | 203% |
| Example 3 | 300 | 2.30 | 1.09 | 1.72 | 235% |
| Example 3 | 1260 | 2.57 | 1.36 | 1.93 | 294% |

TABLE 1D

| Sample | Soak Time (minutes) | Total Sample Weight (grams) | Uptaken Water Weight (grams) | Material Weight (grams) | Water Uptake Capacity |
|---|---|---|---|---|---|
| Example 4 | 0 | 1.06 | 0.00 | 0.18 | 0% |
| Example 4 | 2 | 1.08 | 0.02 | 0.31 | 11% |
| Example 4 | 5 | 1.11 | 0.05 | 0.35 | 28% |
| Example 4 | 10 | 1.06 | 0.00 | 0.34 | 0% |
| Example 4 | 30 | 1.11 | 0.05 | 0.28 | 28% |
| Example 4 | 60 | 1.12 | 0.06 | 0.41 | 33% |
| Example 4 | 180 | 1.14 | 0.08 | 0.38 | 44% |
| Example 4 | 300 | 1.10 | 0.04 | 0.38 | 22% |
| Example 4 | 1260 | 1.10 | 0.04 | 0.36 | 22% |

TABLE 1E

| Sample | Soak Time (minutes) | Total Sample Weight (grams) | Uptaken Water Weight (grams) | Material Weight (grams) | Water Uptake Capacity |
|---|---|---|---|---|---|
| Example 5 | 0 | 1.14 | 0.00 | 0.21 | 0% |
| Example 5 | 2 | 1.17 | 0.03 | 0.21 | 61% |
| Example 5 | 5 | 1.07 | −0.07 | 0.24 | 6% |
| Example 5 | 10 | 1.19 | 0.05 | 0.26 | 72% |
| Example 5 | 30 | 1.18 | 0.04 | 0.26 | 66% |
| Example 5 | 60 | 1.19 | 0.05 | 0.27 | 72% |
| Example 5 | 180 | 1.20 | 0.06 | 0.29 | 77% |
| Example 5 | 300 | 1.19 | 0.05 | 0.36 | 72% |
| Example 5 | 1260 | 1.20 | 0.06 | 0.24 | 77% |

TABLE 1F

| Sample | Soak Time (minutes) | Total Sample Weight (grams) | Uptaken Water Weight (grams) |
|---|---|---|---|
| Comparative Example A | 0 | 1.26 | 0.00 |
| Comparative Example A | 2 | 1.60 | 0.34 |
| Comparative Example A | 5 | 1.62 | 0.36 |
| Comparative Example A | 10 | 1.56 | 0.30 |
| Comparative Example A | 30 | 1.62 | 0.36 |
| Comparative Example A | 60 | 1.57 | 0.31 |

TABLE 1F

| Sample | Soak Time (minutes) | Total Sample Weight (grams) | Uptaken Water Weight (grams) |
|---|---|---|---|
| Comparative Example B | 0 | 1.05 | 0.00 |
| Comparative Example B | 2 | 1.05 | 0.00 |
| Comparative Example B | 5 | 1.05 | 0.00 |
| Comparative Example B | 10 | 1.05 | 0.00 |
| Comparative Example B | 30 | 1.05 | 0.00 |
| Comparative Example B | 60 | 1.05 | 0.00 |
| Comparative Example B | 180 | 1.06 | 0.01 |
| Comparative Example B | 300 | 1.05 | 0.00 |
| Comparative Example B | 1260 | 1.06 | 0.01 |

As shown in Tables 1A-1C, there is significant change in the weight of the samples for Example 1-3, which was believed to be due to the high absorbance of the material. The samples of Examples 4 and 5 were based on a lower-absorbent material and used a thinner application when compared to Examples 1-3. Both of these differences lead to less resolution in the measurement, although the uptake percent (~50% average for the two samples) is measurable. This illustrates how the water uptake of a hydrogel-containing material is dependent on the water uptake properties of the material as well as the material thickness.

In comparison, the samples of Comparative Examples A and B demonstrated the lack of water uptake for the non-hydrogel thermoplastic. In particular, the sample of Comparative Example A only showed a change in weight at the first time point, but no subsequent change. This is believed to be due to surface phenomenon of the sample (e.g., capillary action) rather than water uptake into the outsole. In particular, the backing layer for Comparative Example A was rough (i.e., has micropores unrelated to the polymer chemistry) and fibers associated with shoe construction adhered to the backing layer that were not fully removed during sample preparation. On the other hand, the sample of Comparative Example B had a smooth outsole surface and all potential contaminants are removed.

Examples 1-3 of a material comprising a hydrogel all had average water uptake capacities at 1 hour of greater than 40% by weight. In fact, the hydrogel-containing material had average water uptake capacities at 1 hour of greater than 80% by weight. Examples 4 and 5 of a different material comprising a hydrogel had average water uptake capacities at 180 minutes of greater than 40% by weight. In comparison, the comparative samples of non-hydrogel materials had average water uptake capacities at 24 hours of less than 1% by weight.

In addition to the water uptake capacities, the test samples of Examples 1-5 and Comparative Examples A and B were measured for thickness and volumetric swelling, pursuant to the Swelling Capacity Test, over the same soaking durations referred to above. Tables 2A-2G list the measured surface areas and material thicknesses, and the calculated material volumes for the test samples, and Tables 3A-3E list the material thickness increase, the percentage material thickness increase, the material volume increase, the percentage material volume increase.

TABLE 2A

| Sample | Soak Time (minutes) | Surface Area ($mm^2$) | Sample Thickness (mm) | Material thickness (mm) | Material volume ($mm^3$) |
|---|---|---|---|---|---|
| Example 1 | 0 | 380 | 3.66 | 1.44 | 548 |
| Example 1 | 2 | 379 | 3.75 | 1.75 | 664 |
| Example 1 | 5 | 410 | 3.75 | 1.77 | 726 |
| Example 1 | 10 | 410 | 3.90 | 1.90 | 779 |
| Example 1 | 30 | 451 | 4.18 | 2.11 | 951 |
| Example 1 | 60 | 481 | 4.34 | 2.18 | 1049 |

TABLE 2B

| Sample | Soak Time (minutes) | Surface Area ($mm^2$) | Sample Thickness (mm) | Material thickness (mm) | Material volume ($mm^3$) |
|---|---|---|---|---|---|
| Example 2 | 0 | 421 | 3.50 | 1.05 | 442 |
| Example 2 | 2 | 415 | 3.70 | 1.40 | 582 |
| Example 2 | 5 | 436 | 4.22 | 1.45 | 633 |
| Example 2 | 10 | 472 | 4.20 | 1.90 | 897 |
| Example 2 | 30 | 561 | 4.15 | 2.05 | 1150 |
| Example 2 | 60 | 612 | 4.18 | 2.10 | 1285 |

TABLE 2C

| Sample | Soak Time (minutes) | Surface Area ($mm^2$) | Sample Thickness (mm) | Material thickness (mm) | Material volume ($mm^3$) |
|---|---|---|---|---|---|
| Example 3 | 0 | 347 | 2.95 | 1.15 | 399 |
| Example 3 | 2 | 347 | 3.08 | 1.28 | 444 |

TABLE 2C-continued

| Sample | Soak Time (minutes) | Surface Area (mm$^2$) | Sample Thickness (mm) | Material thickness (mm) | Material volume (mm$^3$) |
|---|---|---|---|---|---|
| Example 3 | 5 | 369 | 3.46 | 1.68 | 620 |
| Example 3 | 10 | 399 | 3.58 | 1.89 | 755 |
| Example 3 | 30 | 404 | 3.70 | 1.68 | 678 |
| Example 3 | 60 | 449 | 3.75 | 2.15 | 964 |
| Example 3 | 180 | 513 | 4.00 | 2.65 | 1359 |
| Example 3 | 300 | 530 | 4.18 | 2.80 | 1485 |
| Example 3 | 1260 | 581 | 4.35 | 2.87 | 1667 |

TABLE 2D

| Sample | Soak Time (minutes) | Surface Area (mm$^2$) | Sample Thickness (mm) | Material thickness (mm) | Material volume (mm$^3$) |
|---|---|---|---|---|---|
| Example 4 | 0 | 363 | 2.41 | 0.43 | 156 |
| Example 4 | 2 | 366 | 2.56 | 0.73 | 267 |
| Example 4 | 5 | 372 | 2.57 | 0.80 | 298 |
| Example 4 | 10 | 371 | 2.47 | 0.78 | 290 |
| Example 4 | 30 | 374 | 2.47 | 0.65 | 243 |
| Example 4 | 60 | 379 | 2.55 | 0.93 | 352 |
| Example 4 | 180 | 373 | 2.55 | 0.87 | 324 |
| Example 4 | 300 | 386 | 2.53 | 0.85 | 328 |
| Example 4 | 1260 | 379 | 2.40 | 0.81 | 307 |

TABLE 2E

| Sample | Soak Time (minutes) | Surface Area (mm$^2$) | Sample Thickness (mm) | Material thickness (mm) | Material volume (mm$^3$) |
|---|---|---|---|---|---|
| Example 5 | 0 | 378 | 2.42 | 0.47 | 178 |
| Example 5 | 2 | 377 | 2.50 | 0.48 | 181 |
| Example 5 | 5 | 386 | 2.50 | 0.54 | 208 |
| Example 5 | 10 | 385 | 2.52 | 0.58 | 223 |
| Example 5 | 30 | 384 | 2.53 | 0.59 | 227 |
| Example 5 | 60 | 388 | 2.50 | 0.59 | 229 |
| Example 5 | 180 | 389 | 2.57 | 0.65 | 253 |
| Example 5 | 300 | 394 | 2.57 | 0.78 | 307 |
| Example 5 | 1260 | 388 | 2.55 | 0.54 | 209 |

TABLE 2F

| Sample | Soak Time (minutes) | Surface Area (mm$^2$) | Sample Thickness (mm) |
|---|---|---|---|
| Comparative Example A | 0 | 405 | 2.90 |
| Comparative Example A | 2 | 417 | 2.90 |
| Comparative Example A | 5 | 425 | 3.15 |
| Comparative Example A | 10 | 407 | 2.77 |
| Comparative Example A | 30 | 416 | 2.77 |
| Comparative Example A | 60 | 426 | 2.87 |

TABLE 2G

| Sample | Soak Time (minutes) | Surface Area (mm$^2$) | Sample Thickness (mm) |
|---|---|---|---|
| Comparative Example B | 0 | 501 | 1.77 |
| Comparative Example B | 2 | 500 | 1.77 |
| Comparative Example B | 5 | 502 | 1.77 |
| Comparative Example B | 10 | 503 | 1.75 |
| Comparative Example B | 30 | 503 | 1.75 |
| Comparative Example B | 60 | 496 | 1.73 |
| Comparative Example B | 180 | 499 | 1.73 |
| Comparative Example B | 300 | 503 | 1.74 |
| Comparative Example B | 1260 | 501 | 1.73 |

TABLE 3A

| Sample | Soak Time (minutes) | Material thickness Increase (mm) | Percent Material thickness Increase | Material volume Increase (mm) | Percent Material volume Increase |
|---|---|---|---|---|---|
| Example 1 | 0 | 0 | 0% | 0 | 0% |
| Example 1 | 2 | 0.31 | 22% | 116 | 21% |
| Example 1 | 5 | 0.33 | 23% | 178 | 33% |
| Example 1 | 10 | 0.46 | 32% | 231 | 42% |
| Example 1 | 30 | 0.67 | 47% | 403 | 74% |
| Example 1 | 60 | 0.74 | 51% | 501 | 92% |

TABLE 3B

| Sample | Soak Time (minutes) | Material thickness Increase (mm) | Percent Material thickness Increase | Material volume Increase (mm) | Percent Material volume Increase |
|---|---|---|---|---|---|
| Example 2 | 0 | 0 | 0% | 0 | 0% |
| Example 2 | 2 | 0.35 | 33% | 140 | 32% |
| Example 2 | 5 | 0.40 | 38% | 191 | 43% |
| Example 2 | 10 | 0.85 | 81% | 455 | 103% |
| Example 2 | 30 | 1.00 | 95% | 708 | 160% |
| Example 2 | 60 | 1.05 | 100% | 843 | 191% |

TABLE 3C

| Sample | Soak Time (minutes) | Material thickness Increase (mm) | Percent Material thickness Increase | Material volume Increase (mm) | Percent Material volume Increase |
|---|---|---|---|---|---|
| Example 3 | 0 | 0 | 0% | 0 | 0% |
| Example 3 | 2 | 0.13 | 11% | 45 | 11% |
| Example 3 | 5 | 0.53 | 46% | 221 | 55% |
| Example 3 | 10 | 0.74 | 64% | 356 | 89% |
| Example 3 | 30 | 0.53 | 46% | 279 | 70% |
| Example 3 | 60 | 1.00 | 87% | 565 | 142% |
| Example 3 | 180 | 1.50 | 130% | 960 | 240% |
| Example 3 | 300 | 1.65 | 143% | 1086 | 272% |
| Example 3 | 1260 | 1.72 | 150% | 1268 | 318% |

TABLE 3D

| Sample | Soak Time (minutes) | Material thickness Increase (mm) | Percent Material thickness Increase | Material volume Increase (mm) | Percent Material volume Increase |
|---|---|---|---|---|---|
| Example 4 | 0 | 0 | 0% | 0 | 0% |
| Example 4 | 2 | 0.30 | 70% | 111 | 71% |
| Example 4 | 5 | 0.37 | 86% | 142 | 91% |
| Example 4 | 10 | 0.35 | 81% | 134 | 85% |
| Example 4 | 30 | 0.22 | 51% | 87 | 56% |
| Example 4 | 60 | 0.50 | 116% | 196 | 125% |
| Example 4 | 180 | 0.44 | 102% | 168 | 107% |
| Example 4 | 300 | 0.42 | 98% | 172 | 110% |
| Example 4 | 1260 | 0.38 | 88% | 151 | 96% |

TABLE 3E

| Sample | Soak Time (minutes) | Material thickness Increase (mm) | Percent Material thickness Increase | Material volume Increase (mm) | Percent Material volume Increase |
|---|---|---|---|---|---|
| Example 5 | 0 | 0 | 0% | 0 | 0% |
| Example 5 | 2 | 0.01 | 2% | 3 | 2% |
| Example 5 | 5 | 0.07 | 15% | 30 | 17% |
| Example 5 | 10 | 0.11 | 23% | 45 | 26% |
| Example 5 | 30 | 0.12 | 26% | 49 | 28% |
| Example 5 | 60 | 0.12 | 26% | 51 | 29% |
| Example 5 | 180 | 0.18 | 38% | 75 | 42% |
| Example 5 | 300 | 0.31 | 66% | 129 | 73% |
| Example 5 | 1260 | 0.07 | 15% | 31 | 18% |

As can be seen in Tables 2A-2G and 3A-3E, the samples of Examples 1-5 all show significant changes in both thickness and volume upon water uptake. The thickness and volume change is even resolved for Examples 3 and 4, where the water uptake test showed less change. The samples for Comparative Examples A and B, however, did not show any change in thickness or volume. Even when Comparative Example A showed a change in weight, as discussed above, there was no corresponding thickness change because the uptaken water was not acting to swell the samples, as is the case for Examples 1-5.

For Examples 1-5 of materials comprising a hydrogel, the hydrogel-containing materials had an average swell thickness increase at 1 hour of greater than 20%. In fact, the hydrogel-containing material of Examples 1-3 had an average swell thickness increase at 1 hour of greater than 75%. In comparison, the comparator non-hydrogel materials did not increase in thickness.

2. Material Water Uptake Capacity

Various samples of hydrogel-containing materials for Examples 6-18 were also tested to determine their uptake capacities at 1 hour and 24 hours, pursuant to the Water Uptake Capacity Test with either the Co-Extruded Film Sampling Procedure (co-extruded form) or the Neat Film Sampling Procedure (neat film form). For the co-extruded forms, the backing substrate was a thermoplastic polyurethane commercially available under the tradename "DES-MOPAN DP 8795 A" from Bayer MaterialScience AG, Leverkusen, Germany.

The hydrogel-containing material for Examples 6-8 was a thermoplastic polyurethane hydrogel commercially available under the tradename "TECOPHILIC TG-500" from the Lubrizol Corporation, Wickliffe, Ohio (same material as for Examples 1-3). For Example 6, the material was in neat film form with a 0.25-millimeter material thickness. For Example 7, the material was in a co-extruded form with a 0.13-millimeter material thickness. For Example 8, the material was also in a co-extruded film form, but with a 0.25-millimeter material thickness.

The material for Examples 9 and 10 was a lower-water-uptake thermoplastic polyurethane hydrogel commercially available under the tradename "TECOPHILIC HP-60D-60" from the Lubrizol Corporation, Wickliffe, Ohio (same as for Examples 4 and 5). For Example 9, the material was in a co-extruded film form with a 0.25-millimeter material thickness. For Example 10, the material was in a neat film form with a 0.13-millimeter material thickness.

The hydrogel-containing material for Example 11 was a thermoplastic polyurethane hydrogel commercially available under the tradename "TECOPHILIC TG-2000" from the Lubrizol Corporation, Wickliffe, Ohio, where the material was in a neat film form with a 0.13-millimeter material thickness. The hydrogel-containing material of Example 12 was a thermoplastic polyurethane hydrogel commercially available under the tradename "TECOPHILIC HP-93A-100" from the Lubrizol Corporation, Wickliffe, Ohio, where the material was in a co-extruded film form with a 0.13-millimeter material thickness.

The hydrogel-containing materials for Examples 13-17 were also thermoplastic polyurethane hydrogels derived from chain-extended TDI isocyanates and polyether glycols, where the polyether glycol concentrations were varied to adjust the water uptake capacities. For these examples, the hydrogel-containing materials were pressed into thick neat films having 3-millimeter material thicknesses.

The hydrogel-containing material for Example 18 was a thermoplastic polyamide-polyether block copolymer hydrogel commercially available under the tradename "PEBAX MH1657" from Arkema, Inc., Clear Lake, Tex., where the material was in a neat film form with a 0.13-millimeter material thickness. Table 4 lists the water uptake capacities for the samples of Examples 6-18.

TABLE 4

| Sample | Water Uptake Capacity (1 hour) | Water Uptake Capacity (24 hours) |
|---|---|---|
| Example 6 | 341% | 468% |
| Example 7 | 260% | — |
| Example 8 | 153% | 168% |
| Example 9 | — | 44% |
| Example 10 | 29% | 80% |
| Example 11 | 415% | 900% |
| Example 12 | 44% | — |
| Example 13 | 55% | 238% |
| Example 14 | 60% | 250% |
| Example 15 | 35% | 184% |
| Example 16 | 40% | 167% |
| Example 17 | 15% | 69% |
| Example 18 | 116% | 100% |

As shown, Examples 6-8 in Table 4 demonstrate the effects of constraining the material to a co-extruded backing substrate. Examples 9 and 10 demonstrate the same effects with a lower uptake material. Example 11 is a neat film with relatively high water uptake, while Example 12 is a coextruded form of a neat resin that has a water uptake capacity in-between those of Examples 6 and 10. Examples 13-17 also exhibited good water uptakes, and included considerably thicker materials (by about a factor of 10).

All of the materials of Examples 6-18 comprise a hydrogel. Examples 6, 8, 9, 10, 11, 13, 14, 15, 16, 17 and 18 were all found to have water uptake capacities of 40% or greater a 1 hour. Examples 6, 7, 8, 11, and 18 were found to have water uptake capacities of greater than 100% at 1 hour.

Examples 6, 7, 8, 11, 13, 14, 16, and 18 were found to have water uptake capacities of greater than 40% at 24 hours. Examples 6, 8, 11, 13, 14, 15, 16, and 18 were found to have water uptake capacities of at least 100% at 24 hours.

3. Material Water Uptake Rate and Swelling

Several samples (for Examples 1, 4, 6-8, and 10-12) were also tested to determine their water uptake rates and swell capacities, pursuant to the Water Uptake Rate Test and the Swell Capacity Test. Table 5 lists the test results for the samples of Examples 1, 4, 6-8, and 10-12.

TABLE 5

| Sample | Water Uptake Rate (grams/$m^2$-minutes$^{1/2}$) | Percent Material thickness Increase (1 hour) | Percent Material volume Increase (1 hour) |
|---|---|---|---|
| Example 1 | 235 | 73% | 130% |
| Example 4 | 58 | 72% | 75% |
| Example 6 | 752 | 89% | 117% |
| Example 7 | 173 | 318% | 64% |
| Example 8 | 567 | 177% | 77% |
| Example 10 | 33 | 43% | 88% |
| Example 11 | 1270 | 69% | 92% |
| Example 12 | 172 | 153% | 70% |

As shown, the tested samples exhibited varying water uptake rates, where the samples having higher water uptake capacities (from Table 4) and that were in neat form exhibited faster water uptake rates. Moreover, the swelling thickness and volume increases shown in Table 5 generally corresponded to the water uptake capacities shown above in Table 4.

Examples 1, 4, 6, 7, 8, 10, 11 and 12 were found to have water uptake rates of greater than 20 grams/$m^2$-minutes$^{1/2}$. Examples 1, 6, 7, 8, 11 and 12 were found to have water uptake rates of greater than 150 grams/$m^2$-minutes$^{1/2}$. Examples 1, 4, 6, 7, 8, 10, 11 and 12 were found to have swell thickness increases of greater than 20% at 1 hour. In fact, Examples 1, 4, 6, 7, 8, 10, 11 and 12 were found to have swell thickness increases of greater than 40% at 1 hour, and Examples 1, 4, 6, 7, 8, 11 and 12 were found to have swell thickness increases of greater than 60% at 1 hour. Examples 1, 4, 6, 7, 8, 10, 11 and 12 were found to have swell volume increases of at least 70%.

4. Material Contact Angle

The samples for Examples 6, 7, 10-12, and 18 were also tested to determine their dry-state and wet-state contact angles, pursuant to the Contact Angle Test. Table 6 below lists the corresponding dry and wet static sessile drop contact angles with their variations, as well as the difference in contact angle between the dry and wet measurements.

TABLE 6

| Sample | Average Dry Material Contact Angle (degrees) | Dry Material Contact Angle (std dev) | Average Wet Material Contact Angle (degrees) | Wet Material Contact Angle (std dev) | Contact Angle Difference |
|---|---|---|---|---|---|
| Example 6 | 87.6 | 2.6 | 66.9 | 4.9 | 20.7 |
| Example 7 | 86.6 | 1.1 | 57.4 | 5.5 | 29.2 |
| Example 10 | 95.6 | 3.2 | 72.5 | 2.5 | 23.1 |
| Example 11 | 79.5 | 2.4 | 64.7 | 2.3 | 14.8 |
| Example 12 | 97.1 | 2.5 | 95.5 | 4.7 | 1.7 |
| Example 18 | 66.2 | 5.0 | 52.0 | 3.7 | 14.2 |

The samples of Examples 6 and 7 show that there is no difference in contact angles between a neat film and the co-extruded film at the relevant thicknesses because contact angle is a surface property. The samples of Examples 10 and 11 show that a higher contact angle is generally present on a lower water uptake material (Example 10) compared to a high water uptake material (Example 11) The sample of Example 18, based on polyamide copolymer chemistry, demonstrates that the base chemistry can affect the dry contact angle. However, in all cases, a substantial reduction in contact angle is seen for wet materials when compared to dry samples. As can be appreciated from the discussion herein, a low wet state contact angle, or a decrease in contact angle from dry state to wet state, or both, can be predictive of outsoles and materials which can effectively prevent or reduce accumulation of soil.

Examples 6, 7, 10, 11 and 18 had wet-state static sessile drop contact angles of less than 80 degrees. Examples 6, 7, 11 and 18 had wet-state static sessile drop contact angles of less than 70 degrees. Examples 6, 7, 10, 11, and 18 had a drop in static sessile drop contact angle from the dry state to the wet state of at least 10 degrees. Examples 6, 7, 10, and 11 had a drop in static sessile drop contact angle from the dry state to the wet state of at least 20 degrees.

5. Material Coefficient of Friction

The samples for Examples 7, 10-12, and 18-21 were also tested for dry-state and wet-state coefficients of friction, pursuant to the Coefficient Of Friction Test. The material for Example 19 was the same thermoplastic polyamide hydrogel as used for Example 18, where the material was in a co-extruded film form with a 0.13-millimeter material thickness.

The material for Examples 20 and 21 was a thermoplastic polyamide-polyether block copolymer hydrogel commercially available under the tradename "PEBAX MV1074" from Arkema, Inc., Clear Lake, Tex. For Example 20, the material was in a neat film form with a 0.13-millimeter material thickness. For Example 21, the material was in a co-extruded film form with a 0.13-millimeter material thickness.

For comparison purposes, a film of a thermoplastic polyurethane (commercially available under the tradename "DESMOPAN DP 8795 A" from Bayer MaterialScience AG, Leverkusen, Germany; Comparative Example C), and a non-hydrogel thermoplastic polyamide (commercially available from Arkema, Inc., Clear Lake, Tex.; Comparative Example D) were also tested. Table 7 below lists the corresponding dry and wet coefficients of friction, as well as the percent reductions in the coefficients of friction between the dry and wet measurements.

TABLE 7

| Sample | Coefficient of Friction (dry) | Coefficient of Friction (wet) | Percent Reduction in Coefficient of Friction |
|---|---|---|---|
| Example 7 | 0.3 | 0.13 | 57% |
| Example 10 | 0.63 | 0.11 | 83% |
| Example 11 | 0.29 | 0.06 | 79% |
| Example 12 | 1.22 | 0.54 | 56% |
| Example 18 | 0.6 | 0.76 | −27% |
| Example 19 | 0.65 | 0.31 | 52% |
| Example 20 | 0.59 | 0.47 | 20% |
| Example 21 | 0.53 | 0.26 | 51% |
| Comparative Example C | 0.59 | 0.71 | −20% |
| Comparative Example D | 0.37 | 0.35 | 5% |

In some aspects, the hydrogel includes a crosslinked polymeric network that includes copolymer chains that are A comparison the results between Examples 7, 10-12, and 19-21 to Comparative Examples C and D in Table 7 illustrate how the water take up by the materials of the present disclosure can reduce the coefficient of friction of the material surfaces. Example 18 exhibited an increase in coefficient of friction after soaking. This is believed to be due to a partial saturation state for the material, where the water present at or near the material surface is being drawn into the material, creating a transitory tackier surface. As the material for Example 18 took up additional water (data not shown), its coefficient of friction also reduced below its dry-state value.

Examples 7, 10, 11, 12, 19, 20, and 21 showed a difference between the dry-state coefficient of friction and the wet-state coefficient of friction (wet subtracted from dry) of at least 0.1, or of at least 20%. Examples 10, 11, 12, 19, and 21 had a difference of at least 0.2, or of at least 50%.

6. Material Storage Modulus

The samples for Examples 6, 8-12, and 18 were also tested to determine their dry-state and wet-state storage modulus values, pursuant to the Storage Modulus Test. Table 8 lists the storage modulus values at 0% relative humidity (RH), 50% RH, and 90%, as well as the percent reductions between the 0% and 50% RH, and between the 0% and 90% RH.

TABLE 8

| Sample | E' (MPa) 0% RH | E' (MPa) 50% RH | E' (MPa) 90% RH | ΔE'50 (%) | ΔE'90 (%) |
|---|---|---|---|---|---|
| Example 6 | 766.6 | 548.3 | 0.03 | 29% | 100% |
| Example 8 | 151.7 | 119 | 41.9 | 22% | 72% |
| Example 9 | 60.16 | 52.68 | 45.93 | 12% | 24% |
| Example 10 | 43.44 | 34.05 | 29.58 | 22% | 32% |
| Example 11 | 514.9 | 396.8 | 0.86 | 23% | 100% |
| Example 12 | 44.7 | 38.2 | 34.5 | 15% | 23% |
| Example 18 | 119.7 | 105.3 | 64.6 | 12% | 46% |

The mechanical properties of the sample materials and their changes upon water uptake can demonstrate both soil shedding and durability properties. First, storage modulus is inversely related to compliance, and a compliant surface is useful in preventing or reducing the adhesion of soil to the outsole, as discussed above. A decrease in the modulus upon exposure to moisture is representative of an increase in compliance of the material which has been found to be predictive of soil shedding performance of the material on an outsole. Additionally, the materials of the present disclosure when dry are less compliant, which increases durability of the materials under dry conditions, while still allowing the materials to increase in compliance when wet.

Examples 6, 8, 9, 10, 11, 12 and 18, when equilibrated at 50% RH, have wet-state storage moduli at least 10% below their dry state (0% RH) moduli. Additionally, Examples 6, 8, 9, 10, 11, 12 and 18, when equilibrated at 90% RH, have wet-state storage moduli at least 20% below their dry state (0% RH) moduli. Examples 6, 8, 11 and 18, when equilibrated at 90% RH, have wet-state storage moduli at least 40% below their dry state (0% RH) moduli.

7. Material Glass Transition Temperature

The samples for Examples 6, 8-12, and 18 were also tested to determine their dry-state and wet-state glass transition temperatures, pursuant to the Glass Transition Temperature Test. Table 9 lists the dry and wet glass transition temperatures, as well as their reductions between the dry and wet states.

TABLE 9

| Sample | $T_{g, dry}$ (° C.) | $T_{g, wet}$ (° C.) | $\Delta T_g$ (° C.) |
|---|---|---|---|
| Example 6 | −27.5 | −70 | −42.5 |
| Example 8 | −30 | −63 | −33 |
| Example 9 | −25 | −31 | −6 |
| Example 10 | −20 | −37.1 | −17.1 |
| Example 11 | — | −63 | — |
| Example 12 | −49.59 | −60.59 | −11 |
| Example 18 | −54.93 | −64.76 | −9.83 |

As can be seen in Table 9, when water is taken up into the materials comprising a hydrogel (Examples 6, 8, 9, 10, 11, 12 and 18), it plasticizes the hydrogel. A larger drop in the glass transition temperature will typically be seen for a neat film (Examples 6 and 10) compared to a co-extruded version (Examples 8 and 9, respectively.) Interestingly, Example 11 showed no measurable glass transition when dry, which suggests that there is not enough amorphous material in the sample to create a measurable signal. The appearance of a glass transition temperature after water uptake suggests that the material is either significantly plasticized and/or the absorbent regions are highly crystalline in the absence of water. The plasticization of the hydrogel-containing materials as evidenced by a drop in glass transition temperature from the dry-state to the wet-state can distinguish the hydrogel material from materials which take up water but are not plasticized by the water.

Examples 6, 8, 9, 10, 12 and 18 have wet-state glass transition temperatures at least 5 degrees below their dry-state glass transition temperatures. In fact, Examples 6, 8, and 10 have wet-state glass transition temperatures at least 55 degrees below their dry-state glass transition temperatures.

8. Impact Energy Test

The samples for Examples 7, 12, 14, 16, 17, 19, and 21 were also tested for their abilities to shed soil, pursuant to the Impact Energy Test, as shown below in Table 10.

TABLE 10

| Sample | Relative Impact Energy |
|---|---|
| Example 7 | 0.60 |
| Example 12 | 0.90 |
| Example 14 | 0.00 |
| Example 16 | 0.00 |
| Example 17 | 0.83 |
| Example 19 | 1.03 |
| Example 21 | 0.95 |

All of the samples listed in Table 10, with the exception of Example 19, show a reduction in the relative impact energy required to dislodge adhered wet soil from the material when compared to the unmodified aluminum block. Example 19 showed a slight increase in adhesion energy. However, this is believed to be due to the thickness of the sample (3 millimeters), which prevented the material from taking up sufficient water during the soaking step.

Examples 7, 12, 14, 16, 17, and 21 required a relative impact energy of less than 1.0 in order to dislodge adhered wet soil. Examples 7, 14, and 16 required a relative impact energy of less than 0.65 in order to dislodge adhered wet soil.

9. Soil Shedding from Footwear

Global football/soccer footwear for Examples 22 and 23 were also tested for soil shedding abilities, pursuant to the Soil Shedding Article Test, where Example 22 included the same footwear and materials as discussed above for Examples 1-3, and where Example 23 included the same footwear and materials as discussed above for Examples 4 and 5.

After the test, the sample for Example 22 had an average weight gain of 28.3% as compared to a control without the material, and the sample for Example 23 had an average weight gain of 37.4% as compared to the control. Both examples demonstrated that the use of the materials when pre-soaked in water are effective in preventing or reducing wet soil accumulation. Furthermore, the material with a higher water uptake capacity, water uptake rate, and swelling capacity (Example 22) was more effective in reducing wet soil accumulation as compared to a material having a lower water uptake capacity (Example 23).

10. Field Use

Global football/soccer footwear for Examples 24 and 25 were also tested on a closed course during game play, where Example 24 included the same footwear and materials as discussed above for Examples 1-3 and 22, and where Example 25 included the same footwear and materials as discussed above for Examples 4, 5, and 23. Five pairs of the footwear for Example 24 were tested, one pair of the footwear for Example 25 was tested, and two pairs of control footwear were tested (which did not include an material) (Comparative Examples E and F). The footwear, initially free of soil, were then worn by players on the closed course while playing soccer for 90 minutes during a rainy day.

Figure 20A:
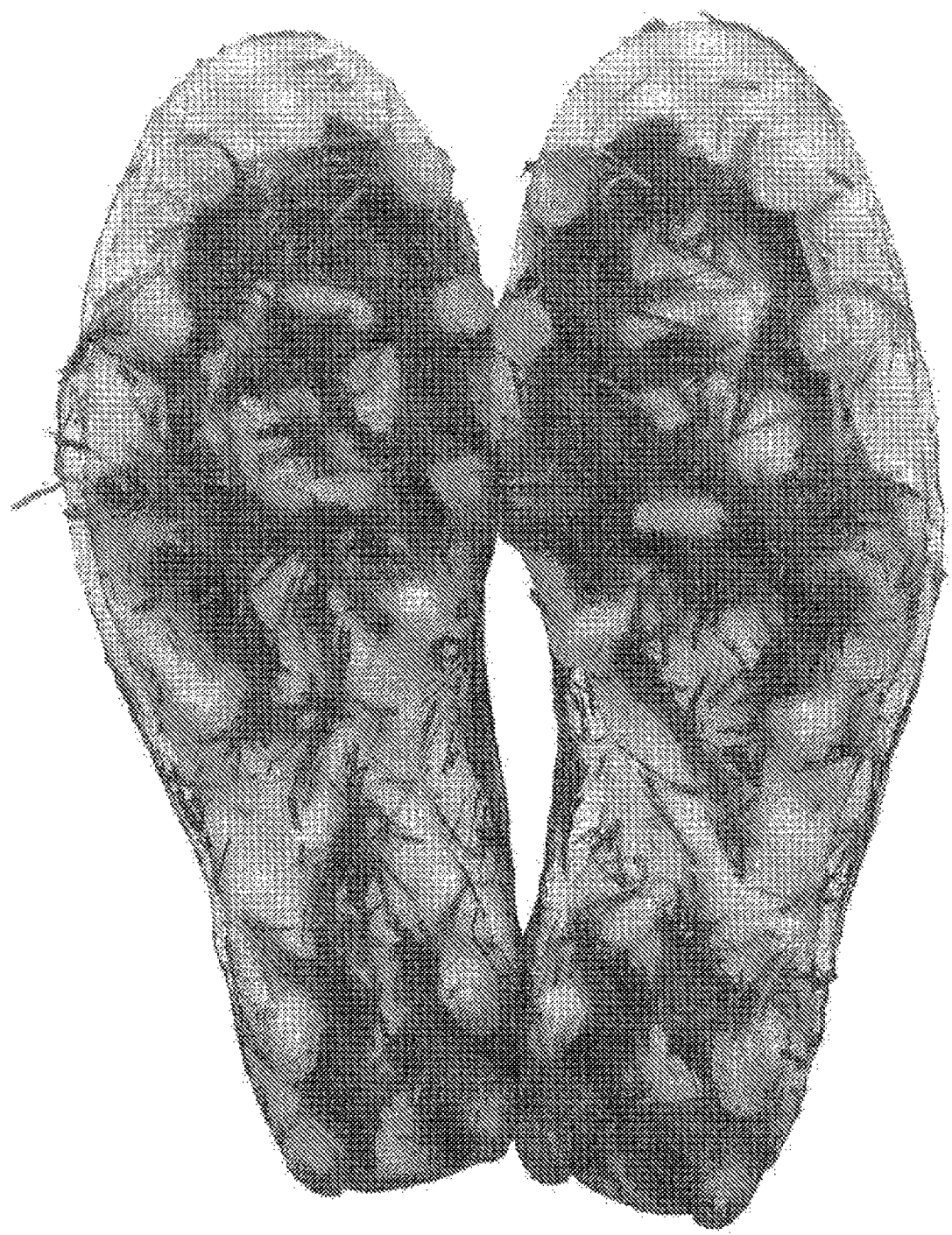
FIGS. 20A-H include photographs of articles of footwear with and without a hydrogel-containing material according to the disclosure after being worn and used during wet and muddy game conditions.
Figure 20B:
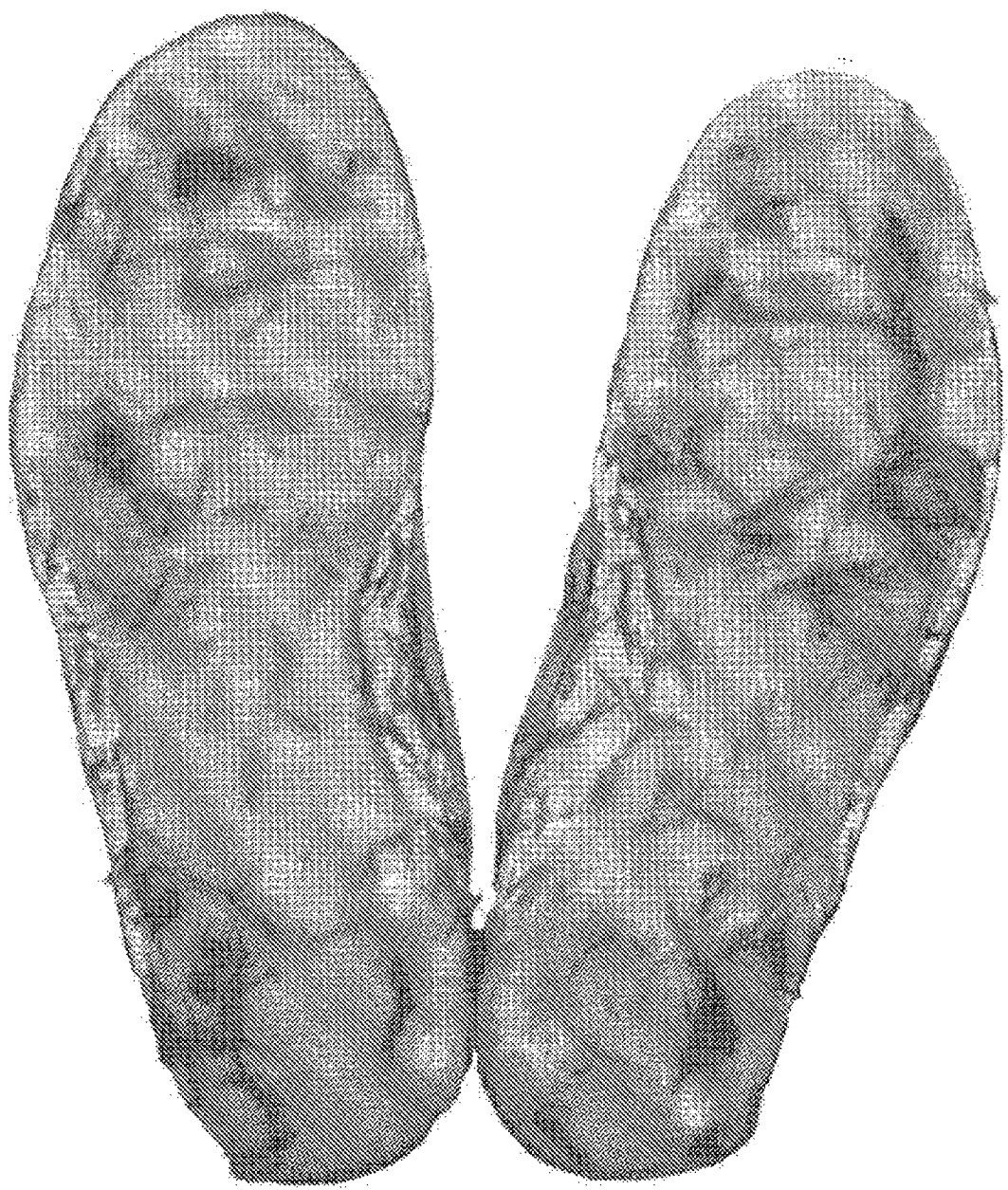
Figure 20C:
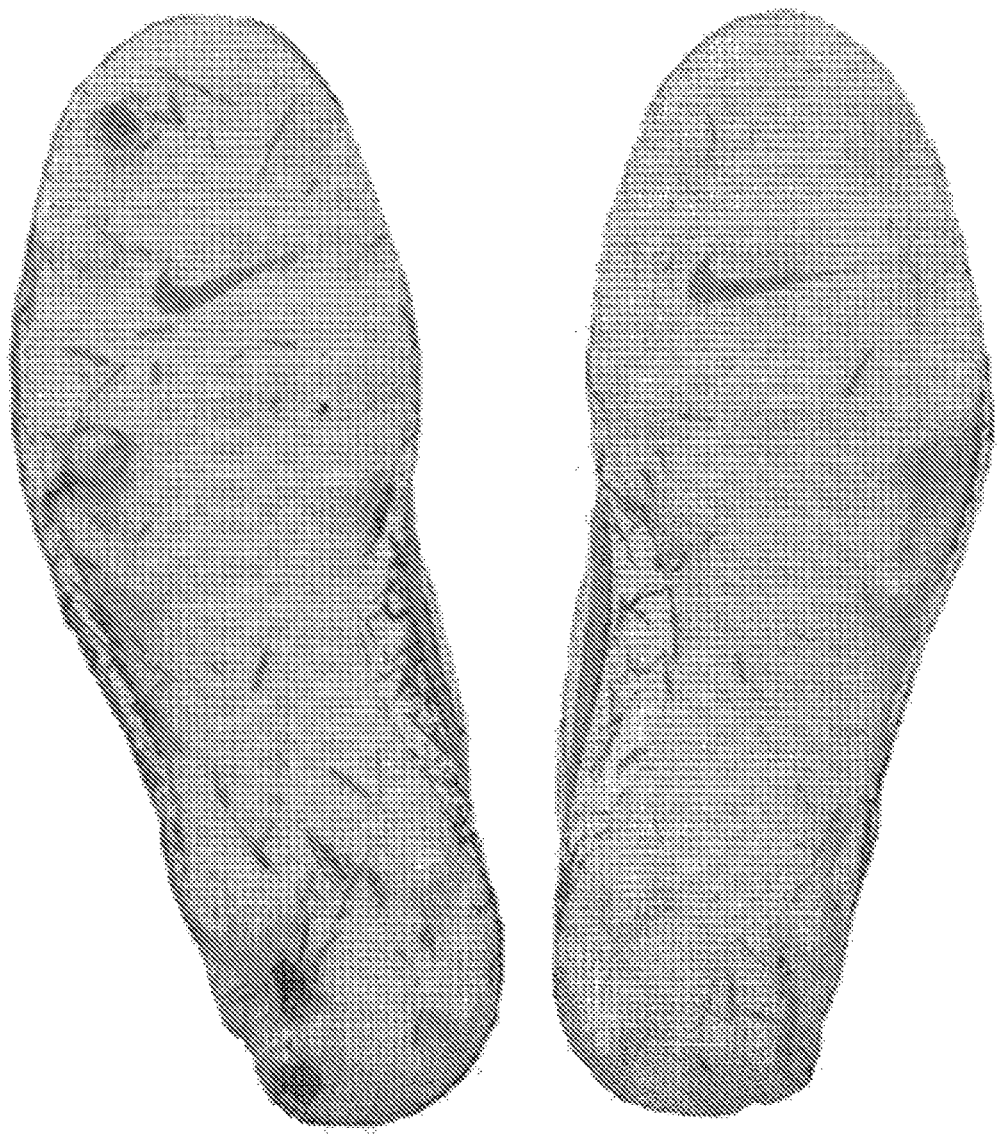
Figure 20D:
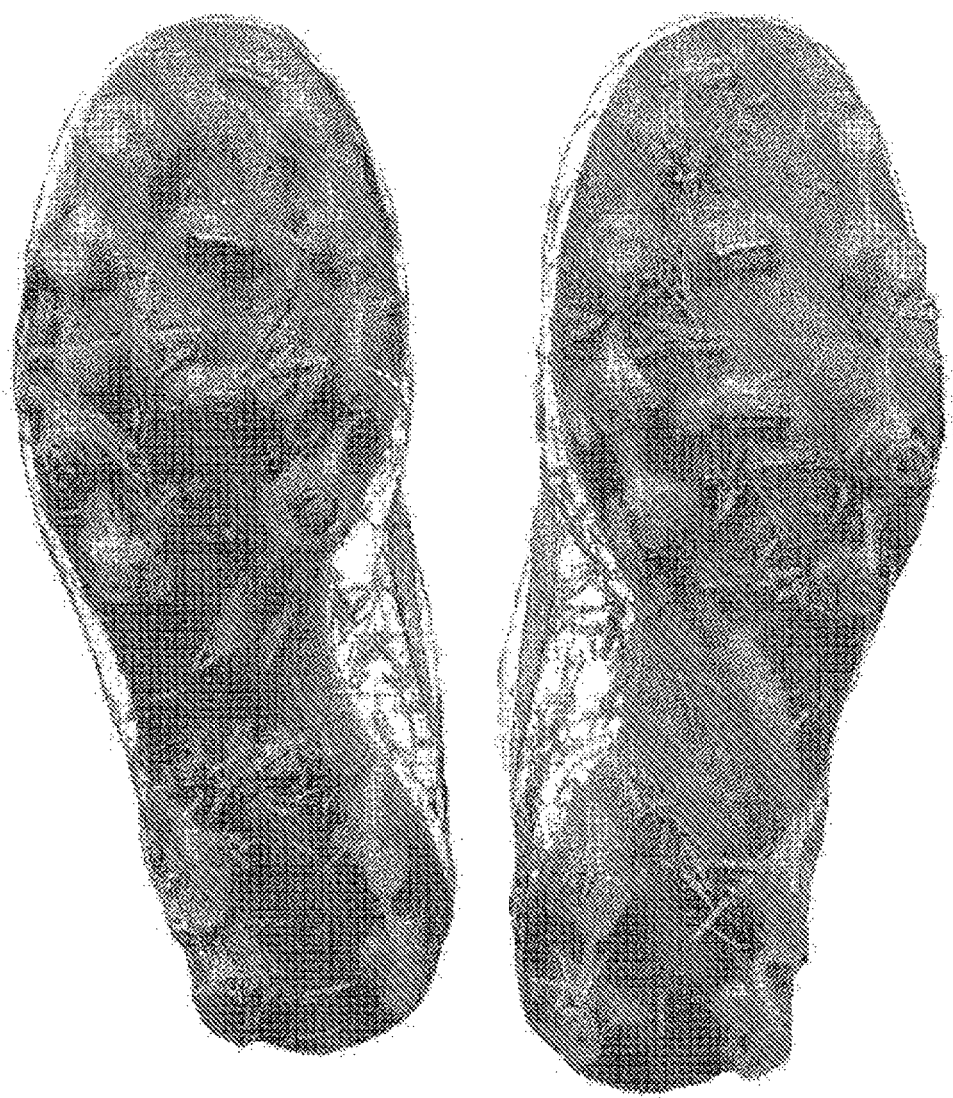
Figures 20E, 20F, 20G:
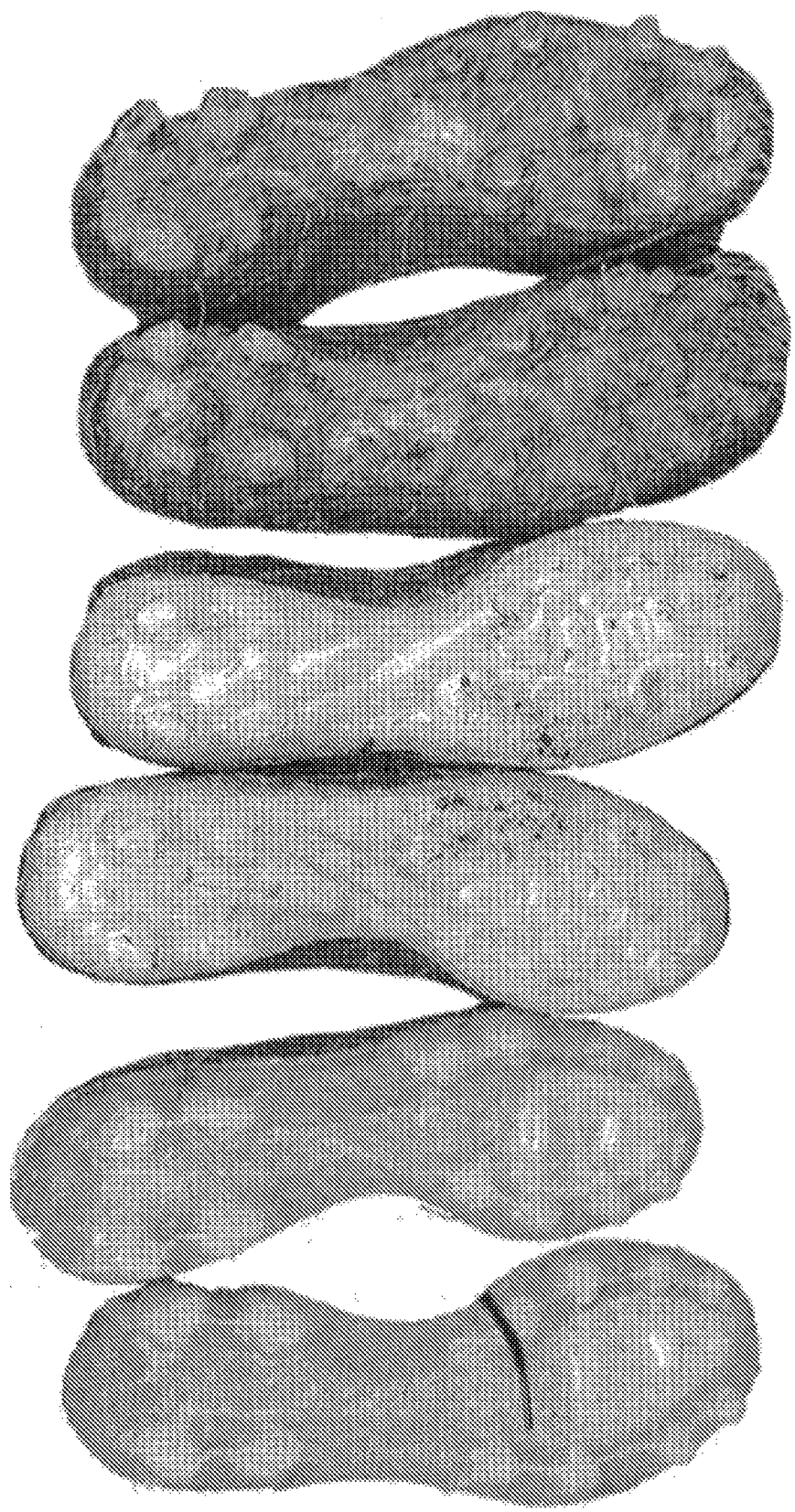
Figure 20H:

The first 45 minutes were played on a natural grass field, and second 45 minutes were played on an organic/sand/clay mix field. After the 90-minute playing session, the shoes were investigated for the accumulation of soil on the outsoles over the course of the game. As seen from the images in FIGS. 20B-20F, the five pairs of shoes with the material of Example 24 accumulated little to no soil, while the two pairs of control footwear for Comparative Examples E and F accumulated a substantial amount of soil. The pair of shoes with the material of Example 25 also accumulated soil (as shown in FIG. 20A), but the accumulated amount was somewhat less than the control footwear of Comparative Examples E and F (as shown in FIGS. 20G and 20H). This illustrates the effectiveness of the materials of the present disclosure in preventing or reducing the adherence of soil.

Additionally, the footwear for Examples 24 and 25 were also used for extended durations during games on the closed course to demonstrate the limits of their durabilities. The materials for the footwear of both Examples 24 and 25 continue to be effective in preventing or reducing the accumulation of soil after 100 hours of game play without any significant abrasion or delamination. As such, the materials of the present disclosure are suitable for use as ground-facing surfaces for footwear outsoles.

CLAUSES

1. An article of manufacture comprising: a substrate body having a first side compositionally comprising a polymeric material having a water uptake capacity of less than about 10% by weight, as characterized by the Water Uptake Capacity Test with the Article Sampling Procedure; a tie layer secured to the first side; and a material secured to the tie layer opposite the first side of the substrate body, the material defining at least a portion of a first external surface of the article, and the material compositionally comprising a polymeric hydrogel.

2. The article of clause 1, wherein the article is an article of footwear.

3. The article of clause 2, wherein the substrate body, the tie layer, and the material form a layered structure being a part of an outsole for the article of footwear.

4. The article as in any of the preceding clauses, wherein the at least a portion of the first external surface collects soil or is exposed to soil during use of the article.

5. The article of clause 1, wherein the article is selected from the group consisting of footwear, a component of footwear, sporting equipment, a component of sporting equipment, apparel, a component of apparel, a plumbing article, a component of a plumbing article, a component of a vehicle, a transportation container, a component of a transportation container, a refuse container, a component of a refuse container, an article of construction equipment, a component of an article of construction equipment, an article of play equipment, a component of an article of play equipment, an article of landscaping equipment, a component of an article of landscaping equipment, an article of furniture, and a component of an article of furniture.

6. The article as in any of the preceding clauses, wherein the polymeric hydrogel comprises one or more polymers selected from the group consisting of a polyurethane, a polyamide homopolymer, a polyamide copolymer, and combinations thereof.

7. The article of clause 6, wherein the polyamide copolymer is a polyamide block copolymer.

8. The article as in any of the preceding clauses, wherein the polymeric hydrogel comprises a thermoplastic hydrogel.

9. The article as in any of the preceding clauses, wherein the tie layer compositionally comprises a thermoplastic polymer.

10. The article as in any of the preceding clauses, wherein the tie layer comprises one or more polymers selected from the group consisting of an aliphatic thermoplastic polyurethane, a thermoplastic polyurethane having a water uptake capacity of greater than or equal to about 10%, as characterized by the Water Uptake Capacity Test with the Article Sampling Procedure, an aliphatic polyamide, a fiber-reinforced polymer, and combinations thereof.

11. The article of clauses 10, wherein the aliphatic polyamide comprises a caprolactam functional group.

12. The article as in any of the preceding clauses, wherein the substrate body compositionally comprises one or more polymers selected from the group consisting of an aliphatic thermoplastic polyurethane, an aromatic thermoplastic polyurethane, an aliphatic polyamide, an aromatic polyamide, and combinations thereof.

13. The article of clauses 12, wherein the aliphatic polyamide comprises a caprolactam functional group.

14. The article as in clauses 12 or 13, wherein the aliphatic polyamide is a nylon.

15. The article as in any of the preceding clauses, wherein the polymeric hydrogel is a first polymeric hydrogel and the tie layer comprises a second polymeric hydrogel.

16. The article of clause 15, wherein the tie layer is produced by the process of: grinding a composition comprising the second polymeric hydrogel under conditions such that the second polymeric hydrogel is maintained at a grinding temperature being below a melting point of the second polymeric hydrogel, forming a ground material; and pelletizing the ground material, defining a pelletized material.

17. The article of clauses 16, wherein the step of grinding a composition comprises grinding the composition under conditions such that the second polymeric hydrogel is maintained at the grinding temperature being below a softening point of the second polymeric hydrogel.

18. The article as in clauses 16 or 17, wherein the step of pelletizing the ground material comprises pelletizing the ground material under conditions such that the ground material takes up less than about 50% by weight, as characterized by the Water Uptake Test with the Article Sampling Procedure.

19. The article as in any of clauses 16-18, wherein the tie layer is produced by the process of: extruding or coextruding the pelletized material, forming a film.

20. The article as in any of clauses 15-19, wherein the tie layer comprises a mixture including the second polymeric hydrogel comprising an aliphatic thermoplastic polyurethane.

21. The article as in any of the preceding clauses, wherein the tie layer comprises an ethylene vinyl alcohol copolymer.

22. The article as in any of clauses 15-20, wherein the second polymeric hydrogel has a water uptake capacity at 1 hour of greater than 40% by weight, as characterized by the Water Uptake Capacity Test with the Article Sampling Procedure.

23. The article of clause 22, wherein a water uptake capacity of the first polymeric hydrogel at 1 hour is within plus or minus 10% of the water uptake capacity of the second polymeric hydrogel, as characterized by the Water Uptake Capacity Test with the Article Sampling Procedure.

24. The article as in any of the preceding clauses, wherein the material has a water uptake rate greater than 20 g/(m$^2$× min$^{0.5}$), as characterized by the Water Uptake Rate Test with the Article Sampling Procedure.

25. The article as in any of the preceding clauses, wherein the material has a swell thickness increase at 1 hour greater than 20%, as characterize by the Swelling Capacity Test with the Article Sampling Procedure.

26. The article as in any of the preceding clauses, wherein the at least a portion of the first external surface defined by the material has a wet-state contact angle less than 80°, as characterized by the Contact Angle Test with the Article Sampling Procedure.

27. The article as in any of the preceding clauses, wherein the at least a portion of the first external surface defined by the material has a wet-state coefficient of friction less than 0.8, as characterized by the Coefficient Of Friction Test with the Article Sampling Procedure.

28. The article as in any of the preceding clauses, wherein the material has a wet-state glass transition temperature when equilibrated at 90% relative humidity and a dry-state glass transition temperature when equilibrated at 0% relative humidity, each as characterized by the Glass Transition Temperature Test with the Neat Material Sampling Procedure, and wherein the wet-state glass transition temperature is more than 6° C. less than the dry-state glass transition temperature.

29. The article as in any of the preceding clauses, wherein the material has a wet-state storage modulus when equilibrated at 90% relative humidity and a dry-state storage modulus when equilibrated at 0% relative humidity, each as characterized by the Storage Modulus Test with the Neat Material Sampling Procedure, and wherein the wet-state storage modulus is less than the dry-state storage modulus of the material.

30. The article as in any of the preceding clauses, wherein the material has a dry-state thickness ranging from 0.1 millimeters to 2 millimeters.

31. The article as in any of the preceding clauses, wherein the polymeric hydrogel compositionally comprises a first thermoplastic polyurethane hydrogel, and wherein the substrate body comprises a second thermoplastic polyurethane.

32. The article of clause 3, wherein the material is present on at least 80% of a ground-facing surface of the outsole.

33. The article as in clause 3 or 32, wherein the outsole further comprises one or more traction elements present on the first external surface.

34. The article as in clause 32 or 33, wherein the outsole comprises the first external surface and a second surface opposing the first external surface, and the article further comprising an upper secured to the second surface of the outsole.

35. A method of manufacturing an article, the method comprising: forming a substrate body having a first side compositionally comprising a polymeric material having a water uptake capacity of less than about 10% by weight, as characterized by the Water Uptake Capacity Test with the Article Sampling Procedure; securing a tie layer to the first side; and securing a material to the tie layer opposite the first side of the substrate body, the material compositionally comprising a polymeric hydrogel, defining a layered structure.

36. The method of clause 35, further comprising: thermoforming the layered structure, or injection molding material on to the layered structure, or both.

37. The method as in clause 35 or 36, further comprising: receiving an upper; and securing the layered structure and the upper to each other such that the material defines a ground-facing surface of an article of footwear.

38. A method of manufacturing an article of footwear, the method comprising: receiving an upper for the article of footwear; receiving an outsole for the article of footwear, the outsole comprising: a) a substrate body having a first side and compositionally comprising a polymeric material having a water uptake capacity of less than about 10% by weight, as characterized by the Water Uptake Capacity Test with the Article Sampling Procedure; b) a tie layer being secured to the first side; and c) a material secured to the tie layer opposite the first side of the substrate body, the material defining at least a portion of a first external surface of the article, and the material compositionally comprises a polymeric hydrogel; wherein the substrate body, the tie layer, and the material form a layered structure being a part of the outsole; and securing the outsole and the upper to each other such that the material defines a ground-facing surface of the article of footwear.

39. Use of a material compositionally comprising a hydrogel to prevent or reduce soil accumulation on a first external surface of a first article, which first external surface comprises the material, by providing the material on the first external surface of the first article, wherein the first article retains at least 10% less soil by weight as compared to a second article which is identical except that a first external surface of the second article is substantially free of the material.

40. An article of manufacture produced by the process of: forming a substrate body having a first side compositionally comprising a polymeric material having a water uptake capacity of less than 10% by weight, as characterized by the Water Uptake Capacity Test with the Article Sampling Procedure; securing a tie layer to the first side; and securing a material to the tie layer opposite the first side of the substrate body, the material compositionally comprising a polymeric hydrogel, defining a layered structure.

41. The article of clause 40, wherein the article is an article of footwear.

42. The article of clause 41, wherein the substrate body comprises a first amount of a fiber-reinforced polymer and the tie layer comprises a second amount of the fiber-reinforced polymer such that the first amount is greater than the second amount.

43. A method of manufacturing an article, the method comprising: receiving a substrate body having a first side compositionally comprising a polymeric material having a water uptake capacity of less than about 10% by weight, as characterized by the Water Uptake Capacity Test with the Article Sampling Procedure; securing a cap layer to the first side, defining an intermediate structure; and subsequently securing a material to the cap layer opposite the first side of the substrate body such that the intermediate structure forms a layered structure with the cap layer forming a tie layer, the material compositionally comprising a polymeric hydrogel.

44. A method of manufacturing an article, the method comprising: receiving a material compositionally comprising a polymeric hydrogel, the material having a first side; securing a cap layer to the first side of the material; and subsequently securing a substrate body to the cap layer forming a layered structure such that the cap layer forms a tie layer between a first side of the substrate body and the first side of the polymeric hydrogel-containing material, wherein the substrate body compositionally comprising a polymeric material having a water uptake capacity of less than about 10% by weight, as characterized by the Water Uptake Capacity Test with the Article Sampling Procedure.

What is claimed is:

1. An article of manufacture comprising:
   a substrate body having a first side compositionally comprising a polymeric material having a water uptake capacity of less than about 10% by weight, as characterized by the Water Uptake Capacity Test with the Article Sampling Procedure;
   a tie layer secured to the first side; and
   a material secured to the tie layer opposite the first side of the substrate body, the material
defining at least a portion of a first external surface of the article, and the material compositionally comprising a polymeric hydrogel, wherein the polymeric hydrogel is a first polymeric hydrogel and the tie layer comprises a second polymeric hydrogel, wherein the tie layer comprises a mixture including the second polymeric hydrogel comprising an aliphatic thermoplastic polyurethane, wherein the first polymeric hydrogel and the second polymeric hydrogel are different, and wherein the material has a water uptake rate greater than 20 $g/(m^2 \times min^{0.5})$, as characterized by the Water Uptake Rate Test with the Article Sampling Procedure.

2. The article of claim 1, wherein the article is an article of footwear.

3. The article of claim 2, wherein the substrate body, the tie layer, and the material form a layered structure being a part of an outsole for the article of footwear.

4. The article of claim 1, wherein the at least a portion of the first external surface collects soil or is exposed to soil during use of the article.

5. The article of claim 1, wherein the article is selected from the group consisting of footwear, a component of footwear, sporting equipment, a component of sporting equipment, apparel, a component of apparel, a plumbing article, a component of a plumbing article, a component of a vehicle, a transportation container, a component of a transportation container, a refuse container, a component of a refuse container, an article of construction equipment, a component of an article of construction equipment, an article of play equipment, a component of an article of play equipment, an article of landscaping equipment, a component of an article of landscaping equipment, an article of furniture, and a component of an article of furniture.

6. The article of claim 1, wherein the polymeric hydrogel comprises a thermoplastic hydrogel.

7. The article of claim 1, wherein the tie layer further comprises a thermoplastic polymer.

8. The article of claim 1, wherein the tie layer further comprises one or more polymers selected from the group consisting of a thermoplastic polyurethane having a water uptake capacity of greater than or equal to about 10%, as characterized by the Water Uptake Capacity Test with the Article Sampling Procedure, an aliphatic polyamide, a fiber-reinforced polymer, and combinations thereof.

9. The article of claim 1, wherein the article is a refuse container.

10. The article of claim 1, wherein the article is a plumbing article.

11. The article of claim 1, wherein the article is an article of play equipment.

12. The article of claim 1, wherein the article is an article of furniture.

* * * * *